US008875038B2

(12) United States Patent
Ismalon

(10) Patent No.: US 8,875,038 B2
(45) Date of Patent: Oct. 28, 2014

(54) ANCHORING FOR CONTENT SYNCHRONIZATION

(75) Inventor: Emil Ismalon, Tel Aviv (IL)

(73) Assignee: Collarity, Inc., Palo Alto, CA (US)

( * ) Notice: Subject to any disclaimer, the term of this patent is extended or adjusted under 35 U.S.C. 154(b) by 446 days.

(21) Appl. No.: 13/009,305

(22) Filed: Jan. 19, 2011

(65) Prior Publication Data
US 2011/0202848 A1    Aug. 18, 2011

Related U.S. Application Data

(60) Provisional application No. 61/296,116, filed on Jan. 19, 2010.

(51) Int. Cl.
G06F 3/048 (2013.01)
G06F 3/00 (2006.01)
G06F 17/30 (2006.01)

(52) U.S. Cl.
CPC .................. G06F 17/3089 (2013.01)
USPC ............ 715/769; 715/708; 715/714; 715/738

(58) Field of Classification Search
None
See application file for complete search history.

(56) References Cited

U.S. PATENT DOCUMENTS

| | | | |
|---|---|---|---|
| 4,286,118 A | 8/1981 | Mehaffey et al. |
| 4,392,129 A | 7/1983 | Mehaffey et al. |
| 4,477,698 A | 10/1984 | Szlam et al. |
| 4,540,855 A | 9/1985 | Szlam et al. |
| 4,677,663 A | 6/1987 | Szlam |
| 4,720,853 A | 1/1988 | Szlam |
| 4,742,538 A | 5/1988 | Szlam |
| 4,742,539 A | 5/1988 | Szlam |
| 4,782,510 A | 11/1988 | Szlam |
| 4,797,911 A | 1/1989 | Szlam et al. |
| 4,823,306 A | 4/1989 | Barbic |
| 4,894,857 A | 1/1990 | Szlam et al. |

(Continued)

FOREIGN PATENT DOCUMENTS

| | | |
|---|---|---|
| EP | 1 653 376 | 5/2006 |
| WO | 99/23807 | 5/1999 |

(Continued)

OTHER PUBLICATIONS

Ming-Chang Chen, "Mining Progressive User Behavior for E-Commerce Using Virtual Reality Technique", Dec. 2007, A Thesis presented to the Faculty of the Graduate School at the University of Missouri—Columbia, pp. 1-85.

(Continued)

Primary Examiner — Stephen Alvesteffer
(74) Attorney, Agent, or Firm — Stein IP LLC

(57) ABSTRACT

A computer-implemented method includes receiving from a web browser, by a server system via a network, an indication of dragging, by a user of the web browser, of an element displayed on a webpage displayed by the web browser, and dropping, by the user, of the element into a content area displayed on the webpage, the element selected from the group consisting of: a first content item displayed at a location on the webpage other than in the content area, and a graphical element displayed in association with the first content item. Responsively to the indication, the server system causes the web browser to display, in the content area, at least a portion of a set of one or more second content items related to the first content item. Other embodiments are also described.

59 Claims, 9 Drawing Sheets

(56) References Cited

U.S. PATENT DOCUMENTS

| | | |
|---|---|---|
| 5,070,525 A | 12/1991 | Szlam et al. |
| 5,214,688 A | 5/1993 | Szlam et al. |
| 5,301,109 A | 4/1994 | Landauer |
| 5,309,505 A | 5/1994 | Szlam et al. |
| 5,325,445 A | 6/1994 | Herbert |
| 5,511,112 A | 4/1996 | Szlam |
| 5,581,602 A | 12/1996 | Szlam et al. |
| 5,594,791 A | 1/1997 | Szlam |
| 5,619,709 A | 4/1997 | Caid |
| 5,675,637 A | 10/1997 | Szlam et al. |
| 5,724,521 A | 3/1998 | Dedrick |
| 5,754,938 A | 5/1998 | Herz et al. |
| 5,754,939 A * | 5/1998 | Herz et al. ............... 455/3.04 |
| 5,809,242 A | 9/1998 | Shaw et al. |
| 5,825,943 A | 10/1998 | DeVito |
| 5,828,731 A | 10/1998 | Szlam et al. |
| 5,857,179 A | 1/1999 | Vaithyanathan |
| 5,864,845 A | 1/1999 | Voorhees |
| 5,887,133 A | 3/1999 | Brown et al. |
| 5,926,812 A | 7/1999 | Hilsenrath |
| 5,948,061 A | 9/1999 | Merriman et al. |
| 5,963,635 A | 10/1999 | Szlam et al. |
| 5,963,724 A | 10/1999 | Mantooth |
| RE36,416 E | 11/1999 | Szlam et al. |
| 5,987,457 A | 11/1999 | Ballard |
| 6,002,394 A * | 12/1999 | Schein et al. ............... 725/39 |
| 6,006,225 A | 12/1999 | Bowman |
| 6,098,065 A | 8/2000 | Skillen |
| 6,134,532 A | 10/2000 | Lazarus et al. |
| 6,137,911 A | 10/2000 | Zhilyaev |
| 6,167,397 A | 12/2000 | Jacobson |
| 6,189,002 B1 | 2/2001 | Roitblat |
| 6,233,591 B1 * | 5/2001 | Sherman et al. ............... 715/205 |
| 6,289,353 B1 | 9/2001 | Hazlehurst et al. |
| 6,308,202 B1 | 10/2001 | Cohen et al. |
| 6,314,089 B1 | 11/2001 | Szlam |
| 6,321,226 B1 | 11/2001 | Garber et al. |
| 6,327,574 B1 | 12/2001 | Kramer et al. |
| 6,347,313 B1 | 2/2002 | Ma et al. |
| 6,356,898 B2 | 3/2002 | Cohen et al. |
| 6,359,892 B1 | 3/2002 | Szlam |
| 6,360,221 B1 | 3/2002 | Gough et al. |
| 6,362,838 B1 | 3/2002 | Szlam et al. |
| 6,363,379 B1 | 3/2002 | Jacobson et al. |
| 6,366,298 B1 | 4/2002 | Haitsuka et al. |
| 6,377,961 B1 | 4/2002 | Ryu |
| 6,385,592 B1 | 5/2002 | Angles et al. |
| 6,411,950 B1 | 6/2002 | Moricz et al. |
| 6,442,545 B1 | 8/2002 | Feldman et al. |
| 6,449,657 B2 | 9/2002 | Stanbach, Jr. et al. |
| 6,449,765 B1 | 9/2002 | Ballard |
| 6,513,036 B2 | 1/2003 | Fruensgaard et al. |
| 6,529,903 B2 | 3/2003 | Smith et al. |
| 6,539,377 B1 | 3/2003 | Culliss |
| 6,539,396 B1 | 3/2003 | Bowman-Amuah |
| 6,564,213 B1 | 5/2003 | Ortega et al. |
| 6,581,056 B1 | 6/2003 | Rao |
| 6,584,492 B1 | 6/2003 | Cezar et al. |
| 6,611,825 B1 | 8/2003 | Billheimer et al. |
| 6,636,848 B1 | 10/2003 | Aridor et al. |
| 6,647,383 B1 | 11/2003 | August et al. |
| 6,665,656 B1 | 12/2003 | Carter |
| 6,665,838 B1 | 12/2003 | Brown et al. |
| 6,671,681 B1 | 12/2003 | Emens et al. |
| 6,675,205 B2 | 1/2004 | Meadway et al. |
| 6,681,223 B1 | 1/2004 | Sundaresan |
| 6,701,309 B1 | 3/2004 | Beeferman et al. |
| 6,708,176 B2 | 3/2004 | Strunk et al. |
| 6,711,577 B1 | 3/2004 | Wong et al. |
| 6,732,088 B1 | 5/2004 | Glance et al. |
| 6,772,150 B1 | 8/2004 | Whitman et al. |
| 6,772,200 B1 | 8/2004 | Bakshi et al. |
| 6,839,682 B1 | 1/2005 | Blume et al. |
| 6,842,906 B1 | 1/2005 | Bowman-Amuah |
| 6,868,395 B1 | 3/2005 | Szlam et al. |
| 6,874,018 B2 | 3/2005 | Wu |
| 6,876,997 B1 | 4/2005 | Rorex et al. |
| 6,892,181 B1 | 5/2005 | Megiddo et al. |
| 6,892,354 B1 | 5/2005 | Servan-Schreiber et al. |
| 6,904,408 B1 | 6/2005 | McCarthy et al. |
| 6,904,588 B2 | 6/2005 | Reddy et al. |
| 6,920,448 B2 | 7/2005 | Kincaid et al. |
| 6,925,460 B2 | 8/2005 | Kummamuru et al. |
| 6,925,607 B2 | 8/2005 | Szlam et al. |
| 6,947,930 B2 | 9/2005 | Anick et al. |
| 6,978,263 B2 | 12/2005 | Soulanille |
| 6,983,320 B1 | 1/2006 | Thomas et al. |
| 7,013,323 B1 | 3/2006 | Thomas et al. |
| 7,028,072 B1 | 4/2006 | Kliger et al. |
| 7,065,550 B2 | 6/2006 | Raghunandan |
| 7,076,497 B2 | 7/2006 | Donteverde |
| 7,080,321 B2 | 7/2006 | Aleksander |
| 7,089,237 B2 | 8/2006 | Turnbull et al. ............... 1/1 |
| 7,096,218 B2 | 8/2006 | Schrmer et al. |
| 7,110,993 B2 | 9/2006 | Soulanille et al. |
| 7,139,755 B2 | 11/2006 | Hammond |
| 7,152,059 B2 | 12/2006 | Monteverde |
| 7,152,061 B2 | 12/2006 | Curtis et al. |
| 7,152,065 B2 | 12/2006 | Behrens et al. |
| 7,181,438 B1 | 2/2007 | Szabo |
| 7,236,969 B1 | 6/2007 | Skillen et al. |
| 7,257,570 B2 | 8/2007 | Riise et al. |
| 7,272,638 B2 | 9/2007 | Lee et al. |
| 7,295,991 B1 | 11/2007 | Clarke et al. |
| 7,296,019 B1 | 11/2007 | Chandrasekar et al. |
| 7,313,556 B2 | 12/2007 | Gallivan et al. |
| 7,319,975 B2 | 1/2008 | Monteverde |
| 7,321,892 B2 | 1/2008 | Vadon |
| 7,324,528 B1 | 1/2008 | Szlam |
| 7,376,709 B1 | 5/2008 | Brei et al. |
| 7,451,129 B2 | 11/2008 | Lamping et al. |
| 7,451,130 B2 | 11/2008 | Gupta et al. |
| 7,461,059 B2 | 12/2008 | Richardson et al. |
| 7,464,079 B2 | 12/2008 | Soulanille |
| 7,469,245 B2 | 12/2008 | Skillen et al. |
| 7,499,940 B1 | 3/2009 | Gibbs ............... 1/1 |
| 7,529,740 B2 | 5/2009 | Chang et al. |
| 7,539,693 B2 | 5/2009 | Frank et al. |
| 7,562,074 B2 | 7/2009 | Liddell et al. |
| 7,565,345 B2 | 7/2009 | Bailey |
| 7,567,958 B1 | 7/2009 | Alspector et al. |
| 7,577,718 B2 | 8/2009 | Slawson et al. |
| 7,593,929 B2 | 9/2009 | Dettinger et al. |
| 7,596,581 B2 | 9/2009 | Frank et al. |
| 7,606,798 B2 | 10/2009 | Ge et al. |
| 7,634,462 B2 | 12/2009 | Weyand et al. |
| 7,636,714 B1 | 12/2009 | Lamping |
| 7,660,737 B1 | 2/2010 | Lim et al. |
| 7,660,815 B1 | 2/2010 | Scofield et al. |
| 7,676,462 B2 | 3/2010 | Kirkland |
| 7,676,517 B2 | 3/2010 | Hurst-Hiller et al. |
| 7,685,192 B1 | 3/2010 | Scofield et al. |
| 7,739,357 B2 | 6/2010 | Gould |
| 7,752,326 B2 | 7/2010 | Smit |
| 7,756,855 B2 | 7/2010 | Ismalon |
| 7,774,335 B1 | 8/2010 | Scofield et al. |
| 7,774,339 B2 | 8/2010 | White et al. |
| 7,774,348 B2 | 8/2010 | Delli Santi et al. |
| 7,788,252 B2 | 8/2010 | Delli Santi et al. |
| 7,788,276 B2 | 8/2010 | Peng et al. |
| 7,792,813 B2 | 9/2010 | Selberg |
| 7,792,832 B2 | 9/2010 | Poltorak |
| 7,793,326 B2 | 9/2010 | McCoskey et al. |
| 7,797,421 B1 | 9/2010 | Scofield et al. |
| 7,805,339 B2 | 9/2010 | Ashkenazi et al. |
| 7,805,450 B2 | 9/2010 | Delli Santi et al. |
| 7,809,548 B2 * | 10/2010 | Mihalcea et al. ............... 704/1 |
| 7,809,721 B2 | 10/2010 | Putivsky et al. |
| 7,810,119 B2 | 10/2010 | Johnson |
| 7,813,967 B2 | 10/2010 | Kopelman et al. |
| 7,814,097 B2 | 10/2010 | Smith et al. |
| 7,822,774 B2 | 10/2010 | Craswell et al. |
| 7,831,582 B1 | 11/2010 | Scofield et al. |
| 7,844,599 B2 | 11/2010 | Kasperski et al. |

(56) References Cited

U.S. PATENT DOCUMENTS

| | | | |
|---|---|---|---|
| 7,856,617 B2 | 12/2010 | Szlam | |
| 7,870,147 B2 | 1/2011 | Bailey et al. | 707/767 |
| 7,890,521 B1 | 2/2011 | Grushetskyy et al. | |
| 7,917,528 B1 | 3/2011 | Dave et al. | |
| 7,925,498 B1 | 4/2011 | Baker et al. | |
| 7,962,479 B2 | 6/2011 | Jones et al. | |
| 8,065,168 B2 | 11/2011 | Szlam | |
| 8,073,868 B2 | 12/2011 | Lavi | 707/779 |
| 8,135,729 B2 | 3/2012 | Brewer et al. | 707/767 |
| 2001/0042064 A1 | 11/2001 | Davis et al. | |
| 2002/0047859 A1 | 4/2002 | Szlam et al. | |
| 2002/0073088 A1 | 6/2002 | Beckmann et al. | |
| 2002/0078045 A1 | 6/2002 | Dutta | |
| 2002/0100040 A1 | 7/2002 | Bull | |
| 2002/0107853 A1 | 8/2002 | Hofmann | |
| 2002/0111994 A1 | 8/2002 | Raghunandan | |
| 2002/0123912 A1 | 9/2002 | Subramanian et al. | |
| 2002/0133483 A1 | 9/2002 | Klenk et al. | |
| 2002/0145624 A1 | 10/2002 | Szlam et al. | |
| 2002/0161747 A1 | 10/2002 | Li et al. | |
| 2002/0169764 A1 | 11/2002 | Kincaid et al. | |
| 2002/0181398 A1 | 12/2002 | Szlam | |
| 2002/0198882 A1 | 12/2002 | Linden et al. | |
| 2003/0020745 A1* | 1/2003 | Kawaguchi et al. | 345/733 |
| 2003/0058277 A1 | 3/2003 | Bowman-Amuah | |
| 2003/0061206 A1 | 3/2003 | Qian | |
| 2003/0123443 A1 | 7/2003 | Anwar | |
| 2003/0126136 A1* | 7/2003 | Omoigui | 707/10 |
| 2003/0140313 A1 | 7/2003 | Smith | |
| 2003/0220917 A1 | 11/2003 | Copperman et al. | |
| 2004/0010566 A1 | 1/2004 | Monteverde | |
| 2004/0034652 A1 | 2/2004 | Hofmann | |
| 2004/0034799 A1 | 2/2004 | Mikami | |
| 2004/0068486 A1 | 4/2004 | Chidlovskii | |
| 2004/0073485 A1 | 4/2004 | Liu et al. | |
| 2004/0111310 A1 | 6/2004 | Szlam et al. | |
| 2004/0133434 A1 | 7/2004 | Szlam et al. | |
| 2004/0153472 A1 | 8/2004 | Rieffanaugh | |
| 2004/0158559 A1 | 8/2004 | Poltorak | |
| 2004/0249709 A1 | 12/2004 | Donovan et al. | |
| 2004/0249809 A1 | 12/2004 | Ramani et al. | |
| 2005/0027691 A1 | 2/2005 | Brin et al. | |
| 2005/0033657 A1 | 2/2005 | Herrington et al. | |
| 2005/0055341 A1 | 3/2005 | Haar et al. | |
| 2005/0076003 A1 | 4/2005 | DuBose et al. | |
| 2005/0076097 A1 | 4/2005 | Sullivan et al. | |
| 2005/0086283 A1 | 4/2005 | Marshall | |
| 2005/0091204 A1 | 4/2005 | Melman | |
| 2005/0108001 A1 | 5/2005 | Aarskog | |
| 2005/0114322 A1 | 5/2005 | Melman | |
| 2005/0114324 A1 | 5/2005 | Mayer | |
| 2005/0131762 A1 | 6/2005 | Bharat et al. | |
| 2005/0144158 A1 | 6/2005 | Capper et al. | |
| 2005/0149494 A1 | 7/2005 | Lindh et al. | |
| 2005/0171760 A1 | 8/2005 | Tinkler | |
| 2005/0210024 A1 | 9/2005 | Hurst-Hiller et al. | |
| 2005/0216434 A1 | 9/2005 | Haveliwala et al. | |
| 2005/0222989 A1 | 10/2005 | Haveliwala et al. | |
| 2005/0234881 A1 | 10/2005 | Burago et al. | |
| 2005/0234904 A1 | 10/2005 | Brill et al. | |
| 2005/0283468 A1 | 12/2005 | Kamvar et al. | |
| 2006/0026013 A1 | 2/2006 | Kraft | |
| 2006/0047643 A1 | 3/2006 | Chaman | |
| 2006/0059134 A1 | 3/2006 | Palmon et al. | |
| 2006/0074883 A1 | 4/2006 | Teevan et al. | |
| 2006/0101074 A1 | 5/2006 | Cancilla et al. | |
| 2006/0115145 A1 | 6/2006 | Bishop et al. | |
| 2006/0161520 A1 | 7/2006 | Brewer et al. | |
| 2006/0161553 A1 | 7/2006 | Woo | |
| 2006/0167842 A1 | 7/2006 | Watson | |
| 2006/0179051 A1 | 8/2006 | Whitney et al. | |
| 2006/0184512 A1 | 8/2006 | Kohanim et al. | |
| 2006/0218146 A1 | 9/2006 | Bitan et al. | |
| 2006/0242129 A1 | 10/2006 | Libes et al. | |
| 2006/0248062 A1 | 11/2006 | Libes et al. | |
| 2006/0253427 A1 | 11/2006 | Wu et al. | |
| 2006/0259481 A1 | 11/2006 | Handley | |
| 2006/0282328 A1 | 12/2006 | Gerace et al. | |
| 2006/0294084 A1 | 12/2006 | Patel et al. | |
| 2007/0005590 A1 | 1/2007 | Thrasher | |
| 2007/0011154 A1 | 1/2007 | Musgrone et al. | |
| 2007/0011668 A1 | 1/2007 | Wholey et al. | |
| 2007/0043617 A1 | 2/2007 | Stein et al. | |
| 2007/0043688 A1 | 2/2007 | Kountz et al. | |
| 2007/0050339 A1 | 3/2007 | Kasperski et al. | |
| 2007/0061301 A1 | 3/2007 | Ramer et al. | |
| 2007/0073694 A1 | 3/2007 | Picault et al. | |
| 2007/0073756 A1 | 3/2007 | Manhas et al. | |
| 2007/0083506 A1 | 4/2007 | Liddell et al. | |
| 2007/0121843 A1 | 5/2007 | Atazky et al. | |
| 2007/0150537 A1 | 6/2007 | Graham | |
| 2007/0162396 A1 | 7/2007 | Goldman et al. | |
| 2007/0162422 A1 | 7/2007 | Djabarov | |
| 2007/0174255 A1 | 7/2007 | Sravanapudi et al. | |
| 2007/0198474 A1 | 8/2007 | Davidson et al. | |
| 2007/0198506 A1 | 8/2007 | Attaran Rezaei et al. | |
| 2007/0198526 A1 | 8/2007 | Pitkow | |
| 2007/0203887 A1 | 8/2007 | Dynin | |
| 2007/0203929 A1 | 8/2007 | Bollvar | |
| 2007/0208630 A1 | 9/2007 | Chatter et al. | |
| 2007/0214123 A1 | 9/2007 | Messer et al. | |
| 2007/0244866 A1 | 10/2007 | Mishkanian et al. | |
| 2007/0250351 A1 | 10/2007 | Szlam | |
| 2007/0250500 A1 | 10/2007 | Ismalon | |
| 2007/0250511 A1 | 10/2007 | Endler et al. | |
| 2007/0255702 A1 | 11/2007 | Orme | |
| 2007/0260646 A1 | 11/2007 | Szlam | |
| 2007/0266019 A1 | 11/2007 | Lavi | |
| 2007/0276829 A1 | 11/2007 | Wang et al. | |
| 2007/0282785 A1 | 12/2007 | Fayyad et al. | |
| 2008/0004959 A1 | 1/2008 | Tunguz-Zawislak et al. | |
| 2008/0016034 A1 | 1/2008 | Guha et al. | |
| 2008/0065617 A1 | 3/2008 | Burke et al. | |
| 2008/0070209 A1 | 3/2008 | Zhuang et al. | |
| 2008/0091670 A1 | 4/2008 | Ismalon | |
| 2008/0104026 A1 | 5/2008 | Koran | |
| 2008/0114751 A1 | 5/2008 | Cramer et al. | |
| 2008/0137668 A1 | 6/2008 | Rodriguez et al. | |
| 2008/0140643 A1 | 6/2008 | Ismalon | |
| 2008/0172363 A1 | 7/2008 | Wang et al. | |
| 2008/0172380 A1 | 7/2008 | Czyz et al. | |
| 2008/0215416 A1 | 9/2008 | Ismalon | |
| 2008/0275861 A1 | 11/2008 | Baluja et al. | 707/5 |
| 2008/0288596 A1 | 11/2008 | Smith et al. | |
| 2008/0300937 A1 | 12/2008 | Allen | |
| 2009/0119261 A1 | 5/2009 | Ismalon | |
| 2009/0144234 A1 | 6/2009 | Sharif et al. | |
| 2009/0228296 A1 | 9/2009 | Ismalon | |
| 2009/0241065 A1 | 9/2009 | Costello | |
| 2009/0241066 A1 | 9/2009 | Costello | |
| 2009/0277556 A1* | 11/2009 | Aoyama | 152/527 |
| 2009/0288012 A1* | 11/2009 | Hertel et al. | 715/738 |
| 2010/0049770 A1 | 2/2010 | Ismalon | |
| 2010/0070898 A1* | 3/2010 | Langlois et al. | 715/769 |
| 2010/0228710 A1 | 9/2010 | Imig et al. | |
| 2011/0035403 A1 | 2/2011 | Ismalon | |
| 2011/0040619 A1* | 2/2011 | Jebara et al. | 705/14.46 |

FOREIGN PATENT DOCUMENTS

| | | |
|---|---|---|
| WO | 01/20521 C1 | 1/2001 |
| WO | 01/20521 A2 | 3/2001 |
| WO | 01/46830 A1 | 6/2001 |
| WO | 01/46830 C1 | 11/2002 |
| WO | WO 2007/124430 | 11/2007 |

OTHER PUBLICATIONS

Chandalia et al., "Re-ranking Search Results Based on Perturbation of Concept-Association Graphs," Apr. 2006.

Dalmau et al., "Integrating Thesaurus Relationships Into Search and Browse in an Online Photograph Collection," Library Hi Tech, vol. 23 No. 3, Aug. 13, 2004, pp. 425-452.

(56) References Cited

OTHER PUBLICATIONS

An Office Action dated Jul. 31. 2012, which issued during the prosecution of U.S. Appl. No. 12/491,451.
An Office Action dated Aug. 23, 2012, which issued during the prosecution of U.S. Appl. No. 12/801,534.
Office Action for U.S. Appl. No. 12/397,510 dated Dec. 28, 2012.
Anick et al., "Interactive Document Retrieval using Faceted Terminological Feedback," HICSS 2:2036 (1999).
Gauch et al., "An Expert System for Automatic Query Reformulation" (1993).
Gauch et al., "A Corpus Analysis Approach for Automatic Query Expansion and Its Extension to Multiple Databases," ACM Transactions on Information System, vol. 17, No. 3, pp. 250-269 (Jul. 1999).
Koutrika et al., "A Unified User Profile Framework for Query Disambiguation and Personalization," PIA 2005: 44-53 (Jul. 24-5, 2005).
Hoeber et al., "Visualization Support for Interactive Query Refinement," Department of Computer Science, University of Regina, Regina, Saskatchewan, Canada (Sep. 2005).
Mena et al., "Observer: An Approach for Query Processing in Global Information Systems Based on Interoperation Across Pre-Existing Ontologies," Distributed and Parallel Databases, 8, 233-271 (Apr. 2000).
Smyth et al., "Exploiting Query Repetition and Regularity in an Adaptive Community-Based Wed Search Engine," User Modeling and User-Adapted Interaction 14:383-423 (2004).
Bakshi and Karger Semantic web applications, 2005.
Jansenand McNeese Evaluating the effectiveness of and patterns of interactions pp. 1480-1503, 2005.
Beeferman and Berger Agglomerative clustering of a search engine query log , pp. 407-416, 2000.
Dzeng and Changlanceg Learning search keywords for search procurement, 2004.
Huang et al. Relevant term suggestion, pp. 638-649, 2003.
Jones et al. Generating query substitutions, 2006.
Storey et al. The role of user profiles in context aware query processing, pp. 51-63, 2004.
Ye et al. Towards lightweight application integration based on mashup, 2009 Congress on Services—I.
Birman et al. Building collaboration applications, 2009 IEEE International Conference on Web services.
Sahami and Heilman A web based kernel function for matching short text snippets, pp. 2-9, 2005.
Fluit Autofocus semantic search for the desktop, 2005 IEEE.
Li et al. A new approach to query expansion, pp. 2302-2306, Aug. 2005.
Woolston, Pro Ajax and the NET 2 0 Platform, 2006.
Sugiyama et al. Adaptive Web Search Based on User Profile Constructed Without Any Effort from Users, 2004.
Valentine, Google Suggest Tool Beta-Amazing, Dec. 2004.
Gretzel and Wober, Intelligent search support ISBN 3-211-20669-8, 2004.
Joshi and Motwani Keyword generation for search engine advertising, ISBN 0-7695-2702-7 pp. 490-496, 2006.
Lu et al. Extending a Web Browser with Client-Side Mining, pp. 166-177, 2003.
Oliveira et al. Interactive Query Expansion in a Meta-search Engine, pp. 50-57, 1999.
Smeaton Relevance Feedback and Query Expansion for Searching the Web A Model for Searching a Digital Library, ISBN 3-540-63554-8, Sep. 1997.
Sunayama et al. Refining search expression by discovering hidden users interests, pp. 186-197, 1998.
Chen et al. Internet browsing and searching, pp. 582-603, 1998.
Lovic et al. Enhancing search engine performance using expert systems, 2006 IEEE.
Scholer and Williams Query association for effective retrieval, pp. 324-331, 2002.
Stenmark To search is great, Oct. 1997.

Cooper and Byrd Obiwan A Visual Interface for Prompted Query Refinement, 1998 IEEE.
Glance Community Search Assistant, pp. 91-96, 2001.
Ubiquitous Advertising on the Merging Advertisement on the Browser. Youji Kohda and Susumu Endo. Fifth International World Wide Web Conference. (May 6-10, 1996).
"Searchable Banners: The Next Wave for Online Databases" (Borrell Associates Inc., Nov. 2005).
David Berkowitz, "Banner Ads: The New Search Engine", SearchINSIDER (Dec. 6, 2005).
http://developers.evrsoft.com/forum/showthread.php?t=2039, Oct. 2003.
Unintrusive Customization Techniques for Web Advertising. Marc Langheinrich et al. Computer Networks. vol. 31, No. 11-16, pp. 1259-1272. (Published 1999).
Recommending from Content: Preliminary Results from an E-Commerce Experiment, Mark Rosenstein and Carol Lochbaum. CHI 2000. Published Apr. 1-6, 2000, The Hague, The Netherlands.
J. Matthews, "Automating Ad Intelligence," SiliconValley, downloaded from siliconvalley.internet.com/news/article.php/3531.sub.--, (Jun. 20, 2000) 4 pgs.
International Preliminary Report on Patentability (IPRP) dated Oct. 30, 2008, which issued during the prosecution of Applicant's PCT/US2007/067103.
Guy Shani, et al., Establishing User Profiles in MediaScout recommender system, 2007 (Affinity).
Pamela Parker, ClickZ, Interactive Ads play Big Role in "Miniority Report" Jun. 12, 2002 (InteractiveAd).
Internet Archives, www.waybackmachine-www.cnn.com (CNN2005).
An English Abstract of CN 1967534A to Wei Xincheng.
Jan Pedersen et al., Snippet Search: a Single Phrase Approach to Text Access (1991) (Xerox Parc) In Proceedings of the 1991 Joint Statistical Meetings. American Statistical Association.
International Search Report together with Written opinion both dated Jul. 21, 2008, which issued during the prosecution of Applicant's PCT/US2007/067103.
Personalize Your Google Search Results, GoogleTutor.com ,May 2005.
An Office Action dated Jan. 21, 2011, which issued during the prosecution of U.S. Appl. No. 11/870,999.
An Office Action dated Jun. 30, 2010, which issued during the prosecution of U.S. Appl. No. 11/870,999.
An Office Action dated Nov. 3, 2009, which issued during the prosecution of U.S. Appl. No. 11/846,213.
An Office Action dated Mar. 5, 2010 which issued during the prosecution of U.S. Appl. No. 11/846,213.
An Office Action dated Nov. 26, 2008 which issued during the prosecution of U.S. Appl. No. 11/633,461.
An Office Action dated Jul. 21, 2009 which issued during the prosecution of U.S. Appl. No. 11/633,461.
An Office Action dated Nov. 10, 2010 which issued during the prosecution of U.S. Appl. No. 12/023,564.
An Office Action dated Jul. 11, 2011 which issued during the prosecution of U.S. Appl. No. 12/023,564.
An Office Action dated Jun. 13, 2011 which issued during the prosecution of U.S. Appl. No. 12/253,087.
An Office Action dated Mar. 5, 2012 which issued during the prosecution of U.S. Appl. No. 12/253,087.
An Office Action dated Mar. 31, 2011 which issued during the prosecution of U.S. Appl. No. 12/397,510.
An Office Action dated Dec. 1, 2011 which issued during the prosecution of U.S. Appl. No. 12/397,510.
An Office Action dated Mar. 16, 2012 which issued during the prosecution of U.S. Appl. No. 12/491,451.
U.S. Office Action dated Mar. 5, 2012, issued in corresponding U.S. Appl. No. 12/253,087.
U.S. Office Action dated Mar. 16, 2012, issued in corresponding U.S. Appl. No. 12/491,451.
Search Engine Lowdown Apr. 6, 2005—"Google Testing 'Alternate Searches'—Confirmed," Search Engine Lowdown, http://www.searchenginelowdown.com/2005/04/google-testing-alternate-

(56) References Cited

OTHER PUBLICATIONS searches.html crawled by the Internet Archive on Apr. 6, 2005 and available as of Sep. 7, 2013 at web.archive.org.

A non-final Office Action dated Sep. 10, 2013 issued in U.S. Appl. No. 12/023,564.

A non-final Office Action dated Oct. 3, 2013 issued in U.S. Appl. No. 12/253,087.

A final Office Action dated Oct. 21, 2013 issued in U.S. Appl. No. 12/397,510.

Search Engine Roundtable Jul. 12, 2005—"Embedded Alternate Searches," Search Engine Roundtable, http://web.archive.org/web/20050714021509/http:/www.seroundtable.com/archives/002200.html crawled by Internet Archive on Sep. 10, 2013 and available as of Sep. 10, 2013 at web.archive.org.

* cited by examiner

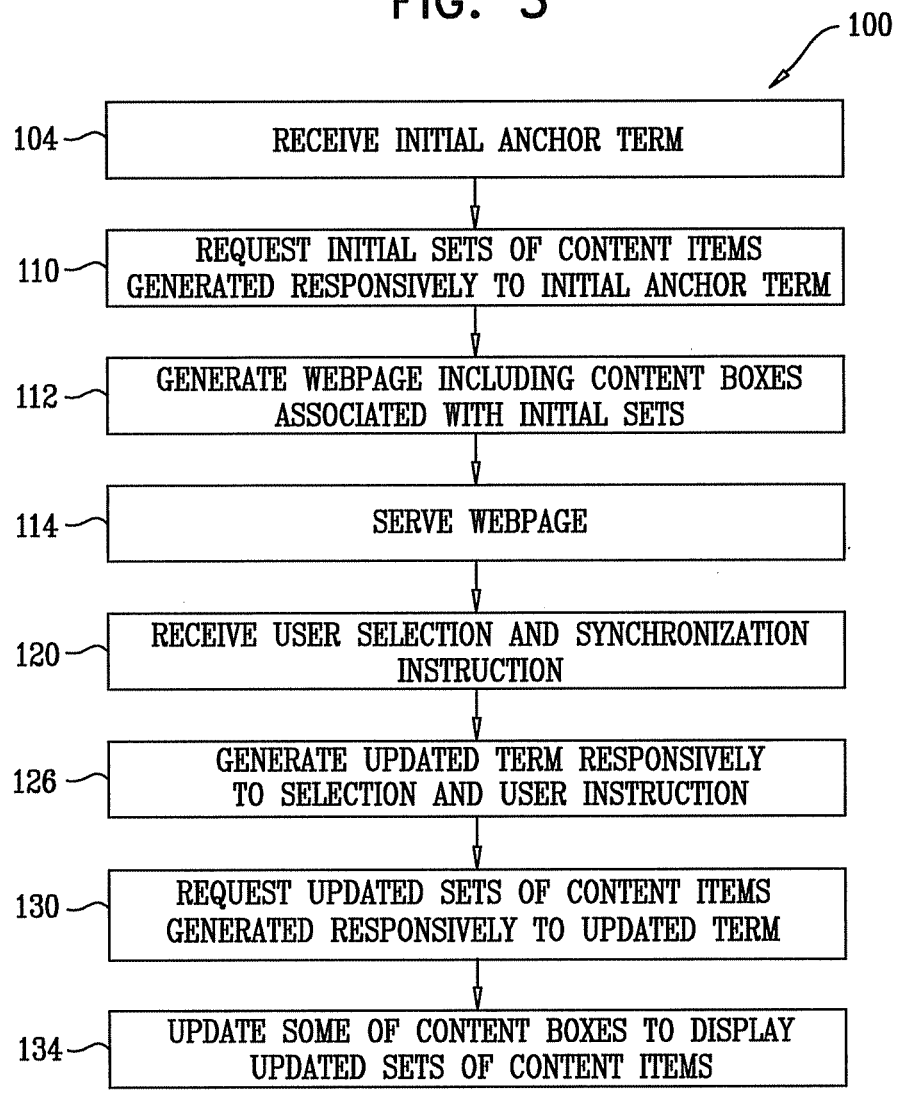

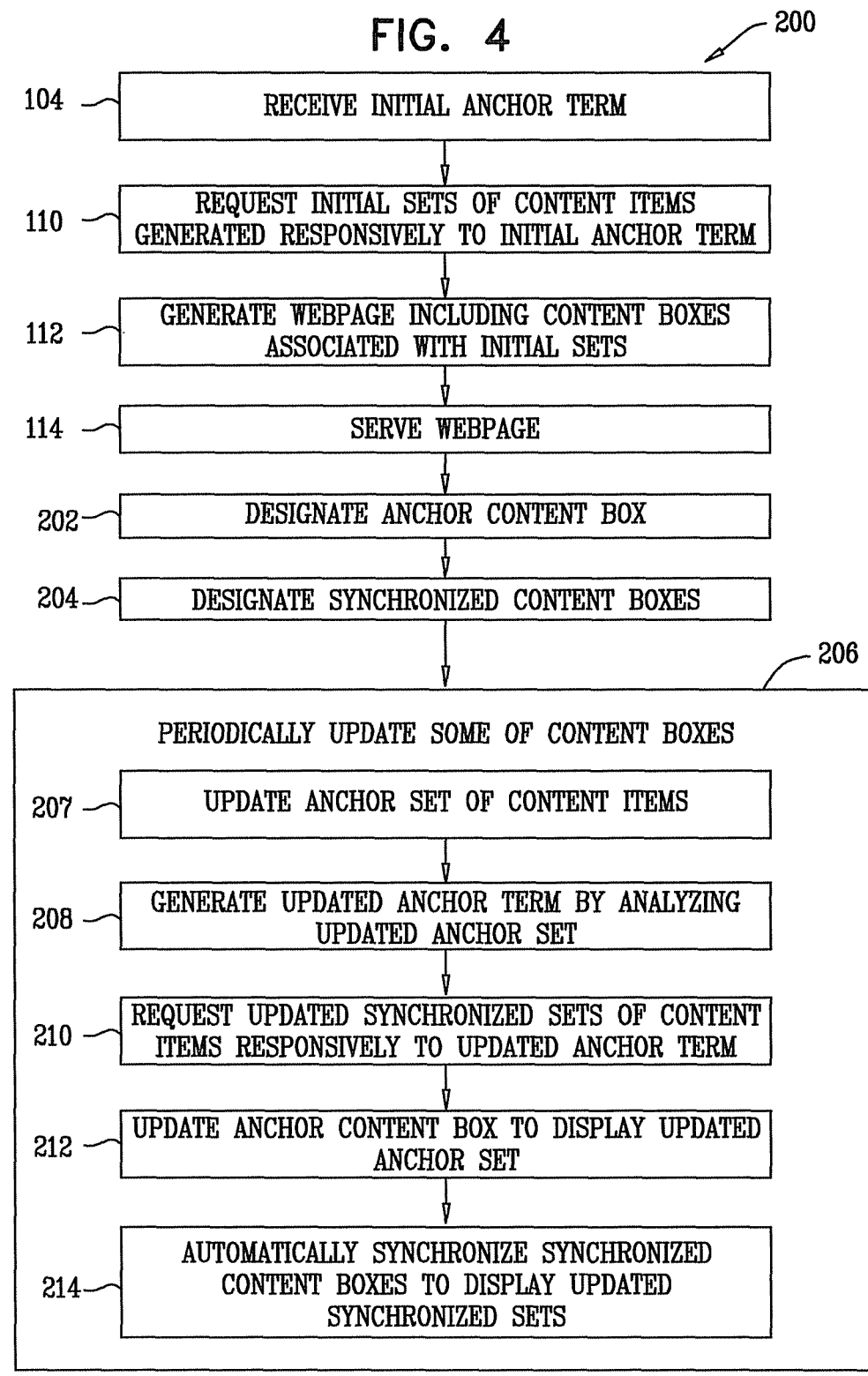

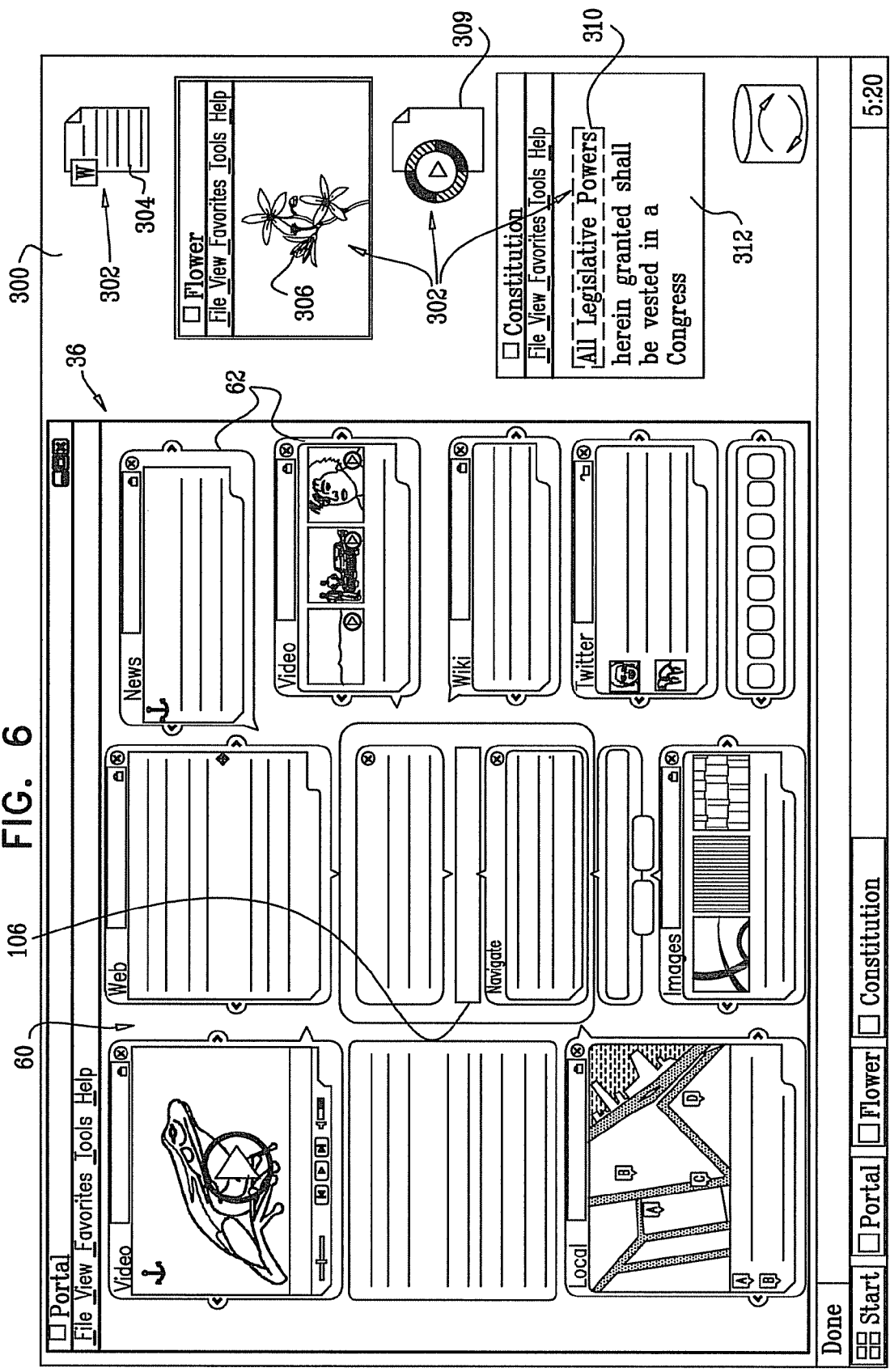

ANCHORING FOR CONTENT SYNCHRONIZATION

CROSS-REFERENCE TO RELATED APPLICATIONS

The present application claims the benefit of U.S. Provisional Application 61/296,116, filed Jan. 19, 2010, entitled, "Anchoring for content synchronization," which is assigned to the assignee of the present application and is incorporated herein by reference.

FIELD OF THE APPLICATION

The present invention relates generally to presentation of online content, and specifically to techniques for aggregating and displaying content of interest from a plurality of online sources.

BACKGROUND OF THE APPLICATION

Web portals aggregate and present information from a plurality of online sources. Portals typically offer services such as search, e-mail, news, stock quotes, and web (news) feeds.

SUMMARY OF APPLICATIONS

In some embodiments of the present invention, a portal server system serves a plurality of content areas for display on a webpage. The content areas display respective content items requested from respective one or more online content sources. The portal server system synchronizes the content areas with one another, either automatically or in response to a user instruction to do so. The content areas typically are delineated on the webpage as boxes or other regions having borders. Typically, the content areas display content of different respective categories, such as news content, video content, search content, social content, chat content, and blog content. For some applications, the portal server system periodically automatically updates the content items displayed in one or more of the content areas, typically without requiring the webpage to be again served in its entirety. The portal server system thus presents the user with streamed realtime or near realtime content. The portal server system provides a dynamic user experience, in which content in the content areas remains up-to-date, relevant to the user, and synchronized among some or all of the content areas.

For some applications, the system synchronizes the content areas by providing an anchor term, which may or may not be displayed to the user on the webpage. The system requests, from the online content sources, respective content items that are related to the anchor term. Because the system uses the same anchor term for requesting different categories of content from the online content sources, the content areas display respective content items that are related to, although different from, one another. For these applications, the system thus provides the user with a content-rich experience that, at any given instant, often focuses on a single topic, including content related to the topic from a variety of different online sources. Often content of varying categories is provided in the different content areas. The user interface thus allows the user to quickly learn about various aspects of the currently-selected topic while viewing the webpage, to shift the focus as desired, and/or to explore content of particular interest in more depth, such as by clicking on a hyperlink provided by the content.

For example, the content areas may include one or more of the following, each of which display respective different categories of content:

- a video content area, which displays video clips regarding the anchor term, requested from one or more video sharing websites;
- a news content area, which displays news items regarding the anchor term, requested from one or more news websites;
- a search content area, which displays search results regarding the anchor term, requested from one or more search websites;
- a site search content area, which displays search results regarding the anchor term, requested from a search facility of a website that hosts the webpage that displays the content areas;
- a social updates content area, which displays social updates regarding the anchor term, requested from one or more social networking sites;
- a chat content area, which displays messages (e.g., instant messages) regarding the anchor term, requested from one or more instant messaging or chat sites;
- an advertisement content area, which displays advertisements associated with the anchor term, requested from one or more ad servers;
- a blog content area, which displays blog entries regarding the anchor term, requested from one or more blog sites;
- an encyclopedia content area, which displays an encyclopedia entry (typically abstracted) regarding the anchor term, typically requested from one or more wiki websites or other encyclopedia websites;
- an image content area, which displays images regarding the anchor term, requested from one or more image search websites;
- a map content area, which displays maps regarding the anchor term, requested from one or more mapping websites;
- a finance content area, which displays financial information regarding the anchor term (e.g., stock quotes), requested from one or more financial websites;
- a forum (message) content area, which displays posted messages regarding the anchor term, requested from one or more Internet forums (message boards); and/or
- an association content area, which displays other terms associated with the anchor term, requested from one or more search websites.

Alternatively or additionally, for some applications, one or more of the content areas (such as those listed immediately above) display content regarding a term other than the anchor term. The term may be generated by the system in response to a user instruction to synchronize one or more of the content areas with content of another content area, such as described hereinbelow.

More generally, the content areas may display any sort of content available online.

For some applications, the content initially or subsequently displayed in one or more of the content areas is not related to the anchor term.

For some applications, the user instructs the portal server system to synchronize at least some of the content areas, in order to focus some or all of the content areas on content currently of interest to the user. In order to provide this instruction, the user may select one of the content items displayed in a content area, and indicate which of the content areas are to be synchronized with the selected content item. For example, the user may drag the selected content item (or a graphical element displayed in association with the content item) into one of the content areas, or into an anchor area displayed on the webpage separately from the content areas. In response to the user's selection and instruction, the portal server system synchronizes the indicated content areas with the selected content item. To do so, the system generates an updated term (optionally, an updated anchor term) based on the selected content item, and requests, from the online content sources, updated content items related to (e.g., generated responsively to) the updated term. The system updates the indicated content areas to display the updated content items.

The user may instruct the portal server system synchronize all of the content areas (i.e., perform a global synchronization), all of the content areas other than the area associated with the selected content item, or a particular one of the other content areas. For example, the user may instruct the portal server system to synchronize all of the content areas by dragging the content item (or a graphical element displayed in association with the content item) into the anchor area. Alternatively, the user may instruct the portal server system to synchronize a particular content area by dragging the content item (or associated graphical element) into the particular area, such as if the user is interested in more information regarding the content item of the category displayed in the particular area.

As mentioned above, for some applications, the portal server system periodically automatically updates the content items displayed in one or more of the content areas, typically without requiring the webpage to be again served in its entirety. The portal server system performs such automatic updating without requiring an action to be performed by the user, e.g., the user does not need to click on or otherwise activate an "update" or "search" button or icon, and the user does not need to refine a search. The portal server system thus presents the user with streamed realtime or near realtime content, e.g., at least once every minute. For some applications, the portal server system periodically requests updated content items from the respective one or more online content sources, and updates the respective content areas to display the updated content items. The displayed content may change, for example, because the online content sources index new content. Alternatively or additionally, for some applications, the portal server system updates the content items displayed in one or more of the content areas by displaying a different subset of the content items previously received from the respective one or more online content sources. For example, the portal server system may automatically change the ranking of the content items in a given content area, for example, based on interactions of other users with the content, such as other users on the Web and/or other users of the portal server system. Because only a small subset that includes the highest-ranked content items received from a given set of one or more online content sources is typically displayed in a content area, changing the ranking generally causes a different subset of the content items to be displayed.

For some applications, one of the content areas is designated as an anchor content area (either by the user, or by the system), and the system automatically synchronizes at least some of the other content areas with this anchor content area. To perform such synchronization, the portal server system typically updates the content items displayed in the anchor content area by periodically requesting the content items from the respective one or more online content sources. The system generates an updated anchor term by analyzing the updated anchor content items. The system requests updated content items from the other online content sources responsively to the updated anchor term, and automatically synchronizes the other content areas with the anchor content area by updating the other content areas to display their respective updated content items.

As a result of this synchronization, the synchronized content areas display content of potential relevance to the user, in light of the content currently displayed in the anchor content area. As the content in the anchor content area changes over time, the content in the synchronized content areas is automatically updated to be of continuing relevance. The content displayed in the synchronized content areas thus may serve to provide the user with a better understanding of the content being streamed in the anchor content area, such as by providing related information, optionally of different content categories.

For example, the user may anchor a news content area that displays news items regarding the anchor term. The portal server system periodically updates the news items in the anchor content area by requesting updated news items from a news server. The system analyzes the content of the updated news items, and updates one or more of the other content areas to display content based on the analysis. For example, the system may synchronize a video content area to display video clips related to the latest news items, and/or a wiki content area to display an abstracted wiki entry regarding a topic related to the latest news items.

There is therefore provided, in accordance with an application of the present invention, a computer-implemented method including:

receiving from a web browser, by a server system via a network, an indication of dragging, by a user of the web browser, of an element displayed on a webpage displayed by the web browser, and dropping, by the user, of the element into a content area displayed on the webpage, the element selected from the group consisting of: a first content item displayed at a location on the webpage other than in the content area, and a graphical element displayed in association with the first content item; and responsively to the indication, causing, by the server system, the web browser to display, in the content area, at least a portion of a set of one or more second content items related to the first content item.

For some applications, causing the web browser to display includes serving, to the web browser, the at least a portion of the set of second content items for display in the content area. For some applications, serving includes requesting and receiving, by the server system, from one or more online content sources, the set of one or more second content items. For some applications, requesting and receiving includes generating a term related to the first content item, which term includes one or more keywords, and requesting and receiving, from the online content sources, the set of one or more second content items generated in response to the term.

For some applications, causing the web browser to display includes sending an instruction to the web browser to request and receive, from one or more online content sources, the set of the one or more second content items, and to display the at least a portion of the set of second content items in the content area. For some applications, sending the instruction includes generating a term related to the first content item, which term includes one or more keywords, and sending the instruction to the web browser to request and receive, from the online content sources, the set of the one or more second content items generated in response to the term.

For some applications, the element is the first content item, and receiving the indication includes receiving the indication of dragging of the first content item, and dropping of the first content item into the content area.

For some applications, the element is the graphical element displayed in association with the first content item, and receiving the indication includes receiving the indication of dragging of the graphical element, and dropping of the graphical element into the content area.

For some applications, the set of one or more second content items is generated in response to a term related to the first content item, which term includes one or more keywords. For some applications, the term is generated responsively to an association graph associated with the first content item. For some applications, the term includes an association graph including the keywords as vertices.

For some applications, the content area is a first content area, and a second content area is displayed on the webpage separately from the first content area, which second content area includes the first content item.

For some applications, the first content item is one of a plurality of first content items, and receiving the indication of dragging includes receiving the indication of dragging of at least one of the first content items.

For some applications, the first content item is of a first content category, and the second content items are of a second content category different from the first content type, and each of the first and second content categories is selected from the group of categories consisting of: a video content category, a news content category, a search content category, a social updates content category, a chat content category, an advertisement content category, a blog content category, an encyclopedia content category, a map content category, a finance content category, a forum content category, and an association content category.

For some applications, the set of second content items includes advertising content.

For some applications, the method further includes serving the content area to the web browser.

For some applications, the set of second content items is received from an entity that does not control the server system, the entity selected from the group consisting of: an online retailer, an online publisher, and an online advertiser.

There is further provided, in accordance with an application of the present invention, a computer-implemented method including:

receiving, by a web browser running in a device, an indication of dragging, by a user of the web browser, of an element displayed on a webpage displayed by the web browser, and dropping, by the user, of the element into a content area displayed on the webpage, the element selected from the group consisting of: a first content item displayed at a location on the webpage other than in the content area, and a graphical element displayed in association with the first content item; and responsively to the indication, displaying in the content area, by the web browser, at least a portion of a set of one or more second content items related to the first content item.

For some applications, receiving further includes receiving, by the web browser, from at least one web server via a network, the content area for display on the webpage, and the first content item, and displaying includes receiving, by the web browser, via the network, the set of one or more second content items related to the first content item. For some applications, receiving the set of one or more second content items includes: sending, by the web browser, a request including an identifier of the first content item to the at least one web server; and, in response to the request, receiving, by the web browser, from the at least one web server, the set of one or more second content items related to the first content item. For some applications, receiving the set of one or more second content items includes: sending, by the web browser, a request including an identifier of the first content item to the at least one web server; in response to the request, receiving, by the web browser, from the at least one web server, a term related to the first content item, which term includes one or more keywords; and requesting and receiving, by the web browser, via the network, from one or more online content sources, the set of one or more second content items related to the term.

There is still further provided, in accordance with an application of the present invention, a computer-implemented method including:

receiving from a web browser, by a server system via a network, a selection, by a user of the web browser, of a graphical element displayed in association with a first content item displayed on a webpage displayed by the web browser at a location on the webpage other than in a content area; and responsively to the selection, causing, by the server system, the web browser to display, in the content area, at least a portion of a set of one or more second content items related to the first content item.

For some applications, causing the web browser to display includes serving, to the web browser, the at least a portion of the set of second content items for display in the content area. For some applications, serving includes requesting and receiving, by the server system, from one or more online content sources, the set of one or more second content items. For some applications, requesting and receiving includes generating a term related to the first content item, which term includes one or more keywords, and requesting and receiving, from the online content sources, the set of one or more second content items generated in response to the term.

For some applications, receiving the selection of the graphical element includes receiving, from the web browser, an indication of dragging, by a user of the web browser, of the graphical element into an anchor box displayed on the webpage separately from the content area. For some applications, causing the web browser to display includes sending an instruction to the web browser to request and receive, from one or more online content sources, the set of one or more second content items, and to display the at least a portion of the set of second content items in the content area. For some applications, sending the instruction includes generating a term related to the first content item, which term includes one or more keywords, and sending the instruction to the web browser to request and receive, from the online content sources, the set of one or more second content items generated in response to the term.

There is additionally provided, in accordance with an application of the present invention, a computer-implemented method including:

receiving, from a web browser, by a server system via a network, (a) a selection, by a user of the web browser, of a first content item displayed on a webpage displayed by the web browser, (b) a selection, by the user, of one or more of a plurality of content areas displayed on the webpage, and (c) an instruction, by the user, to synchronize the selected content areas with the selected first content item; and responsively to the selections and the instruction, causing, by the server system, the web browser to display, in the respective selected one or more content areas, at least portions of one or more sets of one or more second content items related to the first content item.

For some applications, causing the web browser to display includes serving, to the web browser, the at least portions of the sets of the one or more second content items for display in the respective selected one or more content areas. For some applications, serving includes requesting and receiving, by the server system, from one or more online content sources, the one or more sets of the one or more second content items. For some applications, requesting and receiving includes generating a term related to the first content item, which term includes one or more keywords, and requesting and receiving, from one or more online content sources, the one or more sets of the one or more second content items generated in response to the term.

For some applications, causing the web browser to display includes sending an instruction to the web browser to request and receive, from one or more online content sources, the one or more sets of the one or more second content items, and to display the at least portions of the sets of the one or more second content items in the respective selected one or more content areas. For some applications, sending the instruction includes generating a term related to the first content item, which term includes one or more keywords, and sending the instruction to the web browser to request and receive, from the online content sources, the one or more sets of the one or more second content items generated in response to the term.

For some applications, the method further includes serving the plurality of content areas to the web browser.

There is yet additionally provided, in accordance with an application of the present invention, a computer-implemented method including:

receiving, by a server system via a network, from a web browser that displays a webpage that displays a plurality of content areas, which display at least portions of sets of content items, respectively: (a) a selection, by a user of the web browser, of at least one of the displayed content items, and (b) an instruction, by the user, to synchronize one or more of the content areas with the selected content item; and responsively to the selection and the instruction, causing, by the server system, the web browser to display, in the one or more content areas to be synchronized, respective updated sets of content items that are related to at least one of the displayed content items selected by the user.

For some applications, causing the web browser to display includes serving, to the web browser, the at least portions of the updated sets of content items, for display in the one or more content areas, respectively.

For some applications, causing the browser to display includes sending an instruction to the web browser to (a) request and receive, from a plurality of online content sources, the respective updated sets of content items, and (b) display at least portions of the updated sets of content items in the one or more content areas, respectively.

For some applications, the method further includes, before receiving the selection and the instruction:

requesting and receiving, by the server system, from a plurality of online content sources, the respective sets of one or more content items generated by the online content sources in response to a term that includes one or more keywords; and serving, to the web browser, the plurality of content areas, for display on the webpage, which content areas display the at least portions of the sets of content items, respectively.

For some applications, causing the browser to display includes generating, by the server system, an updated term, and requesting and receiving, from the online content sources that respectively generated the sets of content items displayed by the one or more content areas, the respective updated sets of content items. For some applications, generating the updated term includes generating the updated term responsively to the selected at least one of the displayed content items.

For some applications, generating the updated term includes generating the updated term responsively to an association graph associated with the selected at least one of the displayed content items.

For some applications, the term includes an association graph including the respective keywords as vertices.

For some applications, the one or more content areas to be synchronized consist of exactly one of the content areas in which is displayed the selected at least one of the content items.

For some applications, the selected at least one of the content items is displayed in a first one of the content areas, and the one or more content areas include at least a second one of the content areas other than the first content area. For some applications, receiving the selection includes receiving an indication of dragging, by the user, of an element displayed on the webpage, the element selected from the group consisting of: the selected at least one of the content items, and a graphical element displayed in association with the selected at least one of the content items, and receiving the instruction includes receiving an indication of dropping, by the user, of the element into the second content area. For some applications, the set of content items displayed in the second content area includes advertising content.

For some applications,
the selected at least one of the content items is displayed in a first one of the content areas,
the one or more content areas to be synchronized include all of the content areas other than the first content area,
the webpage includes an anchor area separate from the content areas,
receiving the selection includes receiving an indication of dragging, by the user, of an element displayed on the webpage, the element selected from the group consisting of: the selected at least one of the content items, and a graphical element displayed in association with the selected at least one of the content items, and
receiving the instruction includes receiving an indication of dropping, by the user, of the element into the anchor area.

For some applications,
the selected at least one of the content items is displayed in a first one of the content areas,
the one or more content areas to be synchronized include all of the content areas, including the first content area,
the webpage includes an anchor area separate from the content areas,
receiving the selection and instruction includes receiving an indication of dragging, by the user, of an element displayed on the webpage, the element selected from the group consisting of: the selected at least one of the content items, and a graphical element displayed in association with the selected at least one of the content items, and
receiving the instruction includes receiving an indication of dropping, by the user, of the element into the anchor area.

For some applications, receiving the selection and instruction includes receiving the selection and instruction given by the user in a single action.

For some applications, receiving the selection includes receiving an indication of dragging, by the user, of an element displayed on the webpage, the element selected from the group consisting of: the selected at least one of the content items, and a graphical element displayed in association with the selected at least one of the content items, and receiving the instruction includes receiving an indication of dropping, by the user, of the element at a location on the webpage.

For some applications, at least one of the content items of the updated sets is received from an entity that does not control the server system, the entity selected from the group consisting of: an online retailer, an online publisher, and an online advertiser.

There is also provided, in accordance with an application of the present invention, a computer-implemented method including:

serving, by a server system to a web browser, for display on a webpage displayed by the web browser, a plurality of content areas, exactly one of which content areas is designated as an anchor content area that displays at least a portion of an anchor set of content items, and one or more of which content areas other than the anchor content area are designated as synchronized content areas that display at least portions of synchronized sets of content items, respectively; and causing, by the server system, the web browser to periodically update at least some of the content areas by the web browser periodically:

updating the anchor content area, by displaying therein at least a portion of an updated anchor set of content items received by the web browser, and automatically synchronizing the synchronized content areas with the anchor content area, by displaying in the synchronized content areas, respectively, at least portions of updated synchronized sets of content items received by the web browser and generated in response to an analysis of the updated anchor set of content items.

For some applications, causing the web browser to periodically update includes performing, by the server system, the analysis of the updated anchor set. For some applications, performing the analysis includes performing the analysis of the portion of the updated anchor set displayed in the anchor content area.

For some applications, causing the web browser to periodically update includes sending, by the server system, an instruction to the web browser to perform the analysis of the updated anchor set.

For some applications, causing the web browser to periodically update includes serving, by the server system, the at least a portion of the updated anchor set of content items for display in the anchor content area.

For some applications, causing the web browser to periodically update includes sending, by the server system, an instruction to the web browser to request and receive the at least a portion of the updated anchor set of content items for display in the anchor content area.

For some applications, serving the plurality of content areas includes requesting and receiving, by the server system, from a plurality of online content sources, the anchor set and synchronized sets of content items generated by the online content sources in response to a term that includes one or more keywords, and serving the anchor set and synchronized sets of content items to the web browser. For some applications, serving includes receiving the term from the user. For some applications, the webpage includes an anchor area separate from the content areas, and serving includes receiving the term from the user via the anchor area. For some applications, serving includes using, as the term, a popular or trendy term. For some applications, serving includes generating, by the server system, the term responsively to profile of the user. For some applications, requesting at least one the anchor and synchronized sets includes using a search facility of the one or more online content sources. For some applications, requesting at least one the anchor and synchronized sets includes using an application programming interface (API) provided by the one or more online content sources.

For some applications, causing the web browser to periodically update includes generating, by the server system, a term responsively to the analysis of the updated anchor set, which term includes one or more keywords, and the updated synchronized sets of content items are generated in response to the term.

For some applications, the updated synchronized sets of content items are generated in response to the analysis which identifies, for inclusion in the synchronized sets, content items that are related to the content items of the updated anchor set.

For some applications, the content items of the anchor set are of a first content category, and the content items of one of the synchronized sets are of a second content category different from the first content type, and each of the first and second content categories is selected from the group of categories consisting of: a video content category, a news content category, a search content category, a social updates content category, a chat content category, an advertisement content category, a blog content category, an encyclopedia content category, a map content category, a finance content category, a forum content category, and an association content category.

For some applications, automatically synchronizing includes automatically synchronizing at least a portion of the synchronized content areas once every one to five minutes.

For some applications, serving includes receiving a designation command from a user of the web browser, and designating the exactly one of the content areas as the anchor content area responsively to the user designation command.

For some applications, causing the web browser to periodically update includes receiving an instruction from the user to lock one of the one or more content areas, and, responsively to the instruction, withholding periodically updating the locked content area, while continuing to periodically update others of the one or more content areas.

For some applications, serving includes: ranking, by the server system, the content items of the anchor set; and selecting one or more of the highest-ranked content items as the at least a portion of the content items of the anchor set displayed in the anchor content area. For some applications, ranking includes ranking responsively to a profile selected from the group consisting of: a profile of the user, a profile of a community of users to which the user belongs, and a profile of all users.

For some applications, serving the content areas includes: providing at least one of the content areas with a search field; receiving a search query entered by the user into the search field; and updating the portion of the content items displayed in the content area responsively to the search query.

For some applications, serving the content areas includes receiving a request from the user to enlarge one of the content areas, and, responsively to the request, enlarging the one of the content areas and reducing respective sizes of others of the content areas.

For some applications, serving the content areas includes setting respective levels of prominence of at least some of the content areas responsively to respective levels of relevancy of the respective sources to the term.

For some applications, at least one of the content items includes video content.

For some applications, serving the content areas includes configuring at least one of the content areas to display exactly one of the content items.

For some applications, at least one of the content items of the updated synchronized sets is received from an entity that does not control the server system, the entity selected from the group consisting of: an online retailer, an online publisher, and an online advertiser.

There is further provided, in accordance with an application of the present invention, a computer-implemented method including:

receiving, by a web browser running in a device, a webpage including a plurality of content areas, exactly one of which content areas is designated as an anchor content area that displays at least a portion of an anchor set of content items, and one or more of which content areas other than the anchor content area are designated as synchronized content areas that display at least portions of synchronized sets of content items, respectively;

displaying the webpage on a display of the device; and periodically updating, by the web browser, at least some of the content areas by periodically:

updating the anchor content area, by displaying therein at least a portion of an updated anchor set of content items received by the web browser, and automatically synchronizing the synchronized content areas with the anchor content area, by displaying in the synchronized content areas, respectively, at least portions of updated synchronized sets of content items received by the web browser and generated in response to an analysis of the updated anchor set of content items.

There is still further provided, in accordance with an application of the present invention, a computer-implemented method including:

receiving from a web browser running in a window displayed in a graphical user interface (GUI), by a server system via a network, an indication of (a) dragging, by a user of the web browser, of an element associated with a first content item and displayed in the GUI at a location other than in the web browser, and (b) dropping, by the user, of the element into a content area displayed on the webpage; and responsively to the indication, causing, by the server system, the web browser to display, in the content area, at least a portion of a set of one or more second content items related to the first content item.

For some applications, the content item includes a document, and the element includes an icon that represents the document. For some applications, the content item is selected from the group of files consisting of: an image file, an audio file, and a video file, and the element includes an icon that represents the selected file. For some applications, the content item includes a document, and the element includes a portion of the document displayed in a window in the GUI.

There is additionally provided, in accordance with an application of the present invention, a computer-implemented method including:

receiving, by a web browser running in a window displayed in a graphical user interface (GUI) of a device, an indication of (a) dragging, by a user of the device, of an element associated with a first content item and displayed in the GUI at a location other than in the web browser, and (b) dropping, by the user, of the element into a content area displayed on the webpage; and responsively to the indication, displaying, by the web browser, in the content area, at least a portion of a set of one or more second content items related to the first content item.

There is yet additionally provided, in accordance with an application of the present invention, apparatus for use with a network, the apparatus including:

an interface; and a processor, which is configured to receive, via the interface, from a web browser, by a server system via a network, an indication of dragging, by a user of the web browser, of an element displayed on a webpage displayed by the web browser, and dropping, by the user, of the element into a content area displayed on the webpage, the element selected from the group consisting of: a first content item displayed at a location on the webpage other than in the content area, and a graphical element displayed in association with the first content item; and, responsively to the indication, cause the web browser to display, in the content area, at least a portion of a set of one or more second content items related to the first content item.

There is also provided, in accordance with an application of the present invention, apparatus that communicates with at least one web server via a network, the apparatus including:

a display; and a processor, which is configured to run a web browser that is configured to receive (a) a webpage, (b) from the at least one web server via the network, a content area for display on the webpage, and (c) a first content item for display at a location on the webpage other than in the content area; display the webpage on the display; receive an indication of dragging, by a user of the device, of an element an element displayed on the webpage, and dropping, by the user, of the element into the content area, the element selected from the group consisting of: the first content item, and a graphical element displayed in association with the first content item; responsively to the indication, receive, via the network, a set of one or more second content items related to the first content item; and display at least a portion of the set of second content items in the content area.

There is further provided, in accordance with an application of the present invention, apparatus for use with a network, the apparatus including:

an interface; and a processor, which is configured to serve, via the interface, a content area to a web browser for display on a webpage displayed by the web browser, which webpage displays a first content item at a location on the webpage other than in the content area; receive, from the web browser, a selection, by a user of the web browser, of a graphical element displayed in association with the first content item; and responsively to the selection, generate a term related to the first content item, which term includes one or more keywords; request and receive, via the network, from an online content source, a set of one or more second content items generated in response to the term; and serve, to the web browser via the interface, at least a portion of the set of second content items for display in the content area.

There is still further provided, in accordance with an application of the present invention, apparatus for use with a network, the apparatus including:

an interface; and a processor, which is configured to receive from a web browser, via the interface over the network, a selection, by a user of the web browser, of a graphical element displayed in association with a first content item displayed on a webpage displayed by the web browser at a location on the webpage other than in a content area; and, responsively to the selection, cause the web browser to display, in the content area, at least a portion of a set of one or more second content items related to the first content item.

There is additionally provided, in accordance with an application of the present invention, apparatus for use with a network, the apparatus including:

an interface; and a processor, which is configured to receive, from a web browser, via the interface over the network, (a) a selection, by a user of the web browser, of a first content item displayed on a webpage displayed by the web browser, (b) a selection, by the user, of one or more of a plurality of content areas displayed on the webpage, and (c) an instruction, by the user, to synchronize the selected content areas with the selected first content item; and, responsively to the selections and the instruction, cause the web browser to display, in the respective selected one or more content areas, at least portions of one or more sets of one or more second content items related to the first content item.

There is yet additionally provided, in accordance with an application of the present invention, apparatus for use with a network, the apparatus including:

an interface; and a processor, which is configured to receive, via the interface over the network, from a web browser that displays a webpage that displays a plurality of content areas, which display at least portions of sets of content items, respectively: (a) a selection, by a user of the web browser, of at least one of the displayed content items, and (b) an instruction, by the user, to synchronize one or more of the content areas with the selected content item; and, responsively to the selection and the instruction, cause the web browser to display, in the one or more content areas to be synchronized, respective updated sets of content items that are related to at least one of the displayed content items selected by the user.

There is also provided, in accordance with an application of the present invention, apparatus for use with a network, the apparatus including:

an interface; and a processor, which is configured to serve, via the interface over the network, to a web browser, for display on a webpage displayed by the web browser, a plurality of content areas, exactly one of which content areas is designated as an anchor content area that displays at least a portion of an anchor set of content items, and one or more of which content areas other than the anchor content area are designated as synchronized content areas that display at least portions of synchronized sets of content items, respectively; and cause the web browser to periodically update at least some of the content areas by the web browser periodically: updating the anchor content area, by displaying therein at least a portion of an updated anchor set of content items received by the web browser, and automatically synchronizing the synchronized content areas with the anchor content area, by displaying in the synchronized content areas, respectively, at least portions of updated synchronized sets of content items received by the web browser and generated in response to an analysis of the updated anchor set of content items.

There is further provided, in accordance with an application of the present invention, apparatus including:

a display; and a processor, which is configured to run a web browser that is configured to receive a webpage including a plurality of content areas, exactly one of which content areas is designated as an anchor content area that displays at least a portion of an anchor set of content items, and one or more of which content areas other than the anchor content area are designated as synchronized content areas that display at least portions of synchronized sets of content items, respectively; display the webpage on the display; and periodically update at least some of the content areas by periodically: updating the anchor content area, by displaying therein at least a portion of an updated anchor set of content items received by the web browser, and automatically synchronizing the synchronized content areas with the anchor content area, by displaying in the synchronized content areas, respectively, at least portions of updated synchronized sets of content items received by the web browser and generated in response to an analysis of the updated anchor set of content items.

There is still further provided, in accordance with an application of the present invention, a computer software product, including a tangible computer-readable medium in which program instructions are stored, which instructions, when read by a computer, cause the computer to receive from a web browser, via a network, an indication of dragging, by a user of the web browser, of an element displayed on a webpage displayed by the web browser, and dropping, by the user, of the element into a content area displayed on the webpage, the element selected from the group consisting of: a first content item displayed at a location on the webpage other than in the content area, and a graphical element displayed in association with the first content item; and, responsively to the indication, to cause the web browser to display, in the content area, at least a portion of a set of one or more second content items related to the first content item.

There is additionally provided, in accordance with an application of the present invention, a computer software product, including a tangible computer-readable medium in which program instructions are stored, which instructions, when read by a computer running a web browser, cause the web browser to receive an indication of dragging, by a user of the web browser, of an element displayed on a webpage displayed by the web browser, and dropping, by the user, of the element into a content area displayed on the webpage, the element selected from the group consisting of: a first content item displayed at a location on the webpage other than in the content area, and a graphical element displayed in association with the first content item; and, responsively to the indication, display, in the content area, at least a portion of a set of one or more second content items related to the first content item.

There is yet additionally provided, in accordance with an application of the present invention, a computer software product, including a tangible computer-readable medium in which program instructions are stored, which instructions, when read by a computer, cause the computer to receive from a web browser, via a network, a selection, by a user of the web browser, of a graphical element displayed in association with a first content item displayed on a webpage displayed by the web browser at a location on the webpage other than in a content area; and, responsively to the selection, cause the web browser to display, in the content area, at least a portion of a set of one or more second content items related to the first content item.

There is also provided, in accordance with an application of the present invention, a computer software product, including a tangible computer-readable medium in which program instructions are stored, which instructions, when read by a computer, cause the computer to receive, from a web browser, via a network, (a) a selection, by a user of the web browser, of a first content item displayed on a webpage displayed by the web browser, (b) a selection, by the user, of one or more of a plurality of content areas displayed on the webpage, and (c) an instruction, by the user, to synchronize the selected content areas with the selected first content item; and, responsively to the selections and the instruction, cause the web browser to display, in the respective selected one or more content areas, at least portions of one or more sets of one or more second content items related to the first content item.

There is further provided, in accordance with an application of the present invention, a computer software product, including a tangible computer-readable medium in which program instructions are stored, which instructions, when read by a computer, cause the computer to receive, via a network, from a web browser that displays a webpage that displays a plurality of content areas, which display at least portions of sets of content items, respectively: (a) a selection, by a user of the web browser, of at least one of the displayed content items, and (b) an instruction, by the user, to synchronize one or more of the content areas with the selected content item; and, responsively to the selection and the instruction, cause the web browser to display, in the one or more content areas to be synchronized, respective updated sets of content items that are related to at least one of the displayed content items selected by the user.

There is still further provided, in accordance with an application of the present invention, a computer software product, including a tangible computer-readable medium in which program instructions are stored, which instructions, when read by a computer, cause the computer to serving, to a web browser, for display on a webpage displayed by the web browser, a plurality of content areas, exactly one of which content areas is designated as an anchor content area that displays at least a portion of an anchor set of content items, and one or more of which content areas other than the anchor content area are designated as synchronized content areas that display at least portions of synchronized sets of content items, respectively; and cause the web browser to periodically update at least some of the content areas by the web browser periodically: updating the anchor content area, by displaying therein at least a portion of an updated anchor set of content items received by the web browser, and automatically synchronizing the synchronized content areas with the anchor content area, by displaying in the synchronized content areas, respectively, at least portions of updated synchronized sets of content items received by the web browser and generated in response to an analysis of the updated anchor set of content items.

There is additionally provided, in accordance with an application of the present invention, a computer software product, including a tangible computer-readable medium in which program instructions are stored, which instructions, when read by a computer running a web browser, cause the web browser to receive a webpage including a plurality of content areas, exactly one of which content areas is designated as an anchor content area that displays at least a portion of an anchor set of content items, and one or more of which content areas other than the anchor content area are designated as synchronized content areas that display at least portions of synchronized sets of content items, respectively; display the webpage on a display; and periodically update at least some of the content areas by periodically: updating the anchor content area, by displaying therein at least a portion of an updated anchor set of content items received by the web browser, and automatically synchronizing the synchronized content areas with the anchor content area, by displaying in the synchronized content areas, respectively, at least portions of updated synchronized sets of content items received by the web browser and generated in response to an analysis of the updated anchor set of content items.

There is yet additionally provided, in accordance with an application of the present invention, a computer software product, including a tangible computer-readable medium in which program instructions are stored, which instructions, when read by a computer, cause the computer to receive from a web browser running in a window displayed in a graphical user interface (GUI), via a network, an indication of (a) dragging, by a user of the web browser, of an element associated with a first content item and displayed in the GUI at a location other than in the web browser, and (b) dropping, by the user, of the element into a content area displayed on the webpage; and, responsively to the indication, cause the web browser to display, in the content area, at least a portion of a set of one or more second content items related to the first content item.

There is also provided, in accordance with an application of the present invention, a computer software product, including a tangible computer-readable medium in which program instructions are stored, which instructions, when read by a computer running a web browser in a window displayed in a graphical user interface (GUI) of a device, cause the web browser to receive an indication of (a) dragging, by a user of the device, of an element associated with a first content item and displayed in the GUI at a location other than in the web browser, and (b) dropping, by the user, of the element into a content area displayed on the webpage; and, responsively to the indication, display, in the content area, at least a portion of a set of one or more second content items related to the first content item.

There is further provided, in accordance with an application of the present invention, a computer-implemented method including:

serving a content area to a web browser for display on a webpage displayed by the web browser, which webpage displays a first content item at a location on the webpage other than in the content area;

receiving, from the web browser, an indication of dragging, by a user of the web browser, of an element displayed on the webpage, and dropping, by the user, of the element into the content area, the element selected from the group consisting of: the first content item, and a graphical element displayed in association with the first content item; and responsively to the indication:

generating a term related to the first content item, which term includes one or more keywords, requesting and receiving, via a network, from one or more online content sources, a set of one or more second content items generated in response to the term, and serving, to the web browser, at least a portion of the set of second content items for display in the content area.

There is further provided, in accordance with an application of the present invention, a computer-implemented method including:

serving a content area to a web browser for display on a webpage displayed by the web browser, which webpage displays a first content item at a location on the webpage other than in the content area;

receiving, from the web browser, an indication of dragging, by a user of the web browser, of an element displayed on the webpage, and dropping, by the user, of the element into the content area, the element selected from the group consisting of: the first content item, and a graphical element displayed in association with the first content item; and responsively to the indication:

generating a term related to the first content item, which term includes one or more keywords, and sending an instruction to the web browser to request and receive, via a network, from one or more online content sources, a set of one or more second content items generated in response to the term, and to display at least a portion of the set of second content items in the content area.

For some applications, the element is the first content item, and receiving the indication includes receiving the indication of dragging of the first content item, and dropping of the first content item into the content area.

For some applications, the element is the graphical element displayed in association with the first content item, and receiving the indication includes receiving the indication of dragging of the graphical element, and dropping of the graphical element into the content area.

For some applications, generating the term includes generating the term responsively to an association graph associated with the first content item.

For some applications, the term includes an association graph including the keywords as vertices, and generating the term includes generating the association graph.

For some applications, the content area is a first content area, and further including serving a second content area for display on the webpage separately from the first content area, which second content area includes the first content item.

For some applications, the first content item is one of a plurality of first content items, and receiving the indication of dragging includes receiving the indication of dragging of at least one of the first content items.

For some applications, the first content item is of a first content type, and the second content items are of a second content type different from the first content type.

For some applications, the set of second content items includes advertising content.

There is still further provided, in accordance with an application of the present invention, a computer-implemented method including:

receiving, by a web browser running in a device, (a) a webpage, (b) from at least one web server via a network, a content area for display on the webpage, and (c) a first content item for display at a location on the webpage other than in the content area;

displaying the webpage on a display of the device;

receiving, by the web browser, an indication of dragging, by a user of the device, of an element an element displayed on the webpage, and dropping, by the user, of the element into the content area, the element selected from the group consisting of: the first content item, and a graphical element displayed in association with the first content item;

responsively to the indication, sending, by the web browser, a request including an identifier of the first content item to the at least one web server;

in response to the request, receiving, by the web browser, from the at least one web server, a set of one or more second content items related to the first content item; and displaying, by the web browser, at least a portion of the set of second content items in the content area.

There is additionally provided, in accordance with an application of the present invention, a computer-implemented method including:

receiving, by a web browser running in a device, (a) a webpage, (b) from at least one web server via a network, a content area for display on the webpage, and (c) a first content item for display at a location on the webpage other than in the content area;

displaying the webpage on a display of the device;

receiving, by the web browser, an indication of dragging, by a user of the device, of an element an element displayed on the webpage, and dropping, by the user, of the element into the content area, the element selected from the group consisting of: the first content item, and a graphical element displayed in association with the first content item;

responsively to the indication, sending, by the web browser, a request including an identifier of the first content item to the at least one web server;

in response to the request, receiving, by the web browser, from the at least one web server, a term related to the first content item, which term includes one or more keywords;

requesting and receiving, by the web browser, via the network, from one or more online content sources, a set of one or more second content items related to the term; and displaying, by the web browser, at least a portion of the set of second content items in the content area.

There is yet additionally provided, in accordance with an application of the present invention, a computer-implemented method including:

serving to a web browser (a) a content area, for display on a webpage displayed by the web browser, and (b) an anchor box, for display on the webpage separately from the content area, wherein the webpage displays a first content item at a location on the webpage other than in the content area or the anchor box, which first content item includes a non-textual content object;

receiving, from the web browser, an indication of dragging, by a user of the web browser, of at least the non-textual content object, and dropping, by the user, of at least the non-textual content object into the anchor box; and responsively to the indication:

generating a term related to the first content item, which term includes one or more keywords, requesting and receiving, via a network, from one or more online content sources, a set of one or more second content items generated in response to the term, and serving, to the web browser, at least a portion of the set of second content items for display in the content area.

There is also provided, in accordance with an application of the present invention a computer-implemented method including:

serving to a web browser (a) a content area, for display on a webpage displayed by the web browser, and (b) an anchor box, for display on the webpage separately from the content area, wherein the webpage displays a first content item at a location on the webpage other than in the content area or the anchor box, which first content item includes a non-textual content object;

receiving, from the web browser, an indication of dragging, by a user of the web browser, of at least the non-textual content object, and dropping, by the user, of at least the non-textual content object into the anchor box; and responsively to the indication:

generating a term related to the first content item, which term includes one or more keywords, and sending an instruction to the web browser to request and receive, via a network, from one or more online content sources, a set of one or more second content items generated in response to the term, and to display at least a portion of the set of second content items in the content area.

For some applications, the non-textual content object includes an image. Alternatively or additionally, for some applications, the non-textual content object includes a video.

For some applications, generating the term includes generating the term responsively to an association graph associated with the first content item.

For some applications, the term includes an association graph including the keywords as vertices, and generating the term includes generating the association graph.

For some applications, the first content item is one of a plurality of first content items, the content area is a first content area, the method further includes serving a second content area for display on the webpage separately from the first content area, which second content area includes the first content items, and receiving the indication of dragging includes receiving the indication of dragging of at least one of the first content items.

For some applications, the first content item is of a first content type, and the second content items are of a second content type different from the first content type.

For some applications, the set of second content items includes advertising content.

For some applications, the content area is one of a plurality of content areas, serving the content area includes serving the plurality of content areas for display on the webpage, the one or more online content sources are of a plurality of online content sources, requesting and receiving includes requesting and receiving, via the network, from one or more of the online content sources, respective sets of one more second content items generated in response to the term, and serving the at least a portion of the set of second content items includes serving at least portions of the sets for display in the one or more of the content areas, respectively.

There is further provided, in accordance with an application of the present invention, a computer-implemented method including:

receiving, by a web browser running in a device, (a) a webpage, (b) from at least one web server via a network, a content area for display on the webpage, (c) an anchor box for display on the webpage separately from the content area, and (d) a first content item for display at a location on the webpage other than in the content area or the anchor box, which first content item includes a non-textual content object;

displaying the webpage on a display of the device;

receiving, by the web browser, an indication of dragging, by a user of the device, of at least the non-textual content object, and dropping, by the user, of at least the non-textual content object into the anchor box;

responsively to the indication, sending, by the web browser, a request including an identifier of the first content item to the at least one web server;

in response to the request, receiving, by the web browser, from the at least one web server, a set of one or more second content items related to the first content item; and displaying, by the web browser, at least a portion of the set of second content items in the content area.

There is still further provided, in accordance with an application of the present invention, a computer-implemented method including:

receiving, by a web browser running in a device, (a) a webpage, (b) from at least one web server via a network, a content area for display on the webpage, (c) an anchor box for display on the webpage separately from the content area, and (d) a first content item for display at a location on the webpage other than in the content area or the anchor box, which first content item includes a non-textual content object;

displaying the webpage on a display of the device;

receiving, by the web browser, an indication of dragging, by a user of the device, of at least the non-textual content object, and dropping, by the user, of at least the non-textual content object into the anchor box;

responsively to the indication, sending, by the web browser, a request including an identifier of the first content item to the at least one web server;

in response to the request, receiving, by the web browser, from the at least one web server, a term related to the first content item, which term includes one or more keywords;

requesting and receiving, by the web browser, via the network, from one or more online content sources, a set of one or more second content items related to the term; and displaying, by the web browser, at least a portion of the set of second content items in the content area.

There is additionally provided, in accordance with an application of the present invention, a computer-implemented method including:

serving a content area to a web browser for display on a webpage displayed by the web browser, which webpage displays a first content item at a location on the webpage other than in the content area;

receiving, from the web browser, a selection, by a user of the web browser, of a graphical element displayed in association with the first content item; and responsively to the selection:

generating a term related to the first content item, which term includes one or more keywords, requesting and receiving, via a network, from one or more online content sources, a set of one or more second content items generated in response to the term, and serving, to the web browser, at least a portion of the set of second content items for display in the content area.

For some applications, the method further includes serving an anchor box to the web browser for display on the webpage separately from the content area, and receiving the selection of the graphical element includes receiving, from the web browser, an indication of dragging, by a user of the web browser, of the graphical element into the anchor box.

There is yet additionally provided, in accordance with an application of the present invention, a computer-implemented method including:

serving a content area to a web browser for display on a webpage displayed by the web browser, which webpage displays a first content item at a location on the webpage other than in the content area;

receiving, from the web browser, a selection, by a user of the web browser, of a graphical element displayed in association with the first content item; and responsively to the selection:

generating a term related to the first content item, which term includes one or more keywords, and sending an instruction to the web browser to request and receive, via a network, from one or more online content sources, a set of one or more second content items generated in response to the term, and to display at least a portion of the set of second content items in the content area.

For some applications, the method further includes serving an anchor box to the web browser for display on the webpage separately from the content area, and receiving the selection of the graphical element includes receiving, from the web browser, an indication of dragging, by a user of the web browser, of the graphical element into the anchor box.

There is also provided, in accordance with an application of the present invention, a computer-implemented method including:

serving a plurality of content areas to a web browser for display on a webpage displayed by the web browser, which webpage displays a first content item;

receiving, from the web browser, (a) a selection, by a user of the web browser, of the displayed content item, (b) a selection, by the user, of one or more of the content areas, and (c) an instruction, by the user, to synchronize the selected content areas with the selected content item; and responsively to the selections and the instruction:

generating a term related to the first content item, which term includes one or more keywords, requesting and receiving from one or more online content sources, one or more sets of one or more second content items generated in response to the term, and serving, to the web browser, at least portions of the sets of second content items for display in the respective selected one or more content areas.

There is further provided, in accordance with an application of the present invention, a computer-implemented method including:

serving a plurality of content areas to a web browser for display on a webpage displayed by the web browser, which webpage displays a first content item;

receiving, from the web browser, (a) a selection, by a user of the web browser, of the displayed content item, (b) a selection, by the user, of one or more of the content areas, and (c) an instruction, by the user, to synchronize the selected the content areas with the selected content item; and responsively to the selections and the instruction:

generating a term related to the first content item, which term includes one or more keywords, and sending an instruction to the web browser to request and receive, via a network, from one or more online content sources, one or more sets of one or more second content items generated in response to the term, and to display at least portions of the sets of second content items in the respective selected one or more content areas.

There is still further provided, in accordance with an application of the present invention, a computer-implemented method including:

receiving a term that includes one or more keywords;

requesting and receiving, via a network, from a plurality of online content sources, sets of one or more content items generated by the online content sources in response to the term;

serving, to a web browser, a plurality of content areas, for display on a webpage displayed by the web browser, which content areas display at least portions of the sets of content items, respectively;

receiving, from the web browser, (a) a selection, by a user of the web browser, of at least one of the displayed content items, and (b) an instruction, by the user, to synchronize one or more of the content areas with the selected content item;

responsively to the selection and the instruction, generating an updated term, and requesting and receiving, via the network, from the online content sources that generated the sets of content items displayed by the one or more content areas, updated sets of content items generated in response to the updated term; and serving, to the web browser, at least portions of the updated sets of content items, for display in the one or more content areas, respectively.

There is additionally provided, in accordance with an application of the present invention, a computer-implemented method including:

receiving a term that includes one or more keywords;

sending a request to a web browser to request and receive, via a network, from a plurality of online content sources, sets of one or more content items generated by the online content sources in response to the term;

serving, to the web browser, a plurality of content areas, for display on a webpage displayed by the web browser, an instruction to display at least portions of the sets of content items in the content areas, respectively;

receiving, from the web browser, (a) a selection, by a user of the web browser, of at least one of the displayed content items, and (b) an instruction, by the user, to synchronize one or more of the content areas with the selected content item; and responsively to the selection and the instruction, generating an updated term, and sending an instruction to the web browser to (a) request and receive, via the network, from the online content sources that generated the sets of content items displayed by the one or more content areas, updated sets of content items generated in response to the updated term, and (b) display at least portions of the updated sets of content items in the one or more content areas, respectively.

For some applications, generating the updated term includes generating the updated term responsively to the selected at least one of the displayed content items.

For some applications, generating the updated term includes generating the updated term responsively to an association graph associated with the selected at least one of the displayed content items.

For some applications, the term includes an association graph including the respective keywords as vertices.

For some applications, the one or more content areas consist of only one of the content areas in which is displayed the selected at least one of the content items.

For some applications, the selected at least one of the content items is displayed in a first one of the content areas, and the one or more content areas include at least a second one of the content areas other than the first content area. For some applications, receiving the selection includes receiving an indication of dragging, by the user, of an element displayed on the webpage, the element selected from the group consisting of: the selected at least one of the content items, and a graphical element displayed in association with the selected at least one of the content items, and receiving the instruction includes receiving an indication of dropping, by the user, of the element into the second content area.

For some applications, the set of content items displayed in the second content area includes advertising content.

For some applications, the selected at least one of the content items is displayed in a first one of the content areas, the one or more content areas include all of the content areas other than the first content area, the webpage includes an anchor area separate from the content areas, receiving the selection includes receiving an indication of dragging, by the user, of an element displayed on the webpage, the element selected from the group consisting of: the selected at least one of the content items, and a graphical element displayed in association with the selected at least one of the content items, and receiving the instruction includes receiving an indication of dropping, by the user, of the element into the anchor area.

For some applications, the selected at least one of the content items is displayed in a first one of the content areas, the one or more content areas include all of the content areas, including the first content area, the webpage includes an anchor area separate from the content areas, receiving the selection and instruction includes receiving an indication of dragging, by the user, of an element displayed on the webpage, the element selected from the group consisting of: the selected at least one of the content items, and a graphical element displayed in association with the selected at least one of the content items, and receiving the instruction includes receiving an indication of dropping, by the user, of the element into the anchor area.

For some applications, receiving the selection and instruction includes receiving the selection and instruction given by the user in a single action.

There is yet additionally provided, in accordance with an application of the present invention, a computer-implemented method including:

receiving a term that includes one or more keywords;

requesting and receiving, via a network, from a plurality of online content sources, sets of one or more content items generated by the online content sources in response to the term;

serving, to a web browser, a plurality of content areas, for display on a webpage displayed by the web browser, which content areas display at least portions of the sets of content items, respectively;

designating (a) exactly one of the content areas as an anchor content area associated with an anchor set of content items, and (b) one or more of the content areas other than the anchor content area as synchronized content areas associated with respective synchronized sets of content items; and periodically updating some of the content areas by periodically:

updating the anchor set of content items by requesting the anchor set of content items from one or more of the online content sources, performing an analysis of the updated anchor set of content items, generating an updated term responsively to the analysis, requesting and receiving, from the online content sources that generated the synchronized sets of content items, updated synchronized sets of content items generated in response to the updated term, updating the anchor content area, by serving, to the web browser, at least a portion of the updated anchor set of content items for display in the anchor content area, and automatically synchronizing the synchronized content areas with the anchor content area by serving, to the web browser, at least portions of the updated synchronized sets of content items for display in the synchronize content areas, respectively.

There is also provided, in accordance with an application of the present invention, a computer-implemented method including:

receiving a term that includes one or more keywords;

sending an instruction to a web browser to request and receive, via a network, from a plurality of online content sources, sets of one or more content items generated by the online content sources in response to the term;

serving, to the web browser, a plurality of content areas, for display on a webpage displayed by the web browser, which content areas display at least portions of the sets of content items, respectively;

designating (a) exactly one of the content areas as an anchor content area associated with an anchor set of content items, and (b) one or more of the content areas other than the anchor content area as synchronized content areas associated with respective synchronized sets of content items; and periodically updating some of the content areas by periodically:

updating the anchor set of content items by sending an instruction to the web browser to request the anchor set of content items from the one or more online content sources, performing an analysis of the updated anchor set of content items, generating an updated term responsively to the analysis, and sending an instruction to the web browser to (a) request and receive, from the online content sources that generated the synchronized sets of content items, updated synchronized sets of content items generated in response to the updated term, (b) update the anchor content area to display at least a portion of the updated anchor set of content items, and (c) automatically synchronize the synchronized content areas with the anchor content area by displaying at least portions of the updated synchronized sets of content items in the synchronize content areas, respectively.

For some applications, synchronizing includes synchronizing once every one to five minutes.

For some applications, updating the anchor set includes automatically requesting the anchor set from the online content sources.

For some applications, updating the anchor content area and automatically synchronizing includes updating the anchor content area and automatically synchronizing without requiring the webpage to be served in its entirety to the web browser.

For some applications, designating includes receiving a designation command from a user of the web browser, and designating the exactly one of the content areas as the anchor content area responsively to the user designation command.

For some applications, periodically updating includes receiving an instruction from the user to lock one of the one or more content areas, and, responsively to the instruction, withholding periodically updating the locked content area, while continuing to periodically update others of the one or more content areas.

For some applications, serving the content areas includes: ranking the content items of at least one of the sets; and selecting one or more of the highest-ranked content items as the at least a portion of the content items of the at least one of the sets. For some applications, ranking includes ranking responsively to a profile selected from the group consisting of: a profile of the user, a profile of a community of users to which the user belongs, and a profile of all users. For some applications, ranking includes performing an analysis of at least a portion of the content items received from the online content sources, and ranking responsively to the analysis.

For some applications, serving the content areas includes serving the at least portions of the sets of content items within one second after requesting the respective content items from the online sources.

For some applications, receiving the term includes receiving the term from the user. For some applications, the webpage includes an anchor area separate from the content areas, and receiving the term includes receiving the term from the user via the anchor area.

For some applications, receiving the term includes generating the term responsively to profile of the user.

For some applications, serving the content areas includes serving names of the online content sources for display on the webpage in association with the respective content areas.

For some applications, serving the content areas includes: providing at least one of the content areas with a search field; receiving a search query entered by the user into the search field; and updating the portion of the content items displayed in the content area responsively to the search query.

For some applications, serving the content areas includes receiving a request from the user to enlarge one of the content areas, and, responsively to the request, enlarging the one of the content areas and reducing respective sizes of others of the content areas.

For some applications, serving the content areas includes setting respective levels of prominence of at least some of the content areas responsively to respective levels of relevancy of the respective sources to the term.

For some applications, requesting at least one the respective sets includes using a search facility of the respective online content source.

For some applications, requesting at least one the respective sets includes using an application programming interface (API) provided by the one or more online content sources.

For some applications, at least one of the content items includes video content.

For some applications, serving the content areas includes configuring at least one of the content areas to display exactly one of the content items.

There is further provided, in accordance with an application of the present invention, apparatus for use with a network, the apparatus including:
an interface; and
a processor, which is configured to serve, via the interface, a content area to a web browser for display on a webpage displayed by the web browser, which webpage displays a first content item at a location on the webpage other than in the content area; receive, from the web browser via the interface, an indication of dragging, by a user of the web browser, of an element displayed on the webpage, and dropping, by the user, of the element into the content area, the element selected from the group consisting of: the first content item, and a graphical element displayed in association with the first content item; and, responsively to the indication, generate a term related to the first content item, which term includes one or more keywords; request and receive, via the network, from an online content source, a set of one or more second content items generated in response to the term; and serve, via the interface, to the web browser, at least a portion of the set of second content items for display in the content area.

There is still further provided, in accordance with an application of the present invention, apparatus for use with a network, the apparatus including:
an interface; and
a processor, which is configured to serve, via the interface, a content area to a web browser for display on a webpage displayed by the web browser, which webpage displays a first content item at a location on the webpage other than in the content area; receive, from the web browser via the interface, an indication of dragging, by a user of the web browser, of an element displayed on the webpage, and dropping, by the user, of the element into the content area, the element selected from the group consisting of: the first content item, and a graphical element displayed in association with the first content item; and responsively to the indication, generate a term related to the first content item, which term includes one or more keywords; and send, via the interface, an instruction to the web browser to request and receive, via the network, from an online content source, a set of one or more second content items generated in response to the term, and to display at least a portion of the set of second content items in the content area.

There is additionally provided, in accordance with an application of the present invention, apparatus that communicates with at least one web server via a network, the apparatus including:
a display; and
a processor, which is configured to run a web browser that is configured to receive (a) a webpage, (b) from the at least one web server via the network, a content area for display on the webpage, and (c) a first content item for display at a location on the webpage other than in the content area; display the webpage on the display; receive an indication of dragging, by a user of the device, of an element an element displayed on the webpage, and dropping, by the user, of the element into the content area, the element selected from the group consisting of: the first content item, and a graphical element displayed in association with the first content item; responsively to the indication, send a request including an identifier of the first content item to the at least one web server; in response to the request, receive, from the at least one web server, a set of one or more second content items related to the first content item; and display at least a portion of the set of second content items in the content area.

There is yet additionally provided, in accordance with an application of the present invention, apparatus that communicates with at least one web server via a network, the apparatus including:
a display; and
a processor, which is configured to run a web browser that is configured to receive (a) a webpage, (b) from the at least one web server via the network, a content area for display on the webpage, and (c) a first content item for display at a location on the webpage other than in the content area; display the webpage on the display; receive an indication of dragging, by a user of the device, of an element an element displayed on the webpage, and dropping, by the user, of the element into the content area, the element selected from the group consisting of: the first content item, and a graphical element displayed in association with the first content item; responsively to the indication, send a request including an identifier of the first content item to the at least one web server; in response to the request, receive, from the at least one web server, a term related to the first content item, which term includes one or more keywords; request and receive, via the network, from an online content source, a set of one or more second content items related to the term; and display at least a portion of the set of second content items in the content area.

There is also provided, in accordance with an application of the present invention, apparatus for use with a network, the apparatus including:
an interface; and
a processor, which is configured to serve to a web browser, via the interface, (a) a content area, for display on a webpage displayed by the web browser, and (b) an anchor box, for display on the webpage separately from the content area, wherein the webpage displays a first content item at a location on the webpage other than in the content area or the anchor box, which first content item includes a non-textual content object; receive, from the web browser, an indication of dragging, by a user of the web browser, of at least the non-textual content object, and dropping, by the user, of at least the non-textual content object into the anchor box; and responsively to the indication, generate a term related to the first content item, which term includes one or more keywords; request and receive, via the network, from an online content source, a set of one or more second content items generated in response to the term; and serve, to the web browser via the interface, at least a portion of the set of second content items for display in the content area.

There is further provided, in accordance with an application of the present invention, apparatus for use with a network, the apparatus including:
an interface; and
a processor, which is configured to serve to a web browser, via the interface, (a) a content area, for display on a webpage displayed by the web browser, and (b) an anchor box, for display on the webpage separately from the content area, wherein the webpage displays a first content item at a location on the webpage other than in the content area or the anchor box, which first content item includes a non-textual content object; receive, from the web browser, an indication of dragging, by a user of the web browser, of at least the non-textual content object, and dropping, by the user, of at least the non-textual content object into the anchor box; and responsively to the indication, generate a term related to the first content item, which term includes one or more keywords; and send an instruction to the web browser, via the interface, to request and receive, via the network, from an online content source, a set of one or more second content items generated in response to the term, and to display at least a portion of the set of second content items in the content area.

There is still further provided, in accordance with an application of the present invention, apparatus that communicates with at least one web server via a network, the apparatus including:

a display; and a processor, which is configured to run a web browser that is configured to receive (a) a webpage, (b) from the at least one web server via the network, a content area for display on the webpage, (c) an anchor box for display on the webpage separately from the content area, and (d) a first content item for display at a location on the webpage other than in the content area or the anchor box, which first content item includes a non-textual content object; display the webpage on the display; receive an indication of dragging, by a user of the device, of at least the non-textual content object, and dropping, by the user, of at least the non-textual content object into the anchor box; responsively to the indication, send a request including an identifier of the first content item to the at least one web server; in response to the request, receive, from the at least one web server, a set of one or more second content items related to the first content item; and display at least a portion of the set of second content items in the content area.

There is additionally provided, in accordance with an application of the present invention, apparatus that communicates with at least one web server via a network, the apparatus including:

a display; and a processor, which is configured to run a web browser that is configured to receive (a) a webpage, (b) from the at least one web server via the network, a content area for display on the webpage, (c) an anchor box for display on the webpage separately from the content area, and (d) a first content item for display at a location on the webpage other than in the content area or the anchor box, which first content item includes a non-textual content object; display the webpage on the display; receive an indication of dragging, by a user of the device, of at least the non-textual content object, and dropping, by the user, of at least the non-textual content object into the anchor box; responsively to the indication, send a request including an identifier of the first content item to the at least one web server; in response to the request, receive, from the at least one web server, a term related to the first content item, which term includes one or more keywords; request and receive, via the network, from an online content source, a set of one or more second content items related to the term; and display at least a portion of the set of second content items in the content area.

There is yet additionally provided, in accordance with an application of the present invention, apparatus for use with a network, the apparatus including:

an interface; and a processor, which is configured to serve, via the interface, a content area to a web browser for display on a webpage displayed by the web browser, which webpage displays a first content item at a location on the webpage other than in the content area; receive, from the web browser, a selection, by a user of the web browser, of a graphical element displayed in association with the first content item; and responsively to the selection, generate a term related to the first content item, which term includes one or more keywords; request and receive, via the network, from an online content source, a set of one or more second content items generated in response to the term; and serve, to the web browser via the interface, at least a portion of the set of second content items for display in the content area.

There is also provided, in accordance with an application of the present invention, apparatus for use with a network, the apparatus including:

an interface; and a processor, which is configured to serve, via the interface, a content area to a web browser for display on a webpage displayed by the web browser, which webpage displays a first content item at a location on the webpage other than in the content area; receive, from the web browser, a selection, by a user of the web browser, of a graphical element displayed in association with the first content item; and responsively to the selection, generate a term related to the first content item, which term includes one or more keywords; and send, via the interface, an instruction to the web browser to request and receive, via the network, from an online content source, a set of one or more second content items generated in response to the term, and to display at least a portion of the set of second content items in the content area.

There is further provided, in accordance with an application of the present invention, apparatus including:

an interface; and a processor, which is configured to serve, via the interface, a plurality of content areas to a web browser for display on a webpage displayed by the web browser, which webpage displays a first content item; receive, from the web browser, (a) a selection, by a user of the web browser, of the displayed content item, (b) a selection, by the user, of one or more of the content areas, and (c) an instruction, by the user, to synchronize the selected content areas with the selected content item; and, responsively to the selections and the instruction, generate a term related to the first content item, which term includes one or more keywords; request and receive from an online content source, one or more sets of one or more second content items generated in response to the term; and serve, to the web browser via the interface, at least portions of the sets of second content items for display in the respective selected one or more content areas.

There is still further provided, in accordance with an application of the present invention, apparatus for use with a network, the apparatus including:

an interface; and a processor, which is configured to serve, via the interface, a plurality of content areas to a web browser for display on a webpage displayed by the web browser, which webpage displays a first content item; receive, from the web browser, (a) a selection, by a user of the web browser, of the displayed content item, (b) a selection, by the user, of one or more of the content areas, and (c) an instruction, by the user, to synchronize the selected the content areas with the selected content item; and, responsively to the selections and the instruction, generate a term related to the first content item, which term includes one or more keywords; and send, via the interface, an instruction to the web browser to request and receive, via the network, from an online content source, one or more sets of one or more second content items generated in response to the term, and to display at least portions of the sets of second content items in the respective selected one or more content areas.

There is additionally provided, in accordance with an application of the present invention, apparatus for use with a network, the apparatus including:

an interface; and a processor, which is configured to request and receive, via the network, from a plurality of online content sources, sets of one or more content items generated by the online content sources in response to the term; serve, to a web browser via the interface, a plurality of content areas, for display on a webpage displayed by the web browser, which content areas display at least portions of the sets of content items, respectively; receive, from the web browser, (a) a selection, by a user of the web browser, of at least one of the displayed content items, and (b) an instruction, by the user, to synchronize one or more of the content areas with the selected content item; responsively to the selection and the instruction, generating an updated term, and requesting and receiving, via the network, from the online content sources that generated the sets of content items displayed by the one or more content areas, updated sets of content items generated in response to the updated term; and serve, to the web browser via the interface, at least portions of the updated sets of content items, for display in the one or more content areas, respectively.

There is yet additionally provided, in accordance with an application of the present invention, apparatus for use with a network, the apparatus including:

an interface; and a processor, which is configured to receive a term that includes one or more keywords; send a request to a web browser to request and receive, via the network, from a plurality of online content sources, sets of one or more content items generated by the online content sources in response to the term; serve, to the web browser via the interface, a plurality of content areas, for display on a webpage displayed by the web browser, an instruction to display at least portions of the sets of content items in the content areas, respectively; receive, from the web browser, (a) a selection, by a user of the web browser, of at least one of the displayed content items, and (b) an instruction, by the user, to synchronize one or more of the content areas with the selected content item; and responsively to the selection and the instruction, generate an updated term, and send an instruction to the web browser, via the interface, to (a) request and receive, via the network, from the online content sources that generated the sets of content items displayed by the one or more content areas, updated sets of content items generated in response to the updated term, and (b) display at least portions of the updated sets of content items in the one or more content areas, respectively.

There is also provided, in accordance with an application of the present invention, apparatus for use with a network, the apparatus including:

an interface; and a processor, which is configured to receive a term that includes one or more keywords; request and receive, via the network, from a plurality of online content sources, sets of one or more content items generated by the online content sources in response to the term; serve, to a web browser via the interface, a plurality of content areas, for display on a webpage displayed by the web browser, which content areas display at least portions of the sets of content items, respectively; designate (a) exactly one of the content areas as an anchor content area associated with an anchor set of content items, and (b) one or more of the content areas other than the anchor content area as synchronized content areas associated with respective synchronized sets of content items; and periodically update some of the content areas by periodically updating the anchor set of content items by requesting the anchor set of content items from the one or more online content sources, performing an analysis of the updated anchor set of content items, generating an updated term responsively to the analysis, requesting and receiving, from the online content sources that generated the synchronized sets of content items, updated synchronized sets of content items generated in response to the updated term, updating the anchor content area, by serving, to the web browser via the interface, at least a portion of the updated anchor set of content items for display in the anchor content area, and automatically synchronizing the synchronized content areas with the anchor content area by serving, to the web browser, at least portions of the updated synchronized sets of content items for display in the synchronize content areas, respectively.

There is further provided, in accordance with an application of the present invention, apparatus for use with a network, the apparatus including:

an interface; and a processor, which is configured to receive a term that includes one or more keywords; send an instruction to a web browser to request and receive, via the network, from a plurality of online content sources, sets of one or more content items generated by the online content sources in response to the term; serve, to the web browser via the interface, a plurality of content areas, for display on a webpage displayed by the web browser, which content areas display at least portions of the sets of content items, respectively; designate (a) exactly one of the content areas as an anchor content area associated with an anchor set of content items, and (b) one or more of the content areas other than the anchor content area as synchronized content areas associated with respective synchronized sets of content items; and periodically updating some of the content areas by periodically: updating the anchor set of content items by sending an instruction to the web browser to request the anchor set of content items from the one or more online content sources, performing an analysis of the updated anchor set of content items, generating an updated term responsively to the analysis, and sending, via the interface, an instruction to the web browser to (a) request and receive, from the online content sources that generated the synchronized sets of content items, updated synchronized sets of content items generated in response to the updated term, (b) update the anchor content area to display at least a portion of the updated anchor set of content items, and (c) automatically synchronize the synchronized content areas with the anchor content area by displaying at least portions of the updated synchronized sets of content items in the synchronize content areas, respectively.

There is still further provided, in accordance with an application of the present invention, a computer software product, including a tangible computer-readable medium in which program instructions are stored, which instructions, when read by a computer, cause the computer to serve a content area to a web browser for display on a webpage displayed by the web browser, which webpage displays a first content item at a location on the webpage other than in the content area; receive, from the web browser, an indication of dragging, by a user of the web browser, of an element displayed on the webpage, and dropping, by the user, of the element into the content area, the element selected from the group consisting of: the first content item, and a graphical element displayed in association with the first content item; and, responsively to the indication, generate a term related to the first content item, which term includes one or more keywords; request and receive, via a network, from an online content source, a set of one or more second content items generated in response to the term; and serve, to the web browser, at least a portion of the set of second content items for display in the content area.

There is additionally provided, in accordance with an application of the present invention, a computer software product, including a tangible computer-readable medium in which program instructions are stored, which instructions, when read by a computer, cause the computer to serve a content area to a web browser for display on a webpage displayed by the web browser, which webpage displays a first content item at a location on the webpage other than in the content area; receive, from the web browser, an indication of dragging, by a user of the web browser, of an element displayed on the webpage, and dropping, by the user, of the element into the content area, the element selected from the group consisting of: the first content item, and a graphical element displayed in association with the first content item; and responsively to the indication, generate a term related to the first content item, which term includes one or more keywords; and send an instruction to the web browser to request and receive, via a network, from an online content source, a set of one or more second content items generated in response to the term, and to display at least a portion of the set of second content items in the content area.

There is yet additionally provided, in accordance with an application of the present invention, a computer software product, including a tangible computer-readable medium in which program instructions are stored, which instructions, when read by a computer running a web browser, cause the web browser to receive (a) a webpage, (b) from at least one web server via a network, a content area for display on the webpage, and (c) a first content item for display at a location on the webpage other than in the content area; display the webpage; receive an indication of dragging, by a user of the device, of an element displayed on the webpage, and dropping, by the user, of the element into the content area, the element selected from the group consisting of: the first content item, and a graphical element displayed in association with the first content item; responsively to the indication, send a request including an identifier of the first content item to the at least one web server; in response to the request, receive, from the at least one web server, a set of one or more second content items related to the first content item; and display at least a portion of the set of second content items in the content area.

There is also provided, in accordance with an application of the present invention, a computer software product, including a tangible computer-readable medium in which program instructions are stored, which instructions, when read by a computer running a web browser, cause the web browser to receive (a) a webpage, (b) from at least one web server via a network, a content area for display on the webpage, and (c) a first content item for display at a location on the webpage other than in the content area; display the webpage; receive an indication of dragging, by a user of the device, of an element displayed on the webpage, and dropping, by the user, of the element into the content area, the element selected from the group consisting of: the first content item, and a graphical element displayed in association with the first content item; responsively to the indication, send a request including an identifier of the first content item to the at least one web server; in response to the request, receive, from the at least one web server, a term related to the first content item, which term includes one or more keywords; request and receive, via the network, from an online content source, a set of one or more second content items related to the term; and display at least a portion of the set of second content items in the content area.

There is further provided, in accordance with an application of the present invention, a computer software product, including a tangible computer-readable medium in which program instructions are stored, which instructions, when read by a computer, cause the computer to serve to a web browser (a) a content area, for display on a webpage displayed by the web browser, and (b) an anchor box, for display on the webpage separately from the content area, wherein the webpage displays a first content item at a location on the webpage other than in the content area or the anchor box, which first content item includes a non-textual content object; receive, from the web browser, an indication of dragging, by a user of the web browser, of at least the non-textual content object, and dropping, by the user, of at least the non-textual content object into the anchor box; and responsively to the indication, generate a term related to the first content item, which term includes one or more keywords; request and receive, via a network, from an online content source, a set of one or more second content items generated in response to the term; and serve, to the web browser, at least a portion of the set of second content items for display in the content area.

There is still further provided, in accordance with an application of the present invention, a computer software product, including a tangible computer-readable medium in which program instructions are stored, which instructions, when read by a computer, cause the computer to serve to a web browser (a) a content area, for display on a webpage displayed by the web browser, and (b) an anchor box, for display on the webpage separately from the content area, wherein the webpage displays a first content item at a location on the webpage other than in the content area or the anchor box, which first content item includes a non-textual content object; receive, from the web browser, an indication of dragging, by a user of the web browser, of at least the non-textual content object, and dropping, by the user, of at least the non-textual content object into the anchor box; and responsively to the indication, generate a term related to the first content item, which term includes one or more keywords; and send an instruction to the web browser to request and receive, via a network, from an online content source, a set of one or more second content items generated in response to the term, and to display at least a portion of the set of second content items in the content area.

There is additionally provided, in accordance with an application of the present invention, a computer software product, including a tangible computer-readable medium in which program instructions are stored, which instructions, when read by a computer running a web browser, cause the web browser to receive (a) a webpage, (b) from at least one web server via a network, a content area for display on the webpage, (c) an anchor box for display on the webpage separately from the content area, and (d) a first content item for display at a location on the webpage other than in the content area or the anchor box, which first content item includes a non-textual content object; display the webpage; receive an indication of dragging, by a user of the device, of at least the non-textual content object, and dropping, by the user, of at least the non-textual content object into the anchor box; responsively to the indication, send a request including an identifier of the first content item to the at least one web server; in response to the request, receive, from the at least one web server, a set of one or more second content items related to the first content item; and display at least a portion of the set of second content items in the content area.

There is yet additionally provided, in accordance with an application of the present invention, a computer software product, including a tangible computer-readable medium in which program instructions are stored, which instructions, when read by a computer running a web browser, cause the web browser to receive (a) a webpage, (b) from at least one web server via a network, a content area for display on the webpage, (c) an anchor box for display on the webpage separately from the content area, and (d) a first content item for display at a location on the webpage other than in the content area or the anchor box, which first content item includes a non-textual content object; display the webpage; receive an indication of dragging, by a user of the device, of at least the non-textual content object, and dropping, by the user, of at least the non-textual content object into the anchor box; responsively to the indication, send a request including an identifier of the first content item to the at least one web server; in response to the request, receive, from the at least one web server, a term related to the first content item, which term includes one or more keywords; request and receive, via the network, from an online content source, a set of one or more second content items related to the term; and display at least a portion of the set of second content items in the content area.

There is also provided, in accordance with an application of the present invention, a computer software product, including a tangible computer-readable medium in which program instructions are stored, which instructions, when read by a computer, cause the computer to serve a content area to a web browser for display on a webpage displayed by the web browser, which webpage displays a first content item at a location on the webpage other than in the content area; receive, from the web browser, a selection, by a user of the web browser, of a graphical element displayed in association with the first content item; and responsively to the selection, generate a term related to the first content item, which term includes one or more keywords; request and receive, via a network, from an online content source, a set of one or more second content items generated in response to the term; and serve, to the web browser, at least a portion of the set of second content items for display in the content area.

There is further provided, in accordance with an application of the present invention, a computer software product, including a tangible computer-readable medium in which program instructions are stored, which instructions, when read by a computer, cause the computer to serve a content area to a web browser for display on a webpage displayed by the web browser, which webpage displays a first content item at a location on the webpage other than in the content area; receive, from the web browser, a selection, by a user of the web browser, of a graphical element displayed in association with the first content item; and responsively to the selection, generate a term related to the first content item, which term includes one or more keywords; and send an instruction to the web browser to request and receive, via a network, from an online content source, a set of one or more second content items generated in response to the term, and to display at least a portion of the set of second content items in the content area.

There is still further provided, in accordance with an application of the present invention, a computer software product, including a tangible computer-readable medium in which program instructions are stored, which instructions, when read by a computer, cause the computer to serve a plurality of content areas to a web browser for display on a webpage displayed by the web browser, which webpage displays a first content item; receive, from the web browser, (a) a selection, by a user of the web browser, of the displayed content item, (b) a selection, by the user, of one or more of the content areas, and (c) an instruction, by the user, to synchronize the selected content areas with the selected content item; and, responsively to the selections and the instruction, generate a term related to the first content item, which term includes one or more keywords; request and receive from an online content source, one or more sets of one or more second content items generated in response to the term; and serve, to the web browser, at least portions of the sets of second content items for display in the respective selected one or more content areas.

There is additionally provided, in accordance with an application of the present invention, a computer software product, including a tangible computer-readable medium in which program instructions are stored, which instructions, when read by a computer, cause the computer to serve a plurality of content areas to a web browser for display on a webpage displayed by the web browser, which webpage displays a first content item; receive, from the web browser, (a) a selection, by a user of the web browser, of the displayed content item, (b) a selection, by the user, of one or more of the content areas, and (c) an instruction, by the user, to synchronize the selected the content areas with the selected content item; and, responsively to the selections and the instruction, generate a term related to the first content item, which term includes one or more keywords; and send an instruction to the web browser to request and receive, via a network, from an online content source, one or more sets of one or more second content items generated in response to the term, and to display at least portions of the sets of second content items in the respective selected one or more content areas.

There is yet additionally provided, in accordance with an application of the present invention, a computer software product, including a tangible computer-readable medium in which program instructions are stored, which instructions, when read by a computer, cause the computer to request and receive, via a network, from a plurality of online content sources, sets of one or more content items generated by the online content sources in response to the term; serve, to a web browser, a plurality of content areas, for display on a webpage displayed by the web browser, which content areas display at least portions of the sets of content items, respectively; receive, from the web browser, (a) a selection, by a user of the web browser, of at least one of the displayed content items, and (b) an instruction, by the user, to synchronize one or more of the content areas with the selected content item; responsively to the selection and the instruction, generating an updated term, and requesting and receiving, via the network, from the online content sources that generated the sets of content items displayed by the one or more content areas, updated sets of content items generated in response to the updated term; and serve, to the web browser, at least portions of the updated sets of content items, for display in the one or more content areas, respectively.

There is also provided, in accordance with an application of the present invention, a computer software product, including a tangible computer-readable medium in which program instructions are stored, which instructions, when read by a computer, cause the computer to receive a term that includes one or more keywords; send a request to a web browser to request and receive, via a network, from a plurality of online content sources, sets of one or more content items generated by the online content sources in response to the term; serve, to the web browser, a plurality of content areas, for display on a webpage displayed by the web browser, an instruction to display at least portions of the sets of content items in the content areas, respectively; receive, from the web browser, (a) a selection, by a user of the web browser, of at least one of the displayed content items, and (b) an instruction, by the user, to synchronize one or more of the content areas with the selected content item; and responsively to the selection and the instruction, generate an updated term, and send an instruction to the web browser to (a) request and receive, via the network, from the online content sources that generated the sets of content items displayed by the one or more content areas, updated sets of content items generated in response to the updated term, and (b) display at least portions of the updated sets of content items in the one or more content areas, respectively.

There is further provided, in accordance with an application of the present invention, a computer software product, including a tangible computer-readable medium in which program instructions are stored, which instructions, when read by a computer, cause the computer to receive a term that includes one or more keywords; request and receive, via a network, from a plurality of online content sources, sets of one or more content items generated by the online content sources in response to the term; serve, to a web browser, a plurality of content areas, for display on a webpage displayed by the web browser, which content areas display at least portions of the sets of content items, respectively; designate (a) exactly one of the content areas as an anchor content area associated with an anchor set of content items, and (b) one or more of the content areas other than the anchor content area as synchronized content areas associated with respective synchronized sets of content items; and periodically update some of the content areas by periodically updating the anchor set of content items by requesting the anchor set of content items from the one or more online content sources, performing an analysis of the updated anchor set of content items, generating an updated term responsively to the analysis, requesting and receiving, from the online content sources that generated the synchronized sets of content items, updated synchronized sets of content items generated in response to the updated term, updating the anchor content area, by serving, to the web browser, at least a portion of the updated anchor set of content items for display in the anchor content area, and automatically synchronizing the synchronized content areas with the anchor content area by serving, to the web browser, at least portions of the updated synchronized sets of content items for display in the synchronize content areas, respectively.

There is still further provided, in accordance with an application of the present invention, a computer software product, including a tangible computer-readable medium in which program instructions are stored, which instructions, when read by a computer, cause the computer to receive a term that includes one or more keywords; send an instruction to a web browser to request and receive, via a network, from a plurality of online content sources, sets of one or more content items generated by the online content sources in response to the term; serve, to the web browser, a plurality of content areas, for display on a webpage displayed by the web browser, which content areas display at least portions of the sets of content items, respectively; designate (a) exactly one of the content areas as an anchor content area associated with an anchor set of content items, and (b) one or more of the content areas other than the anchor content area as synchronized content areas associated with respective synchronized sets of content items; and periodically updating some of the content areas by periodically: updating the anchor set of content items by sending an instruction to the web browser to request the anchor set of content items from the one or more online content sources, performing an analysis of the updated anchor set of content items, generating an updated term responsively to the analysis, and sending an instruction to the web browser to (a) request and receive, from the online content sources that generated the synchronized sets of content items, updated synchronized sets of content items generated in response to the updated term, (b) update the anchor content area to display at least a portion of the updated anchor set of content items, and (c) automatically synchronize the synchronized content areas with the anchor content area by displaying at least portions of the updated synchronized sets of content items in the synchronize content areas, respectively.

The present invention will be more fully understood from the following detailed description of embodiments thereof, taken together with the drawings, in which:

BRIEF DESCRIPTION OF THE DRAWINGS

FIG. 3 is a flow chart that illustrates a method for synchronizing the content areas of FIG. 2 with one another, in accordance with an application of the present invention;

FIG. 4 is a flow chart that illustrates another method for synchronizing the content areas of FIG. 2 with one another, in accordance with an application of the present invention;

FIG. 6 is a schematic illustration of a graphical user interface displaying a web browser, in accordance with an application of the present invention.

DETAILED DESCRIPTION OF APPLICATIONS

Figure 1:
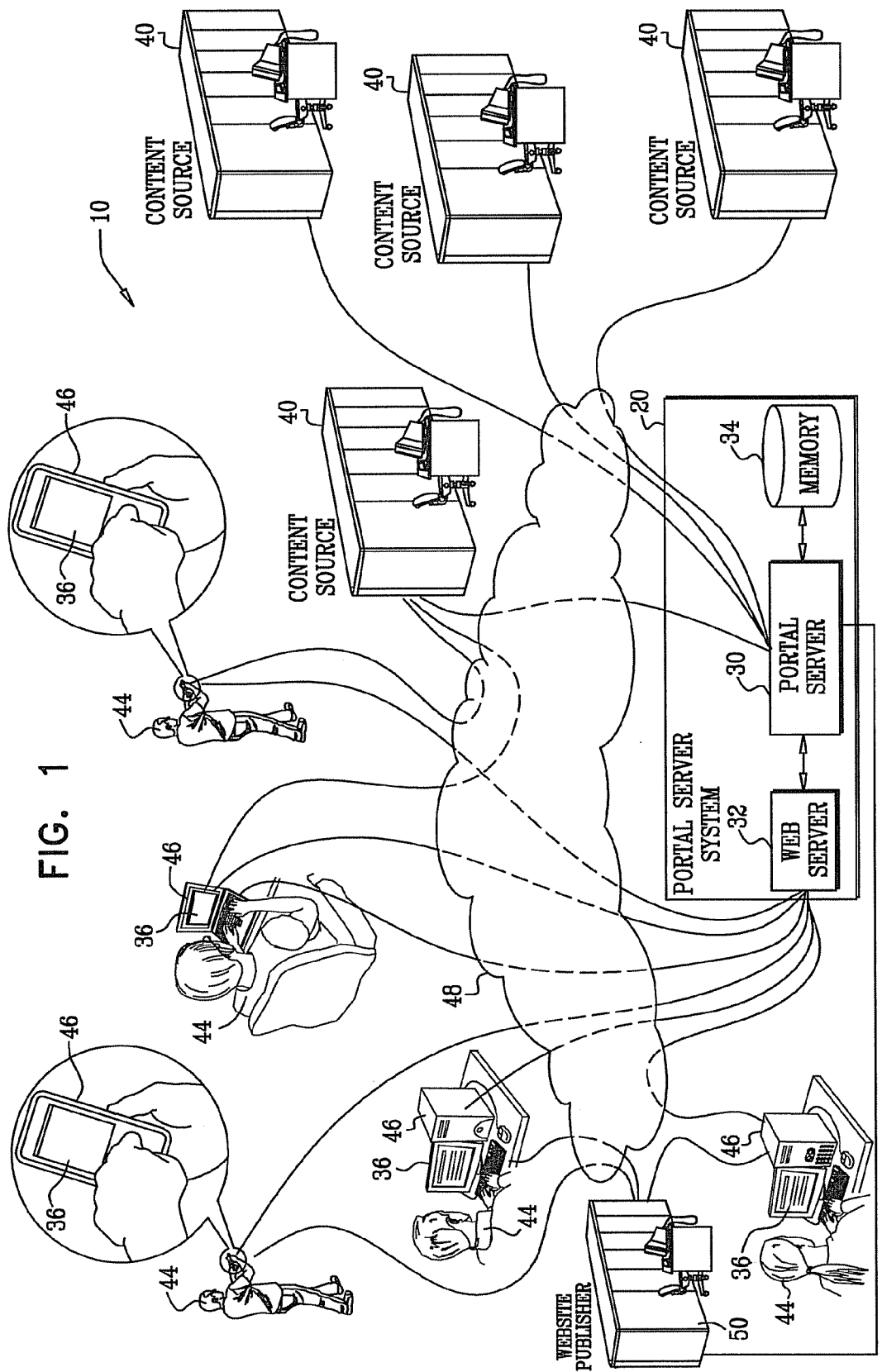
FIG. 1 is a schematic, pictorial illustration of a network environment including a portal server system, in accordance with an application of the present invention.

FIG. 1 is a schematic, pictorial illustration of a network environment 10 including a portal server system 20, in accordance with an application of the present invention. Portal server system 20 comprises a portal server 30, an interface, such as a web server 32, and a memory 34. Network environment 10 further includes a plurality of online content sources 40, which typically comprise respective web servers. Some or all of online content sources 40 may be provided by different entities, including entities other than the entity that operates portal server system 20. Alternatively or additionally, some or all of the content sources may be provided a single entity.

A plurality of users 44 use respective devices 46, such as portable communication devices (e.g., Internet-enabled cellular telephones or handheld computers) or personal computers, to remotely access portal server system 20 via a network 48, such as a wide-area network (WAN), e.g., the Internet. Devices 46 are connected to WAN 48 via wired connections, wireless connections (either local or wide-area), or a combination thereof. For example, some of devices 46 may be connected to WAN 48 via a digital wireless cellular network. Alternatively, one or more of users 44 access portal server system 20 via a local area network (LAN), or both a LAN and a WAN.

Portal server system 20 typically comprises one or more standard computer servers with appropriate memory, processor(s), communication interfaces and software for carrying out the functions prescribed by the present invention. This software may be downloaded to the systems in electronic form over a network, for example, or it may alternatively be supplied on tangible media, such as CD-ROM. Memory 34 comprises a non-volatile memory, such as one or more hard disk drives, and/or a volatile memory, such as random-access memory (RAM).

For some applications, network environment 10 further includes at least one website publisher 50, which typically comprises one or more web servers. Website publisher 50 serves (i.e., delivers) content to devices 46, such as proprietary content or content aggregated from a plurality of content sources. For example, publisher 50 may provide a portal website, such as a news portal. For some applications, as described in more detail hereinbelow, content and/or browser-executable code (e.g., scripts) is served (i.e., delivered) by portal server system 20 to devices 46 for display and/or execution on webpages served by website publisher 50.

Typically, a web browser 36 running on each device 46 communicates with portal server system 20, and, optionally, website publisher 50 and/or content sources 40. Each of devices 46 comprises a processor (i.e., a central processing unit (CPU)), system memory, a non-volatile memory such as a hard disk drive, a display, input and output means such as a touch screen, keyboard, touchpad, and/or a mouse, and a network interface card (NIC).

Figure 2:
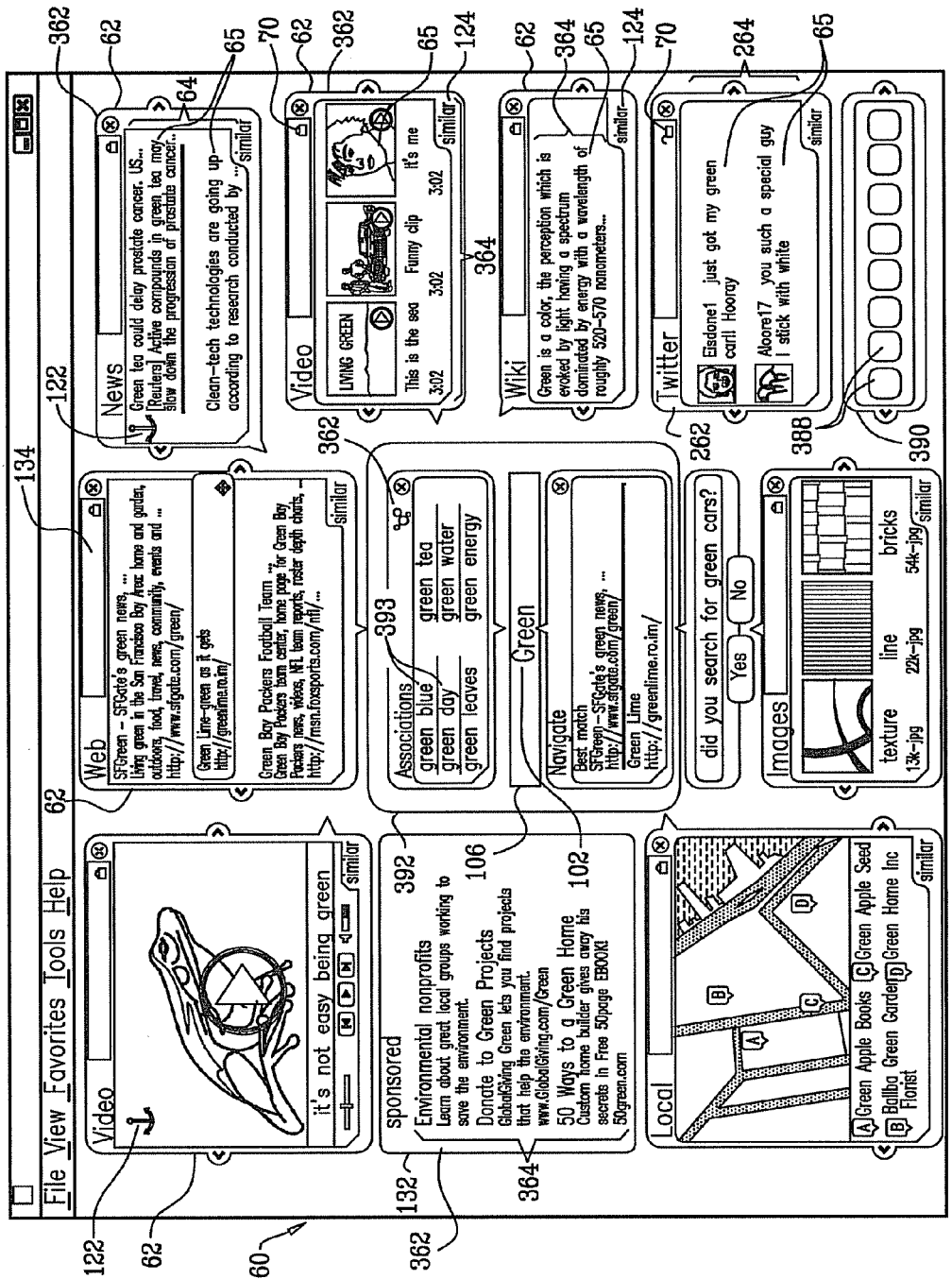
FIG. 2 is a schematic illustration of an exemplary screenshot of a web browser displaying a webpage that includes a plurality of content areas, in accordance with an application of the present invention.

Reference is made to FIG. 2, which is a schematic illustration of an exemplary screenshot of a web browser displaying a webpage 60 that includes a plurality of content areas 62, in accordance with an application of the present invention. For some applications, portal server system 20 generates and serves (i.e., delivers) webpage 60, via at least one web server 32. For other applications, website publisher 50 generates and serves (i.e., delivers) webpage 60.

For some applications, portal server system 20 generates content areas 62 for display on webpage 60. Content areas 62 are typically delineated on the webpage as boxes, as shown in FIG. 2, or other regions having borders. The content areas may be implemented using a client-side scripting language, such as Javascript, and/or various HTML elements, as is known in the art. The scripts of the content areas may communicate with system 20 using protocols such as XML or JavaScript Object Notation (JSON), or other standard or proprietary data interchange formats.

For some applications, one or more of content areas 62 are generated and/or implemented by respective applications running on respective servers, which may, for example, be implemented using server-side scripting in combination with any other programming language(s). For example, the servers may be part of portal server system 20 or website publisher 50, or may be hosted by a third-party entity, such as an online retailer, an online publisher, or an online advertiser. Portal server system and/or web browser 36 may utilize respective APIs of the third-party servers.

For some applications, portal server system 20 serves (i.e., delivers) content areas 62 to the web browser for display on webpage 60 served by website publisher 50. The website publisher includes appropriate HTML elements and/or scripts (e.g., coded in JavaScript) on webpage 60 indicating to the browser the location and other information necessary for requesting the content areas from portal server system 20, and properly displaying the content areas on the webpage. Alternatively or additionally, portal server system 20 serves (i.e., delivers) content areas 62 to website publisher 50, which in turn serves (i.e., delivers) the content areas to the user's browser. Optionally, portal server system 20 communicates with the browser via one or more commercial content delivery networks (CDNs), as is known in the art. Further alternatively or additionally, neither portal server system 20 nor website publisher 50 serves content areas 62 to the web browser. Instead, an application running in the browser (typically a client-side script) generates one or more of the content areas. The browser application communicates with portal server system 20, e.g., using protocols described herein. In response to information and/or instructions received from portal server 20, the browser application directs the content areas to display content items 65 and to perform the other actions of the content areas described herein. Typically, the browser downloads the client application from portal server system 20 or from website publisher 50.

Content areas 62 display respective sets 64 of content items 65 requested from respective one or more online content sources 40 (FIG. 1). Optionally, one or more of content items 65 contain hyperlinks to webpages other than webpage 60, as is known in the art. For some applications, the content items are requested from online content sources 40 by portal server system 20, e.g., using a protocol such as XML, JSON, or SOAP. System 20 in turn serves (i.e., delivers) all or a portion of the content items to the user's browser for display in content areas 62. Alternatively or additionally, the content items are requested directly from online content sources 40 by a client-side script (e.g., applet) running in the web browser and provided by system 20. The web browser may communicate with the content sources using a protocol such as XML, JSON, or RSS. The script selects, edits, and/or orders the content items in response to instructions provided by from system 20.

As described in more detail hereinbelow with reference to FIG. 3, each of content areas 62 typically displays only a portion of content items 65 of the respective set 64, for example, exactly one of the content items, or between two and five of the content items. "Displaying" content items, as used in the present application, including the claims, is effectively accomplished by downloading an object (such as hypertext or code, e.g., a script, written for example in JavaScript) to web browser 36 or another application running on user device 46, which executes the object in order to display the content to the user of the web browser.

For some applications, names of online content sources 40 are displayed in association with respective content areas 62. Alternatively, the names of the online content sources are not displayed. A generic name may instead be displayed for the category of content displayed in the content areas, e.g., "news," "video," "map," "wiki," "Web" (e.g., for Web search results), or "associations." For some applications, system 20 configures at least some of the content areas to have the look and feel of websites associated with respective online content sources 40. For example, the content areas may display logos of the source websites, and/or use one or more colors associated with the source websites. Alternatively, system 20 does not maintain this look and feel, as shown in FIG. 2. Optionally, two different content areas 62 display content received from the same online source 40; typically, in such a case, the content is of different categories specific to the two content areas, respectively.

Portal server system 20 synchronizes the content areas with one another, either automatically or in response to a user instruction to do so, as described in detail hereinbelow. The portal server system typically generates the content areas on the fly, based on interactions with each of users 44. The system updates at least some of the content areas periodically (i.e., streams content), such as in realtime or near realtime, e.g., at least once per second, such at least once per 100 milliseconds.

For some applications, system 20 provides the user the option to lock one or more of content areas 62. In response to an instruction from the user to do so, the system withholds periodically updating the locked content areas, while continuing to periodically update others of the content areas. Such locking enables the user to preserve the display of content of interest to the user. The system may set the default of each content area to locked or unlocked. A lock/unlock icon 70 may indicate whether a given area is locked.

Reference is made to FIG. 3, which is a flow chart that illustrates a method 100 for synchronizing content areas 62 with one another, in accordance with an application of the present invention. Method 100 begins with the receipt by portal server system 20 (e.g., portal server 30 thereof) of an initial anchor term 102 (FIG. 2) that comprises one or more keywords, at an initial anchor term receipt step 104. In this context, "initial" means before the term is updated (e.g., at step 126 below), and does not preclude the receipt of additional anchor terms before receipt of the initial anchor term. The steps of method 100 are typically performed iteratively, to the extent desired by the user. For applications in which the anchor term is updated at step 126, in each subsequent iteration of the method, the updated anchor term generated at step 126 typically serves as the initial anchor term at step 104.

For some applications, the anchor term (and other anchor terms described hereinbelow) comprises an ordered or unordered collection of keywords, which are optionally weighted. Alternatively or additionally, the anchor term (and other anchor terms described hereinbelow) comprises an association graph of keywords (i.e., the keywords are organized in an association graph), such as described in U.S. patent application Ser. No. 12/253,087, filed Oct. 16, 2008, which published as US Patent Application Publication 2009/0119261 to Ismalon, and which is incorporated herein by reference, and/or one or more of the patent applications incorporated hereinbelow by reference.

For some applications, system 20 receives initial anchor term 102 from user 44. For example, the user may enter the term into an anchor area 106 displayed on webpage 60, which anchor area is separate from content areas 62. Anchor area 106 is typically provided on webpage 60 using techniques described hereinabove for providing content areas 62. For some applications, system 20 completes receiving initial anchor term 102 only upon the user providing an indication that the complete anchor term has been entered, such as by pressing the "enter" key on a keyboard or clicking on a button displayed on the webpage. For other applications, system 20 treats a first word entered by the user as initial anchor term 102 even in the absence of an indication by the user. The system then typically appends each additional word entered by the user after the first word to form a longer, updated anchor term, which is processed by the system using the techniques used to process the initial anchor term. The system thus presents content related to the single-word initial anchor term, as described hereinbelow, during the period before subsequent word(s) are added by the user, and content related to the subsequent multi-word anchor term(s) as the user enters the additional word(s). The presented content is thus updated in realtime as the user continues to enter the anchor term. For some applications, the system provides suggested autocomplete words or phrases as the user types in each word or phrase, as is known in the search engine art (for example, using a dictionary, and/or popular or trendy search terms entered by other users, and/or based on a profile of the user or a community of users to which the user belongs). Optionally, the system uses one or more of the autocomplete suggestions as the anchor term even before the user selects an autocomplete suggestion, in order to provide the user with potential interesting content in content areas 62 even before the user completes entering the term.

The user may change the anchor term during use of the system, before, during, or after the system performs the method 100 or method 200, described hereinbelow with reference to FIG. 4. For example, the user may change the anchor term by entering a new anchor term, or by modifying the anchor term by selecting refinement terms, as described hereinbelow with reference to FIG. 2 regarding association area 392. Typically, the system provides the user with the option of refreshing content items 65 if the displayed content items do not match the user's current interests, such as by clicking on a refresh button in anchor area 106.

For applications in which the user uses the anchor area for conducting a search, the content areas of webpage 60 provide the user with a panoramic, holistic, and comprehensive view of the search results, thereby increasing the overall likelihood of the user finding the content he or she is seeking.

Alternatively, system 20 receives the initial anchor term from a source other than user 44, such as a previously-viewed webpage from which the user arrived at webpage 60. For example, system 20 may analyze the content of the previously-viewed webpage to identify key terms on the webpage (e.g., using latent semantic indexing (LSI), a latent Dirichlet allocation (LDA), or a bag of words approach), or the system may use metadata available regarding the webpage, e.g., a document association graph previously generated, such as using techniques described in the above-mentioned U.S. patent application Ser. No. 12/253,087 and/or in one or more of the applications incorporated by reference hereinbelow. Further alternatively, the system receives the initial anchor term by generating the term from a user profile of user 44, a profile of a community of users to which the user belongs, or a profile of all users, for example using techniques described in one or more of the applications incorporated by reference hereinbelow.

Still further alternatively or additionally, the system receives the initial anchor term by identifying or receiving a popular or trendy term. For example, the term may be extracted from offline or online content, e.g., using an API of a third-party website, or the system may derive the term by analyzing terms of interest to other users. For example, the term may be extracted from analysis of trends in the World-wide Web, trends in social sites (e.g., tweets), or a publisher's website. The analysis may be performed by the system, or by another source, e.g., received by the system via an API provided by the other source. The content displayed in content areas 62 is thus of relevance to the popular or trendy term that has been anchored (i.e., serves as the current anchor term), and thus provides the user with a panoramic, holistic, and comprehensive view of content related to the popular or trendy term. For some applications, the system periodically updates the anchor term by identifying or receiving a currently popular or trendy term, either automatically (i.e., without being instructed to do so by the user), or upon receiving a request from the user to do so. The system thus continuously streams content to content areas 62 that is currently relevant to popular or trendy items of interest. Typically, the system attempts to provide content of possible interest to the user, even in the absence of feedback or instructions from the user. Typically, the system defers to the user's directions (such as entering a term or providing a synchronization instruction) when the user provides such directions, and uses other approaches to identify possibly relevant content and/or keep the content fresh when the user does not provide directions. Thus, unless indicated otherwise, many actions performed in the methods described herein do not require input from the user, such as entering text or clicking on search button, as a condition for performance of the actions.

System 20 does not necessarily display the anchor term to the user, and webpage 60 does not necessarily display anchor area 106. Such lack of display of the anchor term may be particularly appropriate for configurations of the system in which the anchor term is not entered or otherwise designated by the user.

At an initial content request step 110 of method 100, system 20 requests and receives, from one or more content sources 40, respective initial sets 64 of one or more content items 65 related to the anchor term, e.g., generated by the online content sources responsively to the anchor term (content items 65 are typically different from the anchor term). System 20 requests and receives the content items by interacting with servers of online content sources 40, typically via WAN 48. For some applications, the system requests the sets of content items using respective search facilities of the online content sources, by providing a search query based on initial anchor term 102. For example, the system may use the search facility by sending HTTP requests to the content sources, which HTTP requests request the content items, and receiving the content items in response to the HTTP requests. For these application, system 20 appears to be a web browser to the online content sources. The online content source sites return webpages, which the system parses to extract the content items. Alternatively or additionally, system 20 utilizes application programming interfaces (APIs) offered by the online content sources that include a method to receive the content items in response to submission of a query. System 20 may communicate with the online content sources using protocols such as XML, JSON, or SOAP. Further alternatively or additionally, for applications in which an online content source comprises a database, such as a relational database, system 20 requests the sets of content items using a database query, such as an SQL query.

As mentioned above, each of content areas 62 typically displays only a portion of content items 65 of the respective set 64. For some applications, in order to select the portion of the content items from a given set received from one or more content sources, portal server system 20 ranks the content items of the set, and selects one or more of the highest-ranked content items as the portion. Optionally, the system performs such ranking responsively to a profile of the particular user 44, a community of users to which the user belongs, or the entire population of users of system 20, such as using techniques described in the above-referenced U.S. patent application Ser. No. 12/253,087, and/or one or more of the other patent applications incorporated hereinbelow by reference. Alternatively or additionally, the system ranks the content items by performing an analysis of at least a portion of the content items received from the online content sources, and ranking responsively to the analysis. Alternatively, some of the content areas display the entire respective sets of content items.

Alternatively or additionally, a client-side application (typically a script) executed by web browser 36 requests and receives the respective initial sets 64 of content items 65 directly from one or more content sources 40. The client-side application typically communicates with system 20, which provides instructions to the application regarding the ranking of the content items, how many and/or which of the content items to display, and/or which portions of the content items to display. In order to enable system 20 to provide such instructions, the web browser may send initial sets 64 to system 20 and/or system 20 may receive initial sets 64 directly from one or more content sources 40. Such communication may use protocols such as XML or JSON.

At a webpage generation step 112, a webpage 60 is generated, which includes the plurality of content areas 62 associated with respective initial sets 64. For some applications, webpage 60 is generated by system 20, while for other applications, webpage 60 is generated by website publisher 50, as described above. Web server 32 of system 20, or a web server of website publisher 50, serves (i.e., delivers) the webpage to one of users 44, at a webpage serving step 114. Typically, system 20 serves the content in realtime or near realtime (i.e., streams the content), such as within one second after requesting the respective content items from the content sources, e.g., within 100 ms after requesting.

Typically, web browser 36 receives a portion of webpage 60 before receiving the content areas and their content. As mentioned above, the content areas may be implemented using a client-side scripting language, such as Javascript, and/or various HTML elements, as is known in the art. An application (typically a script) executed by the web browser communicates with system 20 to generate the content areas on webpage 60, and receives the content items from system 20 and/or content sources 40, as described above. For some applications, system 20 serves content areas 62 to website publisher 50, which in turn serves the content areas to the user's browser.

Initial content request step 110 may be performed before, after, or at the same time as webpage generation and serving steps 112 and 114.

Because system 20 uses the same anchor term 102 for requesting different categories of content from online content sources 40, content areas 62 display respective sets 64 of content items 65 that are related to, although different from, one another. For example, respective ones of the content areas 62 may display content of the following respective content categories:

- one or more video clips regarding anchor term 102, requested from one or more video sharing websites;
- one or more news items regarding anchor term 102, requested from one or more news websites;
- one or more search results regarding anchor term 102, requested from one or more search websites;
- one or more social updates regarding anchor term 102, requested from one or more social networking sites; for example, such social updates may comprise tweets, such as provided by Twitter.com, or news feeds provided by one or more social networks such as Facebook;
- one or more messages (e.g., instant messages) regarding anchor term 102, requested from one or more instant messaging or chat sites;
- one or more advertisements associated with anchor term 102, requested from one or more ad servers;
- one or more blog entries regarding anchor term 102, requested from one or more blog websites;
- one or more encyclopedia entries (typically abstracted) regarding anchor term 102, typically requested from one or more wiki websites or other encyclopedia websites;
- one or more images regarding anchor term 102, requested from one or more image search websites;
- one or more maps regarding anchor term 102, requested from one or more mapping websites;
- financial information regarding anchor term 102 (e.g., stock quotes), requested from one or more financial websites;
- messages regarding anchor term 102, requested from one or more Internet forums (message boards); and
- other terms associated with anchor term 102, requested from one or more search websites.

Alternatively or additionally, for some applications, one or more of the content areas display content regarding a term other than the anchor term. The term may be generated by the system in response to a user instruction to synchronize one or more of the content areas with content of another content area, such as described hereinbelow.

For some applications, more than one content area 62 display content items 65 of the same category, either provided by the same set of one or more online content sources 40, or by different sets of one or more online content sources 40. For example, this may enable a user to synchronize content of the same category between content areas provided by different content sources 40, or even by the same content source(s) 40.

At a user synchronization instruction step 120, system 20 receives from the user: (a) a selection of at least one (e.g., exactly one) of content items 65 of a first one of initial sets 64 (shown in FIG. 2), and (b) an instruction to synchronize one or more of content areas 62 with the selected at least one of the content items. For some applications, the system receives the selection and instruction directly (or via a CDN) from a script running on the user's web browser. For other applications, the system receives the selection and instruction indirectly via website publisher 50; for these applications, the web browser sends the selection and instruction to website publisher 50, which relays the selection and instruction to system 20. For some applications, the user makes the selection by clicking on and/or dragging a graphical element 122, such as an icon, displayed in association with the selected at least one of the content items. (Optionally, when the user moves the cursor over graphical element 122, a mouse tip is displayed, such as "anchor it.") For some applications, a separate element 122 is displayed in association with each of content items 65 and/or with each of content areas 62 (e.g., in the area, or outside the area in a vicinity thereof). Alternatively or additionally, the user makes the selection by clicking on and/or dragging the selected at least one of content items 65 itself, i.e., the text and/or video or still images that comprise the content item. Further alternatively or additionally, the user makes the selection by clicking on and/or dragging content area 62 itself, such as the entire content area or a portion thereof, e.g., a border, header, or footer thereof. For some applications, the at least one of content items 65 is not displayed in any of content areas 62, but is instead displayed elsewhere on webpage 60.

For some applications, the user makes the selection and gives the synchronization instruction in a single action, such as clicking on graphical element 122 or the selected at least one of the content items. For other applications, the user makes the selection and gives the instruction in separate actions, such as clicking on element 122 or the selected content item to make the selection, and clicking on a separate graphical element, and/or dragging, to give the instruction.

For some applications, system 20 receives the selection and synchronization instruction from user 44 by receiving an indication of dragging, by the user within the user's web browser 36, of graphical element 122 or the selected at least one (e.g., exactly one) of the content items, and of dropping, by the user, of the dragged item into another area of webpage 60 (i.e., an area of the webpage at which the at least one of the content items is not displayed). For example, the other area may be anchor area 106, another of content areas 62, a graphical element displayed in association with another of content areas 62, or an empty area of webpage 60, as described hereinbelow. Alternatively, system 20 receives the selection and synchronization instruction using other techniques known in the art for indicating selections in a web browser.

For some applications, the user instruction received at step 120 (to synchronize one or more of content areas 62 with the selected at least one of the content items) may instruct the system to synchronize:

(a) all of content areas 62 (including the area displaying the selected at least one of the content items);

(b) all of content areas 62 other than the area displaying the selected at least one of the content items;

(c) a particular one of the other content areas; or (d) only the content area displaying the selected at least one of the content items.

For example, for options (a) or (b), the user may instruct the system to synchronize the content areas by dragging graphical element 122, or the selected at least one (e.g., exactly one) of the content items, and dropping into anchor area 106 (which is displayed on the webpage separately from the content areas) or an empty area of webpage 60 (FIG. 2). For option (c), the user may instruct the portal server system to synchronize a particular content area by dragging element 122, or the selected at least one (e.g., exactly one) of the content items, and dropping into the particular content area 62, or a graphical element displayed in association with the particular content area. For option (d), the user may instruct the portal server system to synchronize the content area displaying the selected at least one (e.g., exactly one) of the content items by clicking on a graphical element 124 displayed in association with the area (such as in the area), e.g., labeled "similar." Examples of the synchronization in accordance with options (a) and (c) are provided hereinbelow with reference to FIGS. 5A-D.

For some applications, responsively to the selection and the synchronization instruction, system 20 generates an updated term, at an updated term generation step 126. Typically, the system generates the updated term related to (e.g., responsively to) the selected at least one of content items 65. For example, the system may generate the updated term by:

extracting keywords that characterize the at least one of content items 65, from the content item, and/or from the context in which the content item was presented by its online content source 40. Such keywords may, for example, be determined using latent semantic indexing (LSI), a latent Dirichlet allocation (LDA), and/or a bag of words;

using one or more association graphs associated by system 20 with the at least one of content items 65, such as using techniques described in the above-mentioned U.S. patent application Ser. No. 12/253,087, and/or one or more of the patent applications incorporated hereinbelow by reference. For some applications, the system constructs an association graph for a content item using the techniques described in the '087 application for constructing a document association graph (DAG), treating the content item as a document, such that, for example, the association graph represents the interactions between the content item and a plurality of searches conducted by a plurality of users, and provides information regarding the associations of key search terms with the content item. These techniques are generally applicable to content items that include textual material, as well as content items that include no (or very limited) textual material, such as video or still image content items;

using semantic information and/or metadata provided by an API of the respective content source 40; and/or identifying keywords or terms of topics that characterize the at least one of content items 65, for example using topic identification techniques described in the above-mentioned U.S. patent application Ser. No. 12/253,087, and/or one or more of the patent applications incorporated hereinbelow by reference.

When generating the updated term, the system may optionally take into account a profile of the user, a profile of a community of users to which the user belongs, or a global profile of all users of the system, such as described in U.S. patent application Ser. No. 12/253,087 and/or one or more of the patent applications incorporated hereinbelow by reference. Optionally, for applications in which the anchor term is being updated, the system generates the updated anchor term partially responsively to keywords of the anchor term prior to its being updated.

For example, the system may generate the updated anchor term based on an intersection of (i) an association graph associated with the at least one of content items 65, and (ii) semantic information provided by an API of the respective content source 40, taking into account a profile of the user, a profile of a community to which the user belongs, and/or a global profile of all users of the system, for example using techniques described in the above-mentioned U.S. patent application Ser. No. 12/253,087. For some applications, the system generates a plurality of anchor terms, and at step 130 below, requests and receives respective updated sets 64 of content for the anchor terms, combines the updated sets for each content area, and ranks the combined sets, for example using techniques described in the above-mentioned U.S. patent application Ser. No. 12/253,087 (e.g., with reference to FIG. 15 thereof).

Reference is still made to FIG. 3. When the user instruction received at step 120 instructs the system to synchronize all of content areas 62 including or excluding the selected area (in accordance with options (a) or (b) described hereinabove, respectively), the system causes web browser 36 to display, in content areas 62 to be synchronized, respective updated sets 64 of content items 65 that are related to the selected at least one (e.g., exactly one) of the content items. Two or more content items are "related to" one another because they are connected by shared characteristics. For example, the content items may include, be characterized by, be tagged with, and/or be associated with one or more of the same terms (i.e., set of one or more keywords), and/or one or more of the same topics. Alternatively or additionally, the content items may be related to one another and/or associated with one another, for example, as derived using one or more association graphs, such as using techniques described in the above-mentioned U.S. patent application Ser. No. 12/253,087, and/or one or more of the patent applications incorporated hereinbelow by reference. Alternatively or additionally, the content items may be related to one another if a number of users have expressed an interest in both of the content items, such as by selecting both of the content items or transitioning from viewing one content item to viewing the other content item. As described herein, the system may cause the web browser to display the content items by sending the content items to the browser in a format indicative to the browser to display the content (e.g., tagged with appropriate HTML elements), and/or by providing instructions to the web browser to download the content items from one or more online sources 40.

For some applications, in order to generated the updated sets 64 of content items 65 that are related to the selected at least one of the content items, the system updates the anchor term at step 126, in order to generated an updated anchor term. In these cases, at an updated content request step 130, system 20 requests and receives respective updated sets 64 of content items 65 related to (e.g., generated responsively to) the updated anchor term (content items 65 are typically different from the updated anchor term). The system requests these updated sets from the one or more content sources 40 that respectively generated initial sets 64 of content items 65 displayed by the one or more of content areas 62 selected by the user at user synchronization instruction step 120 (i.e., in accordance with option (a) or (b) described hereinabove). The system typically requests these updated sets using the same techniques used for requesting the initial sets at initial content request step 110. The system updates the one or more of the content areas 62 to display at least portions of the updated sets 64 of content items 65, respectively, at an update content areas step 134. Alternatively, a client-side application (typically a script) executed by web browser 36 requests and receives the respective updated sets 64 of content items 65 directly from content sources 40. The client-side application typically communicates with system 20, which provides instructions to the application regarding the ranking of the content items, how many and/or which of the content items to display, and/or which portions of the content items to display. In order to enable system 20 to provide such instructions, the web browser may send updated sets 64 to system 20 and/or system 20 may receive updated sets 64 directly from content sources 40. Such communication may use protocols such as XML or JSON.

For some applications in which the initial anchor term is displayed to the user in anchor area 106, the system updates the anchor area to display the updated anchor term. The system typically updates the anchor area for application in which the user drags element 122, or the selected at least one of the content items, into the anchor area, as described hereinabove. Alternatively, the system does not update the anchor area, and continues to display the initial anchor term in the area, even after the updated anchor term has been generated. Further alternatively, the system ceases to display the initial anchor term in the area, but does not display the updated anchor term.

Alternatively, when the user instruction received at step 120 instructs the system to synchronize a particular one of the other content areas with the selected at least one of the content items (option (c)) (such as by dragging element 122, or the selected at least one of the content items, and dropping into the particular content area 62), the system causes web browser 36 to display, in the particular content area 62, an updated set 64 of content items 65 that are related to the selected at least one (e.g., exactly one) of the content items.

For some applications, in order to generate the updated set 64 of content items 65 that are related to the selected at least one of the content items, the system generates an updated term at step 126 for the selected particular one of the other content areas (the term is considered updated, because the content of the particular content area was previously generated based on anchor term 102 or another term generated by the system in response to the user's previous instructions). In this case, at updated content request step 130, the updated term is typically used to request and receive exactly one updated set 64 of content items 65 for the selected particular one of the other content areas. The updated term is generally different from anchor term 102 used to generate content for some or all of the other content areas. As the user continues to synchronize various ones of the content areas, additional content areas may be assigned their own, unique terms. This user behavior may result in local synchronization of one or more pairs of content areas, but a lack of global synchronization between the content areas. Optionally, the system provides the user with the option of globally resynchronizing all of the content areas, such as by dragging a content item, or a graphical element 122 associated with a content item, into anchor area 106, and/or clicking on an icon or button in anchor area 106 that instructs the system to refresh the content areas based on the anchor term currently displayed in anchor area 106.

Optionally, for applications in which the user instructs the system to synchronize a particular one of the other content areas (option (c)), at updated content request step 130, system 20, when requesting respective an updated set 64 of content items 65 related to the updated term, takes into account content items 65 currently displayed in the particular one of the other content areas (i.e., prior to the current update) (content items 65 are typically different from the updated term). For example, the system may request the updated set 64 using a combination of the updated term and one or more additional terms representative of the content items currently displayed in the particular one of the content areas. The system may, for example, ascertain these additional terms by analyzing the currently displayed content items, such as using techniques described hereinabove at updated term generation step 126, and/or by taking all or a portion of a previous anchor term used to generate the currently displayed content items. For some applications, this technique may be used when more than one content area 62 display content items 65 of the same category, as described above. For example, if a user drags a content item from a first content area 62 displaying social networking content to second content area 62 also displaying social networking content (received from the same or a different social network), the one or more content items 65 displayed in the second content area may be updated to reflect a combination of characteristics of the content item dragged into the second content area and the content previously displayed in the second content area. Alternatively, the system does not take into account the content items currently displayed in the particular one of the other content areas.

For some applications, system 20 updates advertising content displayed in an advertising content area 132 (FIG. 2) in response to the synchronization instructions received at user synchronization instruction step 120. The system may perform such updating regardless of the user's particular instruction regarding which content areas to update. Alternatively or additionally, the system may perform such updating in response to a specific user request indicated, for example, by the user's dragging, into advertising content area 132, element 122, the selected at least one of the content items, or graphical element 302 described hereinbelow with reference to FIG. 6. For example, the advertising content may be updated by sending a request to an ad server using the updated anchor term. For some applications, the advertising content is provided and updated using techniques described in U.S. patent application Ser. No. 12/023,564, filed Jan. 31, 2008, which published as US Patent Application Publication 2008/0215416 to Ismalon, and which is incorporated herein by reference. For example, advertising content area 132 may comprise an interactive advertisement, as described in the '416 publication. Optionally, a search field of the interactive advertisement is populated using one or more of the keywords of the current anchor term, or a term derived from a content item dragged into the interactive advertisement, such as described hereinabove.

For some applications, portal server system 20 periodically updates the content items displayed in one or more of the content areas, typically without requiring webpage 60 to be again served in its entirety. The portal server system performs such automatic updating without requiring an action to be performed by the user, e.g., the user does not need to click on or otherwise activate an "update" or "search" button or icon, and the user does not need to refine a search. For some applications, system 20 periodically requests updated content items 65 from respective one or more online content sources 40, and updates the respective content areas 62 to display the updated content items, typically without requiring webpage 60 to be again served in its entirety. The portal server system thus presents the user with realtime or near realtime content, e.g., at least once every minute, once every 30 seconds, or once every 10 seconds. The displayed content may change, for example, because the online content sources indexes new content. Alternatively or additionally, for some applications, the portal server system updates the content items displayed in one or more of the content areas by displaying a different subset of the content items previously received from the respective one or more online content sources. For example, the portal server system may automatically change the ranking of the content items in a given content area, for example, based on interactions of other users with the content, such as other users on the Web and/or other users of the portal server system. Because only a small subset that includes the highest-ranked content items received from a given set of one or more online content sources is typically displayed in a content area, changing the ranking generally causes a different subset of the content items to be displayed. Alternatively, system 20 instructs one or more client-side applications (typically a scripts) executed by web browser 36 to periodically update the content items displayed in one or more of the content areas.

Reference is now made to FIG. 4, which is a flow chart that illustrates a method 200 for synchronizing content areas 62 with one another, in accordance with an application of the present invention. In this application, exactly one of content areas 62 serves as an anchor content area, and at least some of the other content areas are synchronized with this anchor content area. For some applications, portal server system 20 implements at least a portion of the techniques both of method 100, described hereinabove with reference to FIG. 3, and of method 200. For example, the system may allow the user to select which of the techniques to perform at any given time. Because there is some overlap between the techniques of methods 100 and 200, as described hereinbelow, the system may utilize the overlapping steps for performing both methods.

Method 200 begins with the same first four steps as method 100, namely initial anchor term receipt step 104, initial content request step 110, webpage generation step 112, and webpage serving step 114, as described hereinabove with reference to FIG. 3. As mentioned above, these steps are not necessarily performed in this order. Alternatively, the content in one or more of the content areas is not related to the anchor term.

Method 200 continues with the designation (typically by system 20 and/or web browser 36) of exactly one of the content areas as an anchor content area 262, at an anchor area designation step 202. For example, a social updates content area 62 is shown as anchor content area 262 in FIG. 2. For some applications, the designation is performed in response to a user command selecting a particular one of the areas as the anchor area. For example, the user may click on an icon or selection area associated with the desired area. Optionally, the system makes fewer than all of the areas available for selection as an anchor area; typically, only those areas are made available that display content items 65 that change frequently at the respective one or more online sources 40. Anchor content area 262 is associated with an anchor set 264 of content items 65.

One or more of content areas 62 other than anchor content area 262 are designated (typically by system 20 and/or web browser 36) as synchronized content areas 362, at a synchronized areas designation step 204. For example, a wiki content area 62, an advertisement area 62, a news area 62, and a video area 62 are shown as synchronized content areas 362 in FIG. 2. For some applications, the designation is performed in response to a user command selecting the synchronized areas. For example, the user may click on respective icons or selection areas associated with the desired areas. For other applications, the system automatically designates all or a portion of the content areas other than anchor content area 262 as synchronized areas 362. Synchronized content areas 362 are associated with respective synchronized sets 364 of content items 65.

At a content area update step 206, system 20 periodically updates some of content areas 62 in synchronization. To do so, at an anchor set update step 207, system 20 updates anchor set 264 of content items 65 by requesting the anchor set of content items from the respective one or more online content sources 40, using the techniques of initial content request step 110, described hereinabove with reference to FIG. 3. Anchor set 264 may change, for example, because online content sources 40 have indexed new content since the system last requested content items 65, and/or because the online content sources have changed the ranking of provided content since the system last requested content items 65. For example, if social updates content area 62 is designated as anchor content area 262, the social content provided as content items 65 by online content sources 40 may change frequently based on social updates provided by social network members.

For some applications, the system performs such updating automatically. The term "automatically," as used in the present application, including the claims, means without receiving a specific command from the user to perform the particular update, but does not preclude receiving a configuration or instruction from the user to periodically perform such updates. For example, such updating may be performed at a rate of at least once every 30 seconds, no more than once every 5 minutes, and/or once every 30 seconds to once every 5 minutes. The rate is set to be fast enough to provide the user with generally constantly updated content, but slow enough to allow the user to read and understand the updated content before it is again updated. Optionally, the system allows the user to set the rate. For some applications, the system calculates the rate based on, for example, the average length of the content (e.g., a user can read a tweet more quickly than a wiki entry). The rate may be either variable or fixed. Alternatively or additionally, the system calculates the rate based on observed user behavior, such as the speed of a particular user's interaction with content (or an average for a group of the users). The system may calculate an amount of time sufficient to present information in each of the different content areas. Alternatively, the system performs such updating upon receiving a command from the user to do so, e.g., an indication that the user has clicked on a right or down arrow.

System 20 performs an analysis of the updated anchor set of content items, and generates an updated anchor term responsively to the analysis, at an update anchor term step 208. Typically, the system generates the updated anchor term responsively to the one or more content items 65 displayed in anchor content area 262. For example, the system may extract keywords that characterize the one or more displayed content items 65, from the content items, or from the context in which the one or more content items were presented by its online content source 40. Such keywords may, for example, be determined using latent semantic indexing (LSI), a latent Dirichlet allocation (LDA), and/or a bag of words. Alternatively or additionally, the system generates the updated anchor term using an association graph associated by system 20 with the content items 65, such as using techniques described in the above-mentioned U.S. patent application Ser. No. 12/253, 087, and/or one or more of the patent applications incorporated hereinbelow by reference. Further alternatively or additionally, the system generates the updated anchor term using semantic information provided by an API of the respective content source 40. Further alternatively or additionally, the system generates the updated anchor term responsively to keywords or terms of topics that characterize the content, for example determined using topic identification techniques described in one or more of the patent applications incorporated hereinbelow by reference.

Optionally, when generating the updated anchor term, the system may analyze only a highest-ranked portion of content items 65 of the anchor content set, e.g., only those content items selected for display in anchor content area 262. For example, the portal server system may automatically change the ranking of the content items in a given content area, for example, based on interactions of other users with the content, such as other users on the Web and/or other users of the portal server system. Thus, the anchor term may change based on an updated ranking of the content items, even if there has been little or no change to the complete set of content items received from the one or more online content sources.

When generating the updated anchor term, the system may optionally take into account a profile of the user, a profile of a community of users to which the user belongs, or a global profile of all users of the system, such as described in the above-mentioned U.S. patent application Ser. No. 12/253, 087, and/or one or more of the other patent applications incorporated hereinbelow by reference. Optionally, the system generates the updated anchor term partially responsively to keywords of the anchor term prior to its being updated.

For some applications in which the initial anchor term is displayed to the user in anchor area 106, the system may update the anchor area to display the updated anchor term. Alternatively, the system does not update the anchor area, and continues to display the initial anchor term in the area, even after the anchor term has been updated.

At an updated content request step 210, system 20 requests and receives respective updated synchronized sets 364 of content items 65 in response to an analysis of the updated anchor set 264 of content items 65. Typically, the analysis identifies, for inclusion in synchronized sets 364, and/or for display in the synchronized content areas, content items 65 that are related to the content items of updated anchor set 264. For some applications, system 20 requests and receives respective updated synchronized sets 364 of content items 65 generated responsively to the updated anchor term. The system requests these updated sets from the one or more content sources 40 that respectively initially generated the synchronized sets 364 of content items 65. The system typically requests these updated sets using the same techniques used for requesting the initial sets at initial content request step 110, described hereinabove with reference to FIG. 3. Alternatively, one or more client-side applications (typically a scripts) executed by web browser 36 requests and receives the respective updated synchronized sets 364 of content items 65 directly from content sources 40. The client-side application typically communicates with system 20, which provides instructions to the application regarding the ranking of the content items, how many and/or which of the content items to display, and/or which portions of the content items to display. In order to enable system 20 to provide such instructions, the web browser may send updated synchronized sets 364 to system 20 and/or system 20 may receive updated synchronized sets 364 directly from content sources 40. Such communication may use protocols such as XML or JSON.

System 20 updates anchor content area 262 to display at least a portion of the updated anchor set 264 of content items 65, at an update anchor content area step 212. At a synchronization step 214, system 20 automatically synchronizes synchronized content areas 362 to display at least portions of updated synchronized sets 364 of content items 65, respectively. Typically, system 20 performs steps 212 and 214 without requiring webpage 60 to be again served in its entirety. For some applications, the server synchronizes the synchronized content areas at once every minute, no more than one every five minutes, and/or once every one to five minutes. This rate generally maintains the relevance of synchronized content areas 362 to the current content of anchor area 262, while providing the user with sufficient time to view the content in the synchronized areas before it changes yet again.

As a result of this synchronization, one or more of the synchronized content areas displays content of potential relevance to the user, in light of the content currently displayed in the anchor content area. As the content in the anchor area changes, the content in the synchronized content areas is automatically updated to be of continued relevance. The content displayed in the synchronized content areas thus may serve to provide the user with a better understanding of the content being streamed in the anchor content area.

For example, assume that anchor content area 262 in FIG. 2 comprises a social updates content area 62, and that synchronized content areas 362 in FIG. 2 comprise a wiki content area 62, an advertisement area 62, a news area 62, and a video area 62. Further assume that social updates content area 62 is updated to display a content item 65 that discusses a certain person. As a result, system 20 analyzes the updated content item, and identifies the name of the person (or an association graph associated with the person) as an updated anchor term. The system uses the updated anchor term to retrieve content items regarding the person from respective one or more online sources 40 for synchronized content areas 362. The system automatically updates synchronized content areas 362 to display at least a portion of these updated content items. For example, the system may update wiki content area 62 to display an abstract of a wiki article about the person, advertisement area 62 to display an advertisement related to the person, news area 62 to display headlines regarding the person, and/or video area 62 to display one or more videos of the person.

For some applications, the advertising content displayed in advertisement area 62 is updated using techniques described in the above-mentioned U.S. patent application Ser. No. 12/023,564.

For some applications, system 20 provides the user the option to lock one or more of content areas 62. In response to an instruction from the user to do so, the system withholds periodically updating the locked content areas at step 206, while continuing to periodically others of the content areas at step 206. Such locking enables the user to preserve the display of content of interest to the user.

The techniques of method 200 may be performed in combination with those of method 100, described hereinabove with reference to FIG. 3, or may be performed separately. For example, the user may designate one of content areas 62 as anchor area 262, and also provide an instruction to synchronize the content of one or more of the areas with a content item displayed in the anchor area or in another of the areas.

Reference is again made to FIG. 2. As can be seen in the figure, the graphical user interface (GUI) provided by portal server system 20 comprises content areas 62 and, optionally, anchor area 106, which are configured to provide the functionality described herein. Optionally, the GUI comprises additional elements and/or provides additional functionality, as described below.

For some applications, system 20 provides at least one of content areas 62 with a search field 134 (FIG. 2). After the webpage and content area are served to the web browser, system 20 receives a search query entered by the user into search field 134. Responsively to the search query, system 20 updates the portion of content items 65 displayed in the content area, by receiving new content items from respective one or more content sources 40 in response to the search query. For some applications, system 20 performs the search using only the terms of the search query entered by the user, while for other applications the system adds context to the search query based on the content items already displayed in the content area. This search functionality allows the user to change his or her interests only for a particular content area, while preserving different interests for other content areas. For some applications, the system provides search functionality that provides additional similar content items, by performing a context-based search of the content displayed in the content area. The system may provide the areas with an icon that allows the user to request such similar content (e.g., labeled "similar").

For some applications, when performing method 100, described hereinabove with reference to FIG. 3, or method 200, described hereinabove with reference to FIG. 4, system 20 is configured to receive a request from the user to enlarge one of content areas 62. Responsively to the request, the system enlarges the one of the content areas and, optionally, reduces respective sizes of others of the content areas, in order to make room on webpage 60 for the enlarged area. Optionally, the user may request that the selected content area be resized to occupy most of webpage 60, in which case the system may display icons representing the other content areas, such as in tray 390, described hereinbelow. This feature may be particularly useful when webpage 60 is displayed on a portable communication device having a relatively small display screen, such as a cellular phone. The system may also enable to rearrange and/or otherwise customize the arrangement, location, or appearance of the content areas or webpage, including deciding which content areas to include. The system may provide a large number of content areas, and allow the user to select a portion of the content areas for inclusion on the webpage. Alternatively or additionally, the system may personalize the webpage arrangement, including which content areas to present, based on the user's behavior, usage, or profile. For applications in which website publisher 50 serves webpage 60, the website publisher may perform or assist in the performance of the techniques described in this paragraph.

For some applications, when performing method 100, described hereinabove with reference to FIG. 3, or method 200, described hereinabove with reference to FIG. 4, system 20 is configured to set respective levels of prominence of at least some of content areas 62 responsively to respective levels of relevancy of the respective sources to the initial or updated anchor term, for example determined by the system using techniques described in one or more of the patent applications incorporated by reference hereinbelow. For example, the system may set the levels of prominence by setting sizes, colors, or other features of the areas, or by highlighting certain of the areas. For applications in which website publisher 50 serves webpage 60, the website publisher may perform or assist in the performance of the techniques described in this paragraph.

For some applications, system 20 configures content areas 62 to provide functionality for receiving a user request to display additional content items, such as a next/previous icon set. Typically, each content area displays between one and three content items at any given time, although a content area may sometimes display no content items (in which case the system typically displays a message apologizing for not finding any results) or more than three content items. For some applications, a content area displays one primary content item with a relatively high level of detail, and one or more secondary content items with a relatively low level of detail, e.g., synopsized. These secondary content items may, for example, be displayed near the bottom of the area. For some applications, system 20 configures content areas 62 to provide an expansion icon. Upon selection of the icon by the user, the system expands the area, and typically displays additional content items in the area, such as between five and ten content items. Alternatively or additionally, the system allows the user to adjust the size of the area, such as by stretching the borders of the area, and the number of content items displayed in the area is set according to the set size of the area. For applications in which website publisher 50 serves webpage 60, the website publisher may perform or assist in the performance of the techniques described in this paragraph.

For some applications, system 20 provides content areas 62 with an icon to close the area, and/or an icon to minimize the area. For some applications, in response to a user request to minimize the area, the system removes the area from the main area of webpage 60, and creates an icon 388 representing the area in a tray 390 (shown in FIG. 2). In general, tray 390 may include icons indicative of all inactive applications or content sources 40. For some applications, if the system ascertains that a content source associated with an icon in the tray may provide content that is likely to be of interest to the user, the system provides an indication to the user, such as by causing the associated icon to blink, or the system automatically restores the content area of the content source. For some applications, system 20 generates a new content area 62 on the fly, such as if the system ascertains that a particular content area or category of content area would likely display content of relevance to the current anchor term. For example, the system may generate (a) a new content area 62 displaying content received from an online retailer, if the system ascertains that the current anchor term is relevant to merchandise sold by the retailer, (b) a new content area 62 displaying content received from an online map provider, if the system ascertains that the current anchor term is a geographical location, or (c) a new content area 62 displaying advertising content received from an online advertisement provider, if the system ascertains that the current anchor term is relevant to advertisement content provided by the online advertisement provider. For applications in which website publisher 50 serves webpage 60, the website publisher may perform or assist in the performance of the techniques described in this paragraph.

For some applications, one or more of content areas 62, and/or content items 65, are served by a server separate from system 20, such as a third-party server operated by an entity different from the entity operating system 20. For example, the third-party entity may be an online retailer or an online publisher. System 20 alerts the separate server of requested changes in content as the system performs the methods described herein.

Reference is again made to FIG. 2. For some applications, system 20 provides an association area 392, which allows the user to navigate based on associations, and/or set a level of personalization, such as described in the above-mentioned U.S. patent application Ser. No. 12/253,087, and/or one or more of the other patent applications incorporated hereinbelow by reference. For example, the association area may provide a set of one or more refinement terms 393 based on the current anchor term, such as using techniques described in the above-mentioned U.S. patent application Ser. No. 12/253,087, and/or one or more of the other patent applications incorporated hereinbelow by reference. If the user selects one of refinement terms 393 (such as by clicking on the term and/or dragging the term into anchor area 106), system 20 uses the selected term as a new anchor term (such as described in U.S. patent application Ser. No. 11/846,213, which issued as U.S. Pat. No. 7,756,855, and is incorporated herein by reference), adds the selected term to the current anchor term (such as described in the '087 and '213 applications), or replaces a portion of the current anchor term with the selected term (such as described in the '213 application). The system uses the resulting updated anchor term to update content items 65 at step 110 of methods 100 and 200, described hereinabove with reference to FIGS. 3 and 4, respectively. If the user selects one of refinement terms 393 and provides an instruction to synchronize one of content areas 62 with the selected term (such as by dragging the term into the selected area), system 20 synchronizes the selected content area by updating the content items at step 130 of method 100, described hereinabove with reference to FIG. 3, using the selected term as a new anchor term for the area.

For some applications, system 20 provides a question area 394 (shown in FIG. 2). The system uses the area to ask the user questions, generally in order to help the system focus or refine the user's search and/or interests. The system may attempt to ascertain user interests, and verify that the interests have been accurately ascertained, in order to provide the user with relevant content of interest. For some applications, the system uses the area to ask the user yes/no questions or like/dislike questions, e.g., "Are you still interested in . . . ?" For example, the system may ask the user whether he or she intended to search for a particular term, such as a particular person, e.g., "Are you interested in . . . ?" or "Do you know . . . ?" If the user replies in the affirmative, the system uses the proposed term as an updated anchor term. For some applications, the system extracts name entities (i.e., names of people) from content. When formulating the questions, the system may take into account popular or trendy terms. For some applications, the system attempts to ascertain the user's interest using a personal profile of the user, a profile of a community of users to which the user belongs, or a profile of all users, for example using techniques described in the above-mentioned U.S. patent application Ser. No. 12/253, 087, and/or one or more of the other patent applications incorporated hereinbelow by reference.

For some applications, a user arrives at webpage 60 by executing a search on a site affiliated with the publisher of webpage 60, clicking on a link provided by a search engine external to the publisher of webpage 60, or clicking on a graphical element on a webpage associated with one of online content sources 40.

For some applications, the system enables sharing of content with friends in one or more social networks by allowing the user to drag and drop the content in one or more social network areas, which display content received from the same or different social networks. For some applications, content item 65 comprises an identifier of a social network member, which may be represented, for example, by the member's name and/or photo. For some applications, at updated term generation step 126 of method 100, described hereinabove with reference to FIG. 3, the system generates the updated term by exacting one or more keywords from a profile of the member provided by the member to the social network, and/ or by analyzing the interactions of the member with other members of the social network. For some applications, these keywords are extracted using techniques described in U.S. application Ser. No. 12/397,510, filed Mar. 4, 2009, which published as US Patent Application Publication 2009/ 0228296, and is incorporated herein by reference.

Figure 5A:
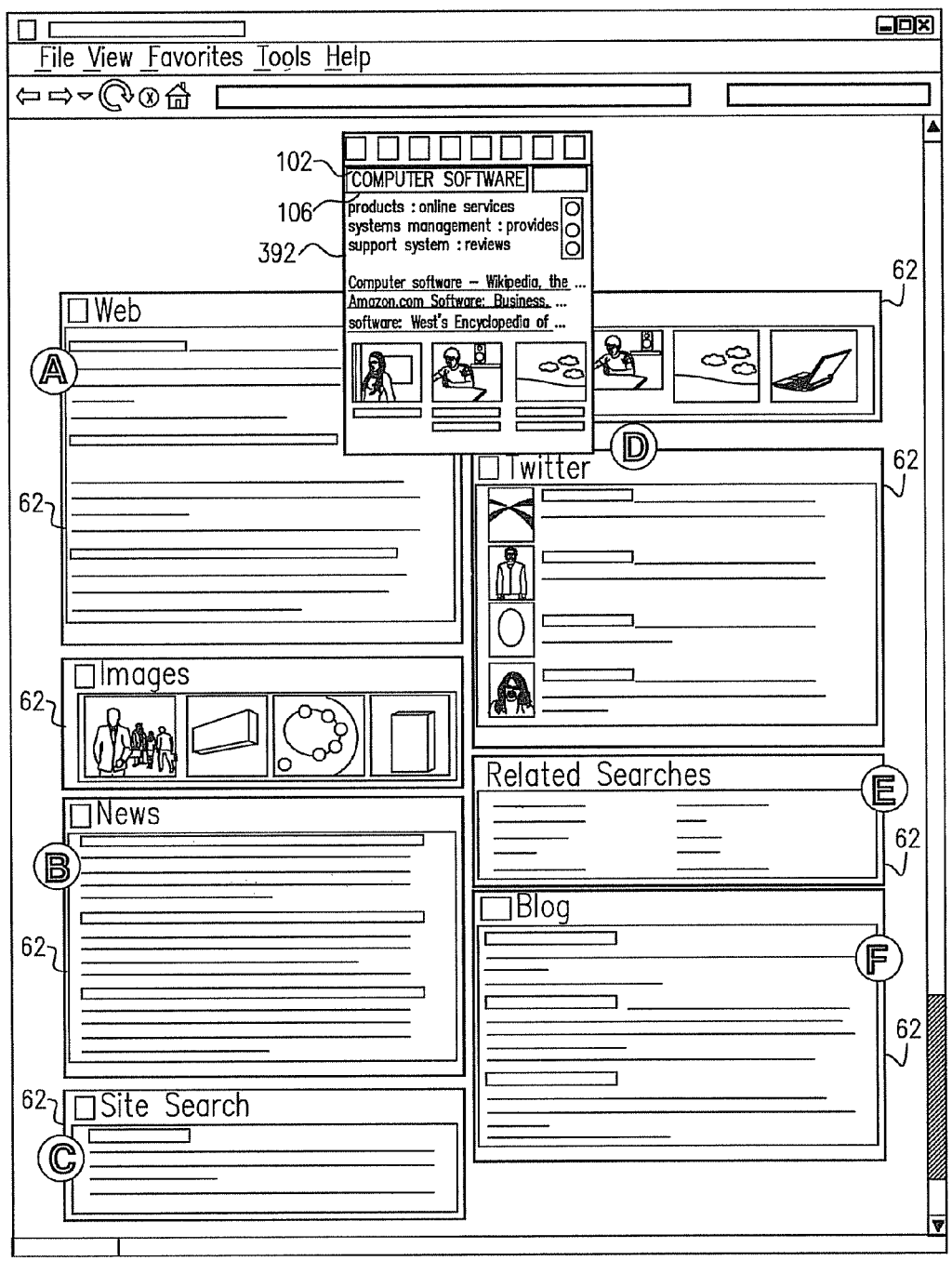
FIGS. 5A-D are schematic illustration of exemplary screenshots of a web browser displaying a webpage, in accordance with respective applications of the present invention.

Reference is now made to FIGS. 5A-D, which are schematic illustration of exemplary screenshots of web browser 36 displaying webpage 60, in accordance with respective applications of the present invention. FIG. 5A shows an exemplary screenshot generated at steps 104 through 114 of method 100 described hereinabove with reference to FIG. 3, using "computer software" as initial anchor term 102. Content areas 62 display content items related to this initial anchor term. By way of example and not limitation, the content areas may display the content set forth in Table A:

TABLE A

| Content area | Exemplary content |
| --- | --- |
| (A) Web | Computer software - Wikipedia, the free encyclopedia<br>Computer software, or just software, is the collection of computer programs and related data that provide the instructions telling a computer what to do and how to do it.<br>http://en.wikipedia.org/wiki/Computer_software<br>Amazon.com Software: Business, office, accounting, design . . .<br>Online shopping for computer software, business & office productivity software, software from Microsoft, Apple, Adobe & more; accounting, antivirus, graphics & development software . . .<br>http://www.amazon.com/software-business-education-finance-childrens . . .<br>software: West's Encyclopedia of American Law (Full . . .<br>software n. Computer Science The programs, routines, and symbolic languages that control the functioning of the hardware and direct its<br>http://www.answers.com/topic/computer-software |
| (B) News | Neuron-Like Computer Hardware Finally Gets Software<br>Through this relationship, a memristor can "remember" a piece of information, just like a biological neuron . . . in a silicon chip, computer scientists could create a system<br>http://www.msnbc.msn.com/id/40537109<br>New Brain Machine Reads Minds in Modest Breakthrough<br>A new advance in brain-machine interfaces could enable . . .<br>When that participant thought about Venus Williams, only the Venus Williams neuron would fire. The participants were then asked to look at a computer screen . . .<br>http://www.msnbc.msn.com/id/39872122<br>Brain Cells: How to Preserve Them<br>The brain is not too different from the rest of your body. It needs to be well-nourished. All animals except humans know this instinctively; because the head is elevated whenever an animal moves, sleep is the best . . .<br>http://www.huffingtonpost.com/jane-g-goldberg-phd/brain-cells-how-t . . . |
| (C) Site Search | Privacy Policy<br>Privacy Policy We recognize that privacy is an important issue for our users. Collarity, Inc. ("Collarity") is committed to protecting your privacy and is also committed to providing you a . . .<br>http://www.collarity.com/privacy-policy/17-misc/65-privacy-policy.html |
| (D) Twitter | tbsartono IP TV software to watch channels on computer, an iPhone, a laptop, or transfer movie and shows to regular television.<br>http://goo.gl/PQunO<br>b46u5 IP TV software to watch channels on computer, an iPhone, a laptop, or transfer movie and shows to regular television.<br>http://goo.gl/PQunO<br>mnrtpr Pc Spy Software - Great Convertion.: Computer Monitoring Software. Spy On Cheating Spouce, Children And Employee . . . http://bit.ly/h1nPAW<br>K201 Good information for the chapter on System Software - http://computer.howstuffworks.com/operating-system2.htm |
| (E) Related Searches | business systems   internet services<br>music downloads   offers<br>online services   products<br>provides   support system<br>systems management   windows applications |
| (F) Blog | Computer Software<br>Windows Software - Linux Software - Mac Software - Handphone Software - All Software<br>http://komputer-mania.blogspot.com/<br>Ready for IFRS: Computer Software Cost, Capitalized or . . .<br>Based on IAS 38 Intangible Assets, paragraph 4 which explains that some intangible assets may be contained in or on a physical substance such as a compact disc (in the case of . . .<br>http://faainc.blogspot.com/2010/08/computer-software-cost-capitaliz . . .<br>Computer Software<br>Designing a web site can be a crucial step in your business' exposure; however, designing a site that attracts future clients and customers can be a difficult task.<br>http://combutersoftware.blogspot.com/ |

Figure 5B:
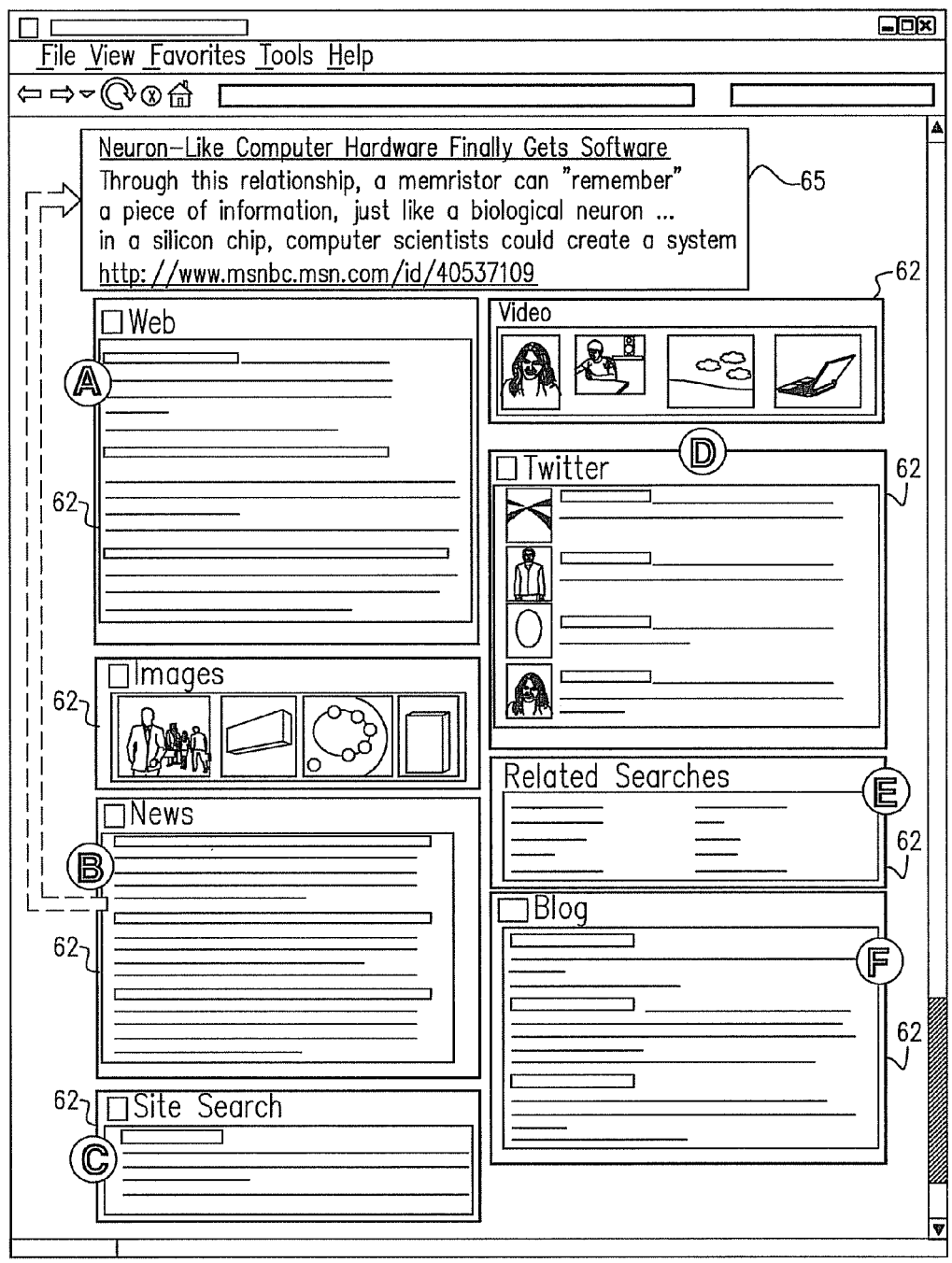
Figure 5C:
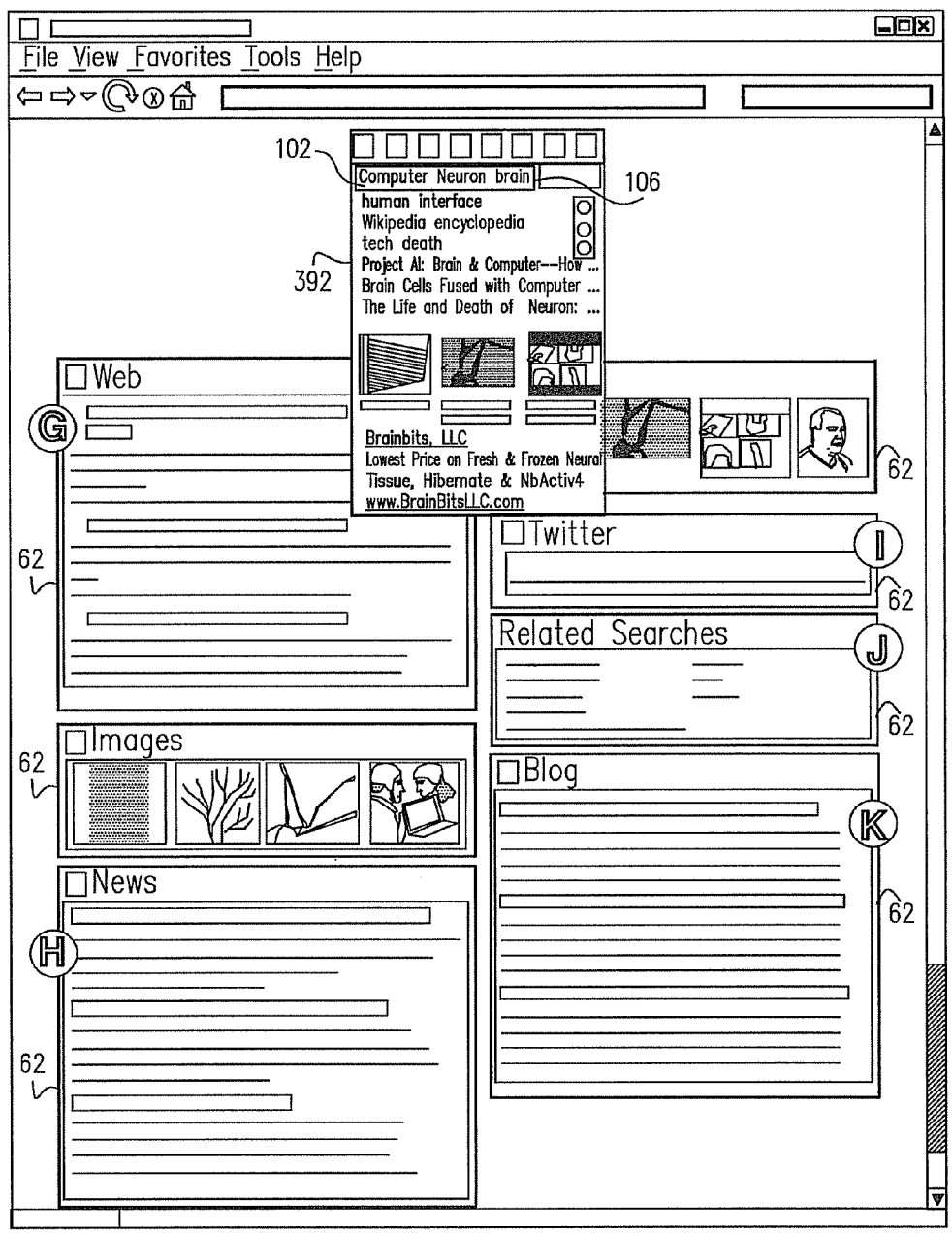

FIG. 5B shows an exemplary implementation of user synchronization instruction step 120 of method 100. The user provides a user instruction to synchronize all of content areas 62 (option (a) described above with reference to FIG. 3), by content areas 62, at steps 130 and 134 of method 100, also as shown in FIG. 5C. By way of example and not limitation, the content areas may now display the content set forth in Table B:

TABLE B

| Content area | Exemplary content |
|---|---|
| (G) Web | Project AI: Brain & Computer--How Biological Neurons Work<br>We have a wound at the right elbow! Send reinforcements! It looks like a computer. . . . A Simplified, Generic Neuron<br>http://library.thinkquest.org/19314/neurons.htm<br>Brain Cells Fused with Computer Chip \| LiveScience<br>Neuron from rat brain on a linear array of transistors. The ionic current in the cell . . . Scientists Make Bacteria Behave Like Computers; Brain Power: Mind Control of External . . .<br>http://www.livescience.com/health/060327_neuro_chips.html<br>The Life and Death of a Neuron: National Institute of . . .<br>Once a neuron is born it has to travel to the place in the brain where it will do its work. How does a neuron know where to go? What helps it get there?<br>http://www.ninds.nih.gov/disorders/brain_basics/ninds_neuron.htm |
| (H) News | Neuron-Like Computer Hardware Finally Gets Software<br>Through this relationship, a memristor can "remember" a piece of information, just like a biological neuron . . . in a silicon chip, computer scientists could create a system not too dissimilar in function to a flesh- . . .<br>http://www.msnbc.msn.com/id/40537109<br>New Brain Machine Reads Minds in Modest Breakthrough<br>A new advance in brain-machine interfaces could enable . . . When that participant thought about Venus Williams, only the Venus Williams neuron would fire. The participants were then asked to look at a computer screen . . .<br>http://www.msnbc.msn.com/id/39872122<br>Brain Cells: How to Preserve Them<br>The brain is not too different from the rest of your body. It needs to be well-nourished. All animals except humans know this instinctively; because the head is elevated whenever an animal moves, sleep is the best . . .<br>http://www.huffingtonpost.com/jane-g-goldberg-phd/brain-cells-how-t . . . |
| (I) Twitter | Your search for computer neuron brain did not match any documents |
| (J) Related Searches | computing science    digital rat<br>human power        interface<br>model making       patterns<br>spontaneously develops organized |
| (K) Blog | Brain Stimulant: Carbon Nanotube Neuron Interface<br>Blog focusing on new neurotechnology, brain stimulation, brain-computer interfaces, neuroengineering, neuroscience, brain emulation, neuromorphic chips, altering consciousness and . . .<br>http://brainstimulant.blogspot.com/2008/11/carbon-nanotube-neuron-i . . .<br>Brain Stimulant: Brain Synapse Computational Capacity<br>By merely simulating a higher level of brain functioning (overall neuron firing/activity) on a computer, researchers may totally miss a substantial amount of lower level functioning<br>http://brainstimulant.blogspot.com/2009/05/brain-synapse-computatio . . .<br>Brain Stimulant: Neuron Replacement using Stem Cells<br>Blog focusing on new neurotechnology, brain stimulation, brain-computer interfaces, neuroengineering, neuroscience, brain emulation, neuromorphic chips, altering consciousness and . . .<br>http://brainstimulant.blogspot.com/2008/02/neuron-replacement-with- . . . | dragging one of content items 65 (in the example, the first one of the news content items, "Neuron-Like Computer Hardware Finally Gets Software") from one of content areas 62 (in this example, a "news" content area), and dropping the content item into anchor area 106 (which is visible in FIG. 5A, but obscured by the content item in the view of FIG. 5B).

Figure 5D:
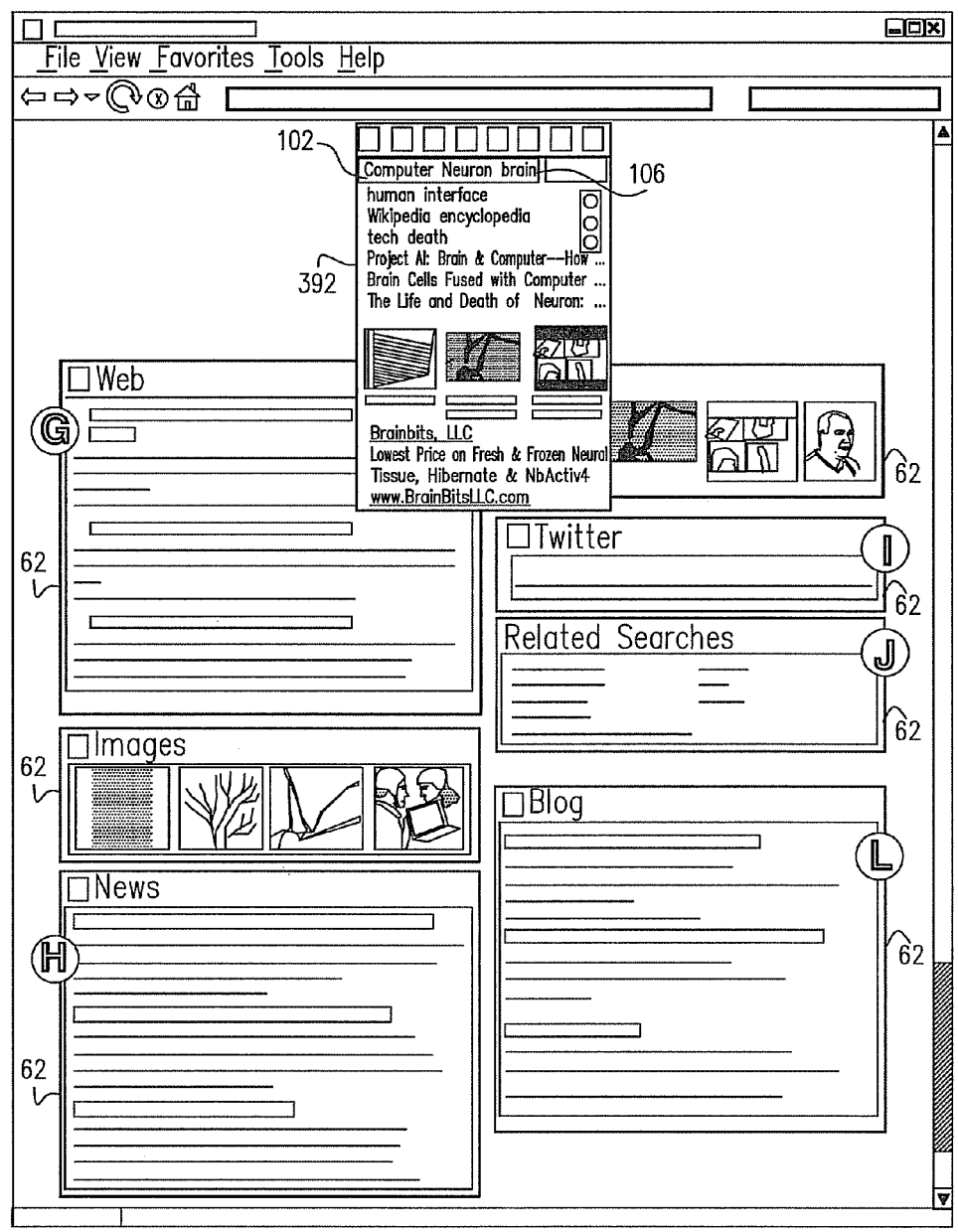

In response to this instruction, at step 126 of method 100, system 20 generates an updated anchor term 102 (in this example, "Computer Neuron brain"), and displays the updated anchor term in anchor area 106, as shown FIG. 5C. The system updates the content items displayed in all of FIG. 5D shows another exemplary implementation of user synchronization instruction step 120 of method 100, performed after the synchronization instruction described above with reference to FIGS. 5B-C. The user provides a user instruction to synchronize a particular one of the other content areas (in this example, a "blog" content area) (option (c) described above with reference to FIG. 3), by dragging one of content items 65 (in the example, the second one of the Web content items, "Brain Cells Fused with Computer Chip|LiveScience") from one of content areas 62 (in this example, a "Web" content area), and dropping the content item into another content area 62 (in this example, the "blog" content area).

In response to this instruction, at step 126 of method 100, system 20 generates an updated term for the "blog" content area. The system updates the content items displayed in the "blog" content area, at steps 130 and 134 of method 100, as shown in FIG. 5D. By way of example and not limitation, all of the content areas except the "blog" content area may continue to display the content set forth in Table B (i.e., do not change in response to this user instruction), and the "blog" content area may now display the content set forth in Table C:

TABLE C

| Content area | Exemplary content |
| --- | --- |
| (L) Blog | P.I.X.E.L.S.N.I.P.E.R.-: March 2006<br>LiveScience.com - Brain Cells Fused with Computer Chip<br>The game is no. Researchers at the University of Padua in<br>Italy have developed "neuro-chips" in which<br>living brain cells and . . .<br>http://pixelsniper.blogspot.com/2006_03_01_archive.html<br>Pushing a Snake Up a Hill: April 2006<br>And while we're on the subject of brainpower, how about<br>Brain Cells Fused with Computer Chip? The stuff of SF,<br>all right, moving toward reality.<br>http://starrigger.blogspot.com/2006_04_01_archive.html<br>Matterik's Blog: April 2007<br>By 2035, an implantable information chip could be developed<br>and wired directly to the user's brain . . . Brain Cells<br>Fused with Computer Chip<br>http://matterik.blogspot.com/2007_04_01_archive.html |

Of note, this user instruction caused synchronization of only the "blog" content area with the selected content item, and did not cause synchronization of any of the other content areas, or change anchor term 102.

Reference is made to FIG. 6, which is a schematic illustration of a graphical user interface (GUI) 300 displaying web browser 36 in a window, in accordance with an application of the present invention. In addition to the window of web browser 36, GUI 300 displays, at a location other than in web browser 36, at least one graphical element 302 associated with a content item. For example, the location may be on a desktop displayed by the GUI (including the desktop, i.e., the background portion of the display, of a portable computing device, such as an iPhone™ or iPad™ (Apple Inc., Cupertino, Calif.). (For clarity of illustration, the text within the content areas displayed on webpage 60, although actually present, is not shown; this text can be seen in FIG. 2.) Graphical element 302 may include image elements, textual elements, and/or a combination of image and graphical elements. For example, graphical element 302 may be selected from the group consisting of:

- an icon 304, which represents a content item that comprises a document, such as a word processor document, spreadsheet document, image (still or moving, e.g., video) document, presentation document, text document, HTML document, or a document of any other content type;
- at least a portion of an image 306 (still or moving, e.g., video) of the content item, which may be displayed, for example, in an image viewer, such as a picture viewer 308, media player, or another still or moving image viewer;
- an icon 309, which represents a content item that comprises an audio file, such as a music file; and
- a portion 310 of a document 312, such as any of the document types listed immediately above, which may be displayed, for example, in an application used to edit and/or display the document.

The user provides an instruction to system 20 to synchronize all or a portion of content areas 62 displayed on webpage 60 with the content item, such as by dragging graphical element 302 and dropping the graphical element on webpage 60. As described hereinabove with reference to FIG. 3 at step 120 of method 100, the user instruction may instruct the system to synchronize (a) all of content areas 62, or (b) a particular one of content areas 62. For example, for option (a), the user may instruct the system to synchronize the content areas by dragging and dropping graphical element 302 into anchor area 106 (which is displayed on the webpage separately from the content areas) or an empty area of webpage 60. For option (c), the user may instruct the portal server system to synchronize a particular content area by dragging and dropping element 302 into the particular content area 62, or a graphical element displayed in association with the particular area.

Upon receiving the instruction from the user, the system causes web browser 36 to display, in the one or more content areas to be synchronized, respective updated sets 64 of content items 65 that are related to the selected content item represented in the GUI (e.g., on the desktop). the system generates an updated term, such as using one or more of the techniques described hereinabove with reference to FIG. 3 at updated term generation step 126 of method 100, except that the system performs these term-extraction techniques with respect to the content associated with graphical element 302, rather than the at least one of content items 65 mentioned hereinabove in the description of these techniques. The system uses the updated term to synchronize all or a particular one of content areas 62 (in accordance with user's instruction), such as described hereinabove with reference to FIG. 3 at steps 130 and 134 of method 100.

As used in the present application, including in the claims, "clicking on" an element of a webpage means pointing at the element, such as using a mouse, stylus, or other pointing device, and pressing a button on the mouse or other pointing device, or otherwise indicating selection of the item, such as by double-tapping a pointing device or touching (e.g., tapping, double-tapping, or making other finger motions to) a touch-sensitive display using a finger or pointing device, or using other techniques known in the art for selecting the element of a webpage in a manner analogous to mouse-clicking.

For some applications, as mentioned above with reference to FIG. 1, one or more of content areas 62 are generated and/or implemented by respective applications running on respective servers. Such applications may enable content areas 62 to provide the users with interactive experiences with content items 65 displayed in content areas 62, including the execution of transactions, such as purchase transactions. The server applications select which content items 65 to display in content areas 62 in response to terms and updated terms (e.g., initial and updated anchor terms) provided to the server applications by server system 20 and/or web browser 36, using any of the techniques described hereinabove (e.g., upon receipt of a user synchronization instruction, upon an automatic synchronization (e.g., as described with reference to FIG. 4), or upon the user providing a new anchor term). For example, one of content areas 62 may be an online retailer, which displays items of merchandise as content items 65 in a content area 62. The server application selects which content items 65 to display based on terms provided by server system 20, as described hereinabove. The server application may also populate a search field displayed in content area 62 responsively to terms provided by the server system.

Techniques of applications of the present invention may improve the efficiency of accessing content from multiple web sources, and conserve the use of computer resources.

Embodiments of the present invention described herein can take the form of an entirely hardware embodiment, an entirely software embodiment or an embodiment including both hardware and software elements. In an embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Typically, the operations described herein that are performed by system 20 transform the physical state of memory 34, which is a real physical article, to have a different magnetic polarity, electrical charge, or the like depending on the technology of the memory that is used.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any combination of one or more programming languages, including an object oriented programming language such as Java, Smalltalk, C++ or the like and conventional procedural programming languages, such as the C programming language or similar programming languages.

It will be understood that each block of the flowcharts shown in FIGS. 3 and 4, and combinations of blocks in the flowchart, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart blocks.

The scope of the present invention includes embodiments described in the following applications, which are assigned to the assignee of the present application and are incorporated herein by reference. In an embodiment, techniques and apparatus described in one or more of the following applications are combined with techniques and apparatus described herein:

International Patent Application PCT/US07/67103, filed Apr. 20, 2007, entitled, "Search techniques using association graphs," which published as International Publication WO 07/124430 to Ismalon;

U.S. patent application Ser. No. 11/633,461, filed Dec. 5, 2006, entitled, "A multi-directional and auto-adaptive relevance and search system and methods thereof," which published as US Patent Application Publication 2007/0250500 to Ismalon;

U.S. Provisional Patent Application 60/793,253, filed Apr. 20, 2006, entitled, "Methods for using association graphs in search engines";

U.S. Provisional Patent Application 60/796,188, filed May 1, 2006, entitled, "Apparatus and methods thereof for search engine personalization";

U.S. Provisional Patent Application 60/829,136, filed Oct. 11, 2006, entitled, "Apparatus and methods thereof for search phrase refinement";

U.S. Provisional Patent Application 60/829,135, filed Oct. 11, 2006, entitled, "Apparatus and methods thereof for using explicit query refinements to tune search results ranking factors";

U.S. Provisional Patent Application 60/829,132, filed Oct. 11, 2006, entitled, "Apparatus and methods thereof for adaptive ranking mechanism using association graphs and contextual analysis";

U.S. Provisional Patent Application 60/886,193, filed Jan. 23, 2007, entitled, "Multi-directional and auto-adaptive relevance and search system and methods thereof";

U.S. Provisional Patent Application 60/887,580, filed Jan. 31, 2007, entitled, "Searchable banner display and apparatus that enables exploring destination content prior to reaching it";

U.S. Provisional Patent Application 60/741,902, filed in January 2006, entitled, "A multi-directional and auto-adaptive relevance and search system and methods thereof";

U.S. patent application Ser. No. 11/846,213, filed Aug. 28, 2007, entitled, "Search phrase refinement by search term replacement," which published as US Patent Application Publication 2008/0091670 to Ismalon, and issued as U.S. Pat. No. 7,756,855;

U.S. patent application Ser. No. 11/870,999, filed Oct. 11, 2007, entitled, "Negative associations for search results ranking and refinement," which published as US Patent Application Publication 2008/0140643 to Ismalon;

U.S. patent application Ser. No. 12/023,564, filed Jan. 31, 2008, entitled, "Searchable interactive internet advertisements," which published as US Patent Application Publication 2008/0215416 to Ismalon;

U.S. patent application Ser. No. 12/397,510, filed Mar. 4, 2009, entitled, "Optimization of social distribution networks," which published as US Patent Application Publication 2009/0228296 to Ismalon;

U.S. patent application Ser. No. 12/253,087, filed Oct. 16, 2008, entitled, "Techniques for ranking search results," which published as US Patent Application Publication 2009/0119261 to Ismalon;

U.S. patent application Ser. No. 12/491,451, filed Jun. 25, 2009, entitled, "Interactions among online digital identities," which published as US Patent Application Publication 2010/0049770 to Ismalon; and U.S. patent application Publication Ser. No. 12/801,534, filed Jun. 14, 2010, entitled, "Generation of refinement terms for search queries," which issued as U.S. Pat. No. 8,429,184 to Ismalon.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method comprising:
    causing, by a server system via a network, a web browser to display (a) at least first and second content areas separately from each other on a webpage, and (b) at least a first content item at a location on the webpage other than in the first and the second content areas;
    receiving from the web browser, by the server system via the network, an indication of dragging, by a user of the web browser, of an element displayed on the webpage, and dropping, by the user, of the element into one of the first and the second content areas, the element selected from the group consisting of: the first content item, and a graphical element displayed in association with the first content item;
    if the indication is of dropping the element into the first content area, causing, by the server system, the web browser to display, in the first content area, at least a portion of a set of one or more second content items related to the first content item; and
    if the indication is of dropping the element into the second content area, causing, by the server system, the web browser to display, in the second content area, at least a portion of a set of one or more third content items related to the first content item.

2. The method according to claim 1, wherein causing the web browser to display in the first content area comprises serving, to the web browser, the at least a portion of the set of second content items for display in the first content area.

3. The method according to claim 1, wherein causing the web browser to display in the first content area comprises sending an instruction to the web browser to request and receive, from one or more online content sources, the set of the one or more second content items, and to display the at least a portion of the set of second content items in the first content area.

4. The method according to claim 1, wherein the element is the first content item, and wherein receiving the indication comprises receiving the indication of dragging of the first content item, and dropping of the first content item into the first content area.

5. The method according to claim 1, wherein the element is the graphical element displayed in association with the first content item, and wherein receiving the indication comprises receiving the indication of dragging of the graphical element, and dropping of the graphical element into the first content area.

6. The method according to claim 1,
    wherein a third content area is displayed on the webpage separately from the first and the second content areas, which third content area includes the first content item, and
    wherein the method further comprises, if the server system receives, from the web browser, an indication of dragging, by the user, of a second element displayed in the first content area, and dropping, by the user, of the second element into the third content area, the second element selected from the group consisting of: one of the second content items, and a second graphical element displayed in association with the one of the second content items: causing, by the server system, the web browser to display, in the third content area, at least a portion of a set of one or more fourth content items related to the one of the second content items.

7. The method according to claim 1, wherein the first content item is of a first content category, and wherein the second content items are of a second content category different from the first content category, and wherein each of the first and second content categories is selected from the group of categories consisting of: a video content category, a news content category, a search content category, a social updates content category, a chat content category, an advertisement content category, a blog content category, an encyclopedia content category, a map content category, a finance content category, a forum content category, and an association content category.

8. The method according to claim 1, wherein the set of second content items comprises advertising content.

9. The method according to claim 1, wherein the method further comprises, before receiving the indication of dragging and dropping, causing, by the server system, the web browser to display, in the first and the second content areas, respective content items requested from respective one or more online content sources.

10. The method according to claim 1,
    wherein the first and the second content areas display content of different first and second content categories, respectively, and
    wherein:
        if the indication is of dropping the element into the first content area, the second content items are of the first content category of the first content area, and
        if the indication is of dropping the element into the second content area, the third content items are of the second content category of the second content area.

11. The method according to claim 10, wherein the method further comprises, before receiving the indication of dragging and dropping, causing, by the server system, the web browser to display (a) in the first and the second content areas, respective content items requested from respective one or more online content sources, and (b) respective names of the online content sources in association with the respective first and second content areas.

12. The method according to claim 1,
wherein a third content area is displayed on the webpage separately from the first and the second content areas, which third content area includes the first content item, and
wherein the third content area displays content of a content category selected from the group of categories consisting of: a news content category, a social updates content category, a chat content category, and a blog content category.

13. The method according to claim 12, wherein the third content area displays content of the social updates content category.

14. A computer-implemented method comprising:
displaying, by a web browser running in a device, (a) at least first and second content areas separately from each other on a webpage, and (b) at least a first content item at a location on the webpage other than in the first and the second content areas;
receiving an indication of dragging, by a user of the web browser, of an element displayed on the webpage, and dropping, by the user, of the element into one of the first and the second content areas, the element selected from the group consisting of: the first content item, and a graphical element displayed in association with the first content item;
if the indication is of dropping the element into the first content area, displaying in the first content area, by the web browser, at least a portion of a set of one or more second content items related to the first content item; and
if the indication is of dropping the element into the second content area, displaying in the second content area, by the web browser, at least a portion of a set of one or more third content items related to the first content item.

15. The method according to claim 14, wherein receiving the indication comprises receiving the indication by the web browser.

16. The method according to claim 14, wherein receiving the indication comprises receiving, by a server system via a network, the indication from the web browser.

17. The method according to claim 16, wherein displaying in the first content area comprises:
responsively to the indication, serving, by the server system to the web browser, the at least a portion of the set of second content items for display in the first content area; and
displaying in the first content area, by the web browser, the served at least a portion of the set of second content items.

18. The method according to claim 16, wherein displaying in the first content area comprises:
sending, by the server system, an instruction to the web browser to request and receive, from one or more online content sources, the set of the one or more second content items;
requesting and receiving, by the web browser, from the one or more online content sources, the set of the one or more second content items; and
displaying the at least a portion of the requested and received set of second content items in the first content area.

19. The method according to claim 14,
wherein the method further comprises receiving, by the web browser, from at least one web server via a network, the first and the second content areas for display on the webpage, and the first content item, and
wherein displaying in the first content area comprises receiving, by the web browser, via the network, the set of one or more second content items related to the first content item.

20. The method according to claim 14, further comprising, displaying, by the web browser, a third content area on the webpage separately from the first and the second content areas, which third content area includes the first content item, wherein the third content area displays content of a content category selected from the group of categories consisting of: a news content category, a social updates content category, a chat content category, and a blog content category.

21. The method according to claim 20, wherein the third content area displays content of the social updates content category.

22. The method according to claim 14, wherein the method further comprises, before receiving the indication of dragging and dropping, displaying, by the web browser, in the first and the second content areas, respective content items requested from respective one or more online content sources.

23. The method according to claim 14,
wherein the first and the second content areas display content of different first and second content categories, respectively, and
wherein:
if the indication is of dropping the element into the first content area, the second content items are of the first content category of the first content area, and
if the indication is of dropping the element into the second content area, the third content items are of the second content category of the second content area.

24. The method according to claim 23, wherein the method further comprises, before receiving the indication of dragging and dropping, displaying, by the web browser, (a) in the first and the second content areas, respective content items requested from respective one or more online content sources, and (b) respective names of the online content sources in association with the respective first and second content areas.

25. Apparatus for use with a network, the apparatus comprising:
an interface; and
a processor, which is configured to cause a web browser to display (a) at least first and second content areas separately from each other on a webpage, and (b) at least a first content item at a location on the webpage other than in the first and the second content areas; receive, via the interface over the network, from the web browser, an indication of dragging, by a user of the web browser, of an element displayed on the webpage, and dropping, by the user, of the element into one of the first and the second content areas, the element selected from the group consisting of: the first content item, and a graphical element displayed in association with the first content item; if the indication is of dropping the element into the first content area, cause the web browser to display, in the first content area, at least a portion of a set of one or more second content items related to the first content item; and, if the indication is of dropping the element into the second content area, cause the web browser to display, in the second content area, at least a portion of a set of one or more third content items related to the first content item.

26. The apparatus according to claim 25,
wherein the first and the second content areas display content of different first and second content categories, respectively, and
wherein:
if the indication is of dropping the element into the first content area, the second content items are of the first content category of the first content area, and
if the indication is of dropping the element into the second content area, the third content items are of the second content category of the second content area.

27. The apparatus according to claim 25,
wherein a third content area is displayed on the webpage separately from the first and the second content areas, which third content area includes the first content item, and
wherein the third content area displays content of a content category selected from the group of categories consisting of: a news content category, a social updates content category, a chat content category, and a blog content category.

28. Apparatus that communicates with at least one web server via a network, the apparatus comprising:
a display; and
a processor, which is configured to run a web browser that is configured to receive (a) a webpage, (b) from the at least one web server via the network, first and second content areas for display separately from each other on the webpage, and (c) a first content item for display at a location on the webpage other than in the first and the second content areas; display the webpage on the display; receive an indication of dragging, by a user of the device, of an element displayed on the webpage, and dropping, by the user, of the element into one of the first and the second content areas, the element selected from the group consisting of: the first content item, and a graphical element displayed in association with the first content item; if the indication is of dropping the element into the first content area, (a) receive, via the network, a set of one or more second content items related to the first content item, and (b) display at least a portion of the set of second content items in the first content area; and, if the indication is of dropping the element into the second content area, (a) receive, via the network, a set of one or more third content items related to the first content item, and (b) display at least a portion of the set of third content items in the second content area.

29. The apparatus according to claim 28,
wherein the first and the second content areas display content of different first and second content categories, respectively, and
wherein:
if the indication is of dropping the element into the first content area, the second content items are of the first content category of the first content area, and
if the indication is of dropping the element into the second content area, the third content items are of the second content category of the second content area.

30. The apparatus according to claim 28,
wherein a third content area is displayed on the webpage separately from the first and the second content areas, which third content area includes the first content item, and
wherein the third content area displays content of a content category selected from the group of categories consisting of: a news content category, a social updates content category, a chat content category, and a blog content category.

31. A computer-implemented method comprising:
causing, by a server system via a network, a web browser to display (a) first content in a content area on a webpage, and (b) at least a second content item at a location on the webpage other than in the content area;
thereafter, receiving from the web browser, by the server system via the network, an indication of dragging, by a user of the web browser, of an element displayed on the webpage, and dropping, by the user, of the element into the content area, the element selected from the group consisting of: the second content item, and a graphical element displayed in association with the second content item; and
responsively to the indication, causing, by the server system, the web browser to display, in the content area, at least a portion of a set of one or more third content items related to the second content item, including taking into account, by the server system, the first content displayed in the content area.

32. The method according to claim 31, wherein causing the web browser to display the first content comprises causing the web browser to display a plurality of first content items in the content area, and wherein taking into account the first content comprises taking into account, by the server system, the plurality of first content items displayed in the content area.

33. The method according to claim 31, wherein causing, by the server system, the web browser to display, in the content area, the at least a portion of the set of third content items comprises causing, by the server system, the web browser to display, in the content area, the at least a portion of the set of third content items related to a combination of (a) a term based on the second content item and (b) one or more terms representative of the first content.

34. The method according to claim 31,
wherein the content area is a first content area, and wherein a second content area is displayed on the webpage separately from the first content area, which second content area includes the second content item, and
wherein the second content area displays content of a content category selected from the group of categories consisting of: a news content category, a social updates content category, a chat content category, and a blog content category.

35. The method according to claim 34, wherein the second content area displays content of the social updates content category.

36. The method according to claim 31, wherein the first content is of a first content category, and wherein the second content items are of a second content category different from the first content category.

37. A computer-implemented method comprising:
displaying, by a web browser running in a device, (a) first content in a content area on a webpage, and (b) at least a second content item at a location on the webpage other than in the content area;
thereafter, receiving an indication of dragging, by a user of the web browser, of an element displayed on the webpage, and dropping, by the user, of the element into the content area, the element selected from the group consisting of: the second content item, and a graphical element displayed in association with the second content item; and
responsively to the indication, displaying in the content area, by the web browser, at least a portion of a set of one or more third content items related to the second content item, the third content items generated by taking into account the first content displayed in the content area.

38. The method according to claim 37, wherein displaying the at least a portion of the set of third content items in the content area comprises displaying, by the web browser, in the content area, the at least a portion of the set of third content items related to a combination of (a) a term based on the second content item and (b) one or more terms representative of the first content.

39. A computer-implemented method comprising:
  causing, by a server system via a network, a web browser to display (a) a first content item in a first content area displayed on a webpage, and (b) a second content item in a second content area displayed separately from the first content area on the webpage;
  causing, by the server system, the web browser to display, in the second content area, at least a portion of a set of one or more third content items related to the first content item, if the server system receives, from the web browser via the network, an indication of dragging, by a user of the web browser, of a first element displayed in the first content area, and dropping, by the user, of the first element into the second content area; and
  causing, by the server system, the web browser to display, in the first content area, at least a portion of a set of one or more fourth content items related to the second content item, if the server system receives, from the web browser via the network, an indication of dragging, by the user, of a second element displayed in the second content area, and dropping, by the user, of the second element into the first content area,
  wherein the first element is selected from the group consisting of: the first content item, and a first graphical element displayed in association with the first content item, and
  wherein the second element is selected from the group consisting of: the second content item, and a second graphical element displayed in association with the second content item.

40. The method according to claim 39, wherein causing the web browser to display (a) the first content item in the first content area and (b) the second content item in the second content area comprises serving, to the web browser, (a) the first content item for display in the first content area, and (b) the second content item for display in the second content area.

41. The method according to claim 39, wherein the first content item is of a first content category, and wherein the second content item is of a second content category different from the first content category.

42. The method according to claim 39,
  wherein the first and the second content areas display content of different first and second content categories, respectively, and
  wherein:
    if the indication is of dropping the first element into the second content area, the third content items are of the second content category of the second content area, and
    if the indication is of dropping the second element into the first content area, the fourth content items are of the first content category of the first content area.

43. The method according to claim 42, wherein the method further comprises, before receiving the indication of dragging and dropping of the first element or the second element, causing, by the server system, the web browser to display (a) in the first and the second content areas, the respective first and second content items requested from respective one or more online content sources, and (b) respective names of the online content sources in association with the respective first and second content areas.

44. The method according to claim 39, wherein the first content area displays content of a content category selected from the group of categories consisting of: a news content category, a social updates content category, a chat content category, and a blog content category.

45. The method according to claim 44, wherein the first content area displays content of the social updates content category.

46. A computer-implemented method comprising:
  displaying, by a web browser running in a device, (a) a first content item in a first content area displayed on a webpage, and (b) a second content item in a second content area displayed separately from the first content area on the webpage;
  displaying, by the web browser, in the second content area, at least a portion of a set of one or more third content items related to the first content item, if the web browser receives an indication of dragging, by a user of the web browser, of a first element displayed in the first content area, and dropping, by the user, of the first element into the second content area; and
  displaying, by the web browser, in the first content area, at least a portion of a set of one or more fourth content items related to the second content item, if the web browser receives an indication of dragging, by the user, of a second element displayed in the second content area, and dropping, by the user, of the second element into the first content area,
  wherein the first element is selected from the group consisting of: the first content item, and a first graphical element displayed in association with the first content item, and
  wherein the second element is selected from the group consisting of: the second content item, and a second graphical element displayed in association with the second content item.

47. The method according to claim 46, wherein the first content item is of a first content category, and wherein the second content item is of a second content category different from the first content category.

48. The method according to claim 46,
  wherein the first and the second content areas display content of different first and second content categories, respectively, and
  wherein:
    if the indication is of dropping the first element into the second content area, the third content items are of the second content category of the second content area, and
    if the indication is of dropping the second element into the first content area, the fourth content items are of the first content category of the first content area.

49. The method according to claim 46, wherein the first content area displays content of a content category selected from the group of categories consisting of: a news content category, a social updates content category, a chat content category, and a blog content category.

50. The method according to claim 49, wherein the first content area displays content of the social updates content category.

51. Apparatus for use with a network, the apparatus comprising:
- an interface; and
- a processor, which is configured to cause a web browser to display (a) first content in a content area on a webpage, and (b) at least a second content item at a location on the webpage other than in the content area; receive, via the interface over the network, from the web browser, an indication of dragging, by a user of the web browser, of an element displayed on the webpage, and dropping, by the user, of the element into the content area, the element selected from the group consisting of: the second content item, and a graphical element displayed in association with the second content item; and responsively to the indication, cause the web browser to display, in the content area, at least a portion of a set of one or more third content items related to the second content item, including taking into account, by the processor, the first content displayed in the content area.

52. The apparatus according to claim 51, wherein the processor is configured to cause the web browser to display, in the content area, the at least a portion of the set of third content items related to a combination of (a) a term based on the second content item and (b) one or more terms representative of the first content.

53. Apparatus that communicates with at least one web server via a network, the apparatus comprising:
- a display; and
- a processor, which is configured to run a web browser that is configured to display (a) first content in a content area on a webpage on the display, and (b) at least a second content item at a location on the webpage other than in the content area; thereafter, receive an indication of dragging, by a user of the device, of an element displayed on the webpage, and dropping, by the user, of the element into the content area, the element selected from the group consisting of: the second content item, and a graphical element displayed in association with the second content item; and responsively to the indication, display in the content area at least a portion of a set of one or more third content items related to the second content item, the third content items generated by taking into account the first content displayed in the content area.

54. Apparatus for use with a network, the apparatus comprising:
- an interface; and
- a processor, which is configured to cause a web browser to display (a) a first content item in a first content area displayed on a webpage, and (b) a second content item in a second content area displayed separately from the first content area on the webpage; cause the web browser to display, in the second content area, at least a portion of a set of one or more third content items related to the first content item, if the processor receives, from the web browser via the interface over the network, an indication of dragging, by a user of the web browser, of a first element displayed in the first content area, and dropping, by the user, of the first element into the second content area; and cause the web browser to display, in the first content area, at least a portion of a set of one or more fourth content items related to the second content item, if the processor receives, from the web browser via the interface over the network, an indication of dragging, by the user, of a second element displayed in the second content area, and dropping, by the user, of the second element into the first content area, wherein the first element is selected from the group consisting of: the first content item, and a first graphical element displayed in association with the first content item, and wherein the second element is selected from the group consisting of: the second content item, and a second graphical element displayed in association with the second content item.

55. The apparatus according to claim 54, wherein the first content item is of a first content category, and wherein the second content item is of a second content category different from the first content category.

56. The apparatus according to claim 54,
- wherein the first and the second content areas display content of different first and second content categories, respectively, and
- wherein:
    - if the indication is of dropping the first element into the second content area, the third content items are of the second content category of the second content area, and
    - if the indication is of dropping the second element into the first content area, the fourth content items are of the first content category of the first content area.

57. Apparatus that communicates with at least one web server via a network, the apparatus comprising:
- a display; and
- a processor, which is configured to run a web browser that is configured to display (a) a first content item in a first content area on a webpage on the display, and (b) a second content item in a second content area displayed separately from the first content area on the webpage; display, in the second content area, at least a portion of a set of one or more third content items related to the first content item, if the processor receives an indication of dragging, by a user of the web browser, of a first element displayed in the first content area, and dropping, by the user, of the first element into the second content area; and display in the first content area, at least a portion of a set of one or more fourth content items related to the second content item, if the processor receives an indication of dragging, by the user, of a second element displayed in the second content area, and dropping, by the user, of the second element into the first content area, wherein the first element is selected from the group consisting of: the first content item, and a first graphical element displayed in association with the first content item, and wherein the second element is selected from the group consisting of: the second content item, and a second graphical element displayed in association with the second content item.

58. The apparatus according to claim 57, wherein the first content item is of a first content category, and wherein the second content item is of a second content category different from the first content category.

59. The apparatus according to claim 57,
- wherein the first and the second content areas display content of different first and second content categories, respectively, and
- wherein:
    - if the indication is of dropping the first element into the second content area, the third content items are of the second content category of the second content area, and
    - if the indication is of dropping the second element into the first content area, the fourth content items are of the first content category of the first content area.

* * * * *